(12) United States Patent
Vidic et al.

(10) Patent No.: US 11,675,552 B1
(45) Date of Patent: Jun. 13, 2023

(54) PRINTING SYSTEM OPERATED RESPONSIVE TO DATA BEARING RECORDS

(71) Applicant: egrafa, inc., State College, PA (US)

(72) Inventors: Matthew C. Vidic, State College, PA (US); Robert Brown, Sandbach (GB)

(73) Assignee: egrafa, inc., State College, PA (US)

( * ) Notice: Subject to any disclaimer, the term of this patent is extended or adjusted under 35 U.S.C. 154(b) by 0 days.

(21) Appl. No.: 17/669,889

(22) Filed: Feb. 11, 2022

Related U.S. Application Data

(60) Provisional application No. 63/176,950, filed on Apr. 20, 2021, provisional application No. 63/149,420, filed on Feb. 15, 2021.

(51) Int. Cl.
*G06F 3/12* (2006.01)
*G06Q 10/08* (2023.01)
*G06Q 10/083* (2023.01)

(52) U.S. Cl.
CPC .......... *G06F 3/1226* (2013.01); *G06F 3/1203* (2013.01); *G06F 3/126* (2013.01); *G06F 3/1267* (2013.01); *G06F 3/1285* (2013.01); *G06Q 10/083* (2013.01)

(58) Field of Classification Search
CPC ...... G06F 3/1226; G06F 3/1203; G06F 3/126; G06F 3/1267; G06F 3/1285; G06Q 10/083
USPC .......................................................... 358/1.15
See application file for complete search history.

(56) References Cited

U.S. PATENT DOCUMENTS

| | | | |
|---|---|---|---|
| 8,305,609 B2 * | 11/2012 | Bostick | G06F 3/1263 358/1.14 |
| 8,947,696 B1 * | 2/2015 | Uyttendaele | G06F 3/1272 358/1.15 |
| 2020/0409627 A1 * | 12/2020 | Alacar | G06F 21/31 |

* cited by examiner

*Primary Examiner* — Allen H Nguyen
(74) *Attorney, Agent, or Firm* — Ralph E. Jocke; Walker & Jocke

(57) ABSTRACT

A printing system that operates responsive to data bearing records enables providers of printable content records to have printed copies of the content records produced and delivered to designated record recipients. Central system circuitry (22) is in operative connection with at least one data store (24), and includes record data corresponding to the content records and records regarding printing operations, the locations thereof and other record data. The central system circuitry operates to cause printed copies of the content records produced by respective printing operations located in geographic proximity to respective record recipients. The exemplary system further enables a content record provider to operate the system to host content records so that printed copies of the records may be obtained by record requesters located in widely dispersed geographic locations.

24 Claims, 48 Drawing Sheets

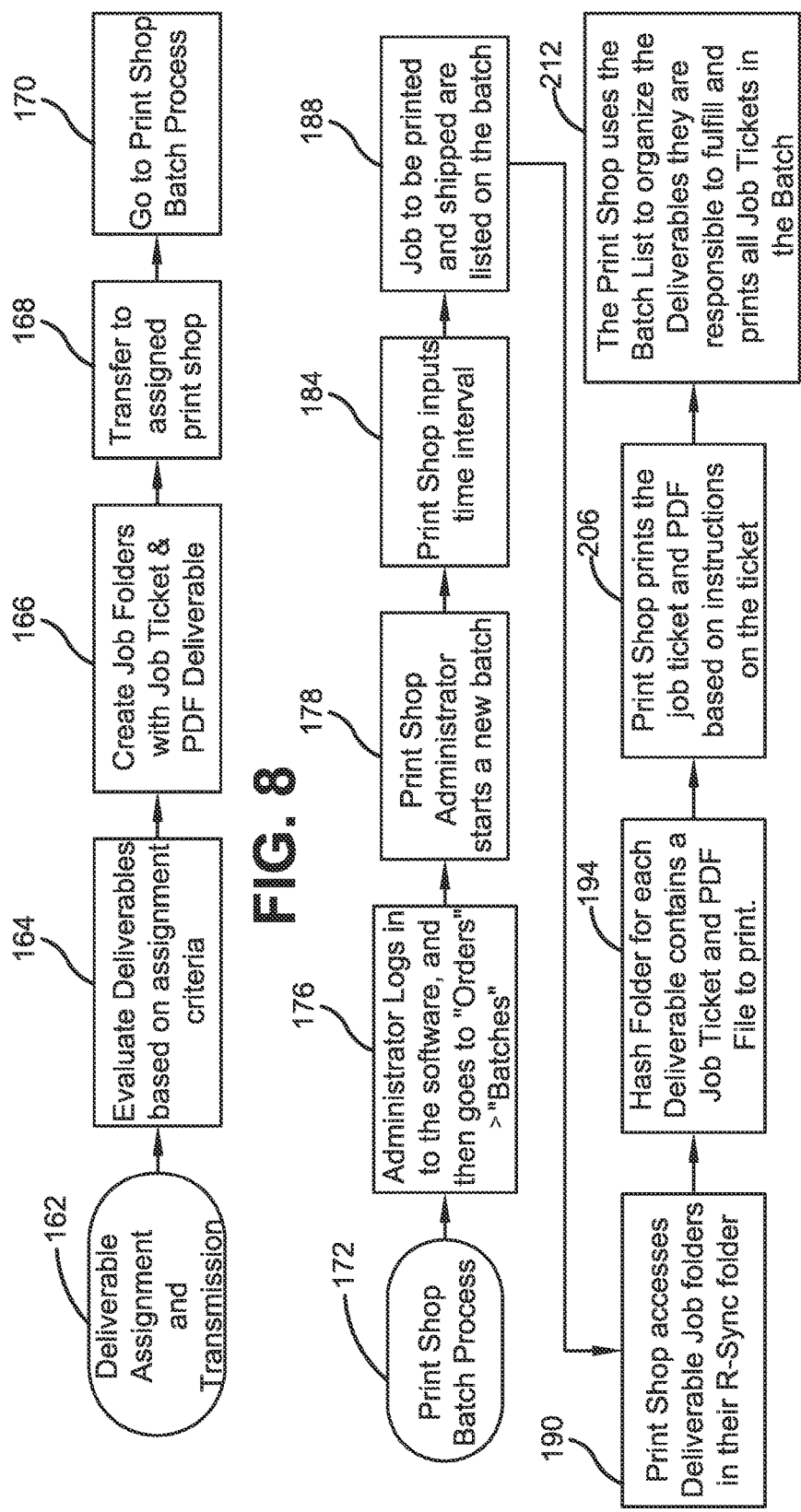

FIG. 16 printMe①com  Home  PDF Builder ☆new☆  PDF Hosting ☆OER☆  How it Works  FAQ  Sustainability  Blog  Contact  Login

CONTINUE WITH MY ORDER

← Go back without making any changes

Here you can upload a CSV file containing multiple addresses to send your uploaded files to.
If you need to upload more PDF files to your order, go back and do that first.
Each row in your CSV should represent an address. The columns in your uploaded CSV are very important, so listen carefully.
I shall say this only once.

| 1 | 2 | 3 | 4 | 5 | 6 | 7 | 8 | 9 | 10 | 11 | 12 |
|---|---|---|---|---|---|---|---|---|----|----|----|
| A | B | C | D | E | F | G | H | I | J | K | L |
| Filename | Quantity | Shipping | Name | Email | Phone | Company | Address 1 | Address 2 | City | State | Zip |

- Column 1: The filename you wish to be sent to the address on line this (this needs to match exactly to the filename as it was uploaded to the order). If you want the address to receive all the files in this order, simply leave this blank, rather than repeat the address lots of times.
- Column 2: The number of copies to send to this address. If you leave it blank we'll set it to 1.
- Column 3: The Shipping Method to use, by default, we'll use USPS Standard, possible values are:
  ○ usps standard: USPS Standard, 4-9 days in transit
  ○ usps priority: USPS Priority, 3-4 days in transit
- Column 4: The full name of the recipient.
- Column 5: The email address of the recipient (for postal tracking purposes).
- Column 6: The telephone number of the recipient (for postal tracking purposes).
- Column 7: The company name at the address.
- Column 8: The first line of the recipient's address.
- Column 9: The second line of the recipient's address. (if applicable).
- Column 10: The town or city of the recipient.
- Column 11: The state of the recipient.
- Column 12: The ZIP code of the recipient.

When you upload a CSV file, this won't actually modify the order until you click the Apply button below.

☑ Ignore the first row (it contains column headings).

[Choose File] no file selected

← Go back    Screenshot    nges

My account     ✖

Profile     Balance     Billing Address     Hosting     Approvals     —224

Upload new PDF's to our hosting service, or find details on our previous uploads. We aim to review all new uploads within 48 hours.

If you have any about our hosting service, please contact us.

> By uploading a file, I hereby agree to only use the printMe1 hosting service for PDF's I own the copyright to, or, are PDF's licensed as CC0, CCBY, CC BY-SA, CC BY-ND, CC BY 4.0, CC BY 3.0, or, are CC BY-NC, CC BY-NC ND and I agree will be printed by students or bookstores for educational uses in a course I am teaching or representing, or, are pdf's exclusively containing content in the public domain. I also acknowledge printMe1.com only ships to addresses in the United States.
>
> PrintMe1 reserves the right to reject any submissions that in our sole opinion do not meet the above requirements.
>
> Note: You must have all rights necessary to allow us (egrafa, inc) to reproduce the materials, prepare derivative works of the materials in any and all forms, distribute the materials and to display the materials that you submit to the printMe1.com service.

[Choose File] no file selected    —226

| Approved | Title | Details | |
|---|---|---|---|
| ✎ ✓ | PDF Portal Test PDF Microbiology -A-Laboratory Experience-1530561883-1.pdf | B/W<br>No binding<br>USPS Standard (4-9 days in transit)-<br>FREE | ⬇ |

FIG. 29     ( ✕ Close )     —222

My account     ✖

Profile    Balance    Billing Address    [Hosting]    Approvals

< Back to list

If you have any questions about our hosting service, please contact us.

Content under review. We'll email you when it's been verified.

File uploaded successfully, please complete the form below to help with our approval process.

Title    —232    Filename
[1-Sample.pdf]    [1-Sample.pdf]

(Optional) These materials are provided by

Your organization name    —234

ABN (optional, if applicable)

[ ] Ask Google not to index the page

Copyright Authorization

To host a PDF, we need to confirm that you have the relevant permission or license for us to print it.

Copyright Status

[CC-NC licensed Open Educational Resource (OER) I am using in a course. ⇅]

FIG. 30    ( ✕ Close )    —228

My acccount ✖

Additional notes to tell us something

Default options for ordering a print
If visitors want to order a print directly, these are the default options that will be selected when they get to the checkout, but they will be able to change them if they wish. — 238

Color
[ B/W ⇕ ]

Binding
[ No binding ⇕ ]
Browse our binding options

Shipping
[ USPS Standard (4-9 days in transit) - FREE ⇕ ]

Permissions

☐ Allow downloads — 244
If you want people to be able to order a print, but not download the digital copy.

☐ Pay for prints using my account balance — 246
Users will be able to order a print for free (you'll be charged instead), but if they change the color or binding options they'll pay the difference.

☐ Require approval before someone can order a print — 242
You will be notified by email whenever an order is placed, and will need to approve it, before we print it.

( Save changes )  ( ✕ Cancel )         ( 🗑 Delete )

( ✕ Close )
↖ 236

My acccount ✕

Default options for ordering a print

If visitors want to order a print directly, these are the default options that will be selected when they get to the checkout, but they will be able to change them if they wish.

Color
[ B/W ⇅ ]

Binding
[ No binding ⇅ ]
Browse our binding options

Shipping
[ USPS Standard (4-9 days in transit) - FREE ⇅ ]

Permissions

☐ Allow downloads
If you want people to be able to order a print, but not download the digital copy.

☐ Pay for prints using my account balance
Users will be able to order a print for free (you'll be charged instead), but if they change the color or binding options they'll pay the difference.

— 242

☑ Require approval before someone can order a print
You will be notified by email whenever an order is placed, and will need to approve it before we print it.

( Save changes )   ( ✕ Cancel )                              ( 🗑 Delete )

( ✕ Close )

| | | | | |
|---|---|---|---|---|
| My account | | | | ✕ |

Profile | Balance | Billing Address | Hosting | Approvals

Account Balance is $0.00

( 💳 Topup ) ─ 296

| Date | Amount | Order | Card Topup | |
|---|---|---|---|---|
| November 9th, 2020 15:10 | 5.00 | | **** **** **** 2797 | 📥 Receipt |
| December 9th, 2020 00:55 | -15.34 | 66876 | | 📥 Receipt |
| December 9th, 2020 01:01 | 200.00 | | **** **** **** 4242 | 📥 Receipt |
| December 9th, 2020 01:03 | 5.00 | | **** **** **** 4242 | 📥 Receipt |
| December 9th, 2020 16:27 | -14.52 | 66887 | | 📥 Receipt |
| December 10th, 2020 01:28 | -180.14 | 66890 | | 📥 Receipt |

✕ Close

Default options for ordering a print

If visitors want to order a print directly, these are the default options that will be selected when they get to the checkout, but they will be able to change them if they wish.

Color
[ B/W ⇅ ]

Binding
[ No binding ⇅ ]
Browse our binding options

Shipping
[ USPS Standard (4-9 days in transit) - FREE ⇅ ]

Permissions

☐ Allow downloads
If you want people to be able to order a print, but not download the digital copy.

☑ Pay for prints using my account balance
Users will be able to order a print for free (you'll be charged instead), but if they change the color or binding options they'll pay the difference.

☐ Require approval before I pay for it
You will be notified by email whenever an order is placed, and will need to approve it, before we print it.

( ✓ Save changes )  ( ✕ Cancel )          ( 🗑 Delete )

( ✕ Close )

Default options for ordering a print

If visitors want to order a print directly, these are the default options that will be selected when they get to the checkout, but they will be able to change them if they wish.

Color
[ B/W ⇳ ]

Binding
[ No binding ⇳ ]
Browse our binding options

Shipping
[ USPS Standard (4-9 days in transit) - FREE ⇳ ]

Permissions

☑ Allow downloads — 244
If you want people to be able to order a print, but not download the digital copy.

☐ Pay for prints using my account balance
Users will be able to order a print for free (you'll be charged instead), but if they change the color or binding options they'll pay the difference.

☐ Require approval before I pay for it
You will be notified by email whenever an order is placed, and will need to approve it, before we print it.

( ✓ Save changes )  ( ✕ Cancel )          ( 🗑 Delete )

( ✕ Close )

Order Your Print

Suggested color and binding can be changed at checkout. Shipping to US addresses only. Orders ship in 2 business days or less.

1-SamplePDF.pdf

3 Pages.

Suggested print type: B/W
Suggested binding: No binding
Price with suggested options including shipping: $11.99

Order a Print — 360

Download — 358

Ordering multiple PDFs? Just click "order a print" for each one, then checkout.

Are you an instructor using OER? Find out about our PDF Hosting Service. — 356

PRINTING SYSTEM OPERATED RESPONSIVE TO DATA BEARING RECORDS

TECHNICAL FIELD

Exemplary arrangements relate to a printing system that operates to produce printed content in response to data bearing records, which may be classified in US Class CPC G07F; USPC 235/379.

BACKGROUND

Printed content in various forms is widely used in personal and business activities. Commonly copies of printed content are uniformly mass produced in a central location. The copies of the printed content are then distributed to storage locations such as warehouses at which they are stored. Copies of the printed content are then further distributed from the storage locations to other locations such as to retail stores, use locations or to residential customers who have requested a copy of the printed content.

Systems for producing and distributing printed content items may benefit from improvements.

SUMMARY

Exemplary arrangements described herein relate to devices and methods that operate responsive to data bearing records to receive electronic copies of printed content. In some arrangements central system circuitry receives and stores an electronic printable content record. Multiple different printable content records may be transmitted and stored in at least one data store in operative connection with the central system circuitry. In situations in which the provider of one or more printable content records wishes to have one or more printed copies of one or more content records delivered to multiple recipients in geographically dispersed locations, the content provider provides record recipient records to the central system circuitry. In exemplary arrangements each record recipient record includes data identifying the content record to be provided and other data related to the printed copy or copies of the content record.

In exemplary arrangements each record recipient record may include data corresponding to the record recipient, the record recipient location or address, contact information for the record recipient, the quantity of printed copies of each content record to be delivered to the recipient, and the shipping method by which the printed copies of the content records are to be delivered.

In some exemplary arrangements the provider of the one or more content records may also provide to the central system circuitry at least one print details record which includes data related to producing the printed content record. In exemplary arrangements the at least one print details record may include data corresponding to one or more of a paper size, a paper type, a print type (such as black-and-white or color), the paper sides to print (single or double sided printing), a binding type (such as no binding, stapling, spiral binding or other binding) and other print details.

In the exemplary arrangement the central system circuitry is in operative connection with at least one data store that includes data regarding a plurality of printing operations. With regard to each operation there is stored associated data that corresponds to the geographic location of the printing operation, and a printing circuit system access address at which the printing operation can receive printable content records. In exemplary arrangements the at least one data store may also include other data regarding each printing operation. Such data may include capabilities of the printing operation, including print capacity, print type capabilities, binding type capabilities and other data corresponding to capabilities of the print operation and other data that may be used to determine whether the printing operation can carry out certain print job assignments. In exemplary arrangements the at least one data store also includes geographic data. The geographic data enables the central system circuitry to determine the proximity of requested content record delivery locations to the locations of the various printing operations.

In exemplary arrangements the central system circuitry is operative to make a determination of the printing operation that is in close geographic proximity to the designated delivery location of a printed copy of the content record. The central system circuitry operates to cause at least a portion of the content record from which a printed copy may be produced, to be delivered to a printing circuitry system access address associated with the printing operation that receives the job to produce the printed copy. In exemplary arrangements the printing circuitry system access address also receives a job ticket record that includes data regarding the recipient to which the printed copy is to be delivered and other details that enables the printing operation to produce the printed copy. The printing operation then produces the printed copies of the content records that have been assigned to the printing operation and causes them to be shipped to the respective print recipients.

The exemplary central system circuitry also operates to enable the content record provider to make payment for the production and shipment of the printed copies. The central system circuitry of the exemplary arrangement accepts payments from record providers through one or more of a credit card account, a debit card account and an electronic wallet account such as a PayPal or Venmo account, or other account.

In exemplary arrangements the central system circuitry further enables a remote record provider to upload a printable content record to be hosted. The hosted printable content record can be requested and received in a printed format by a plurality of geographically dispersed requesters. In exemplary arrangements the printed version of the hosted file may be produced by a printing operation that is in geographical proximity to the record requester. This reduces the cost of producing and transporting the printed versions of the hosted content records.

In some exemplary arrangements the record provider may arrange for payment of the costs associated with producing the printed versions of the content record that are delivered to record requesters. In other arrangements the central system circuitry may operate to require the record requesters may pay the charges for producing and delivering the printed versions of the content records. In some arrangements, the costs associated with production and delivery of the printed versions of the content records may be divided between the record provider and the record requester. In some exemplary arrangements the record provider may control which record requesters may receive printed versions of the content records.

Numerous additional features and capabilities are provided in the exemplary arrangement which is described in the following Detailed Description.

BRIEF DESCRIPTION OF DRAWINGS

FIGS. 2 through 10 are a schematic representation of logic flow carried out through operation of the central system circuitry of an exemplary arrangement.

FIGS. 11 through 21 are exemplary user interface outputs produced responsive to operation of the central system circuitry in connection with enabling a record provider to distribute printed copies of at least one printable content record to a plurality of content provider designated record recipients.

FIGS. 22 through 28 are exemplary user interface outputs produced responsive to operation of the central system circuitry in connection with achieving printing of content records for authorized record recipients.

FIGS. 29 through 50 are exemplary user interface outputs produced responsive to operation of the central system circuitry in connection with receiving printable content records, that are hosted by the system and causing the printable content records to be produced and delivered to record requesters.

DETAILED DESCRIPTION

Figure 1:
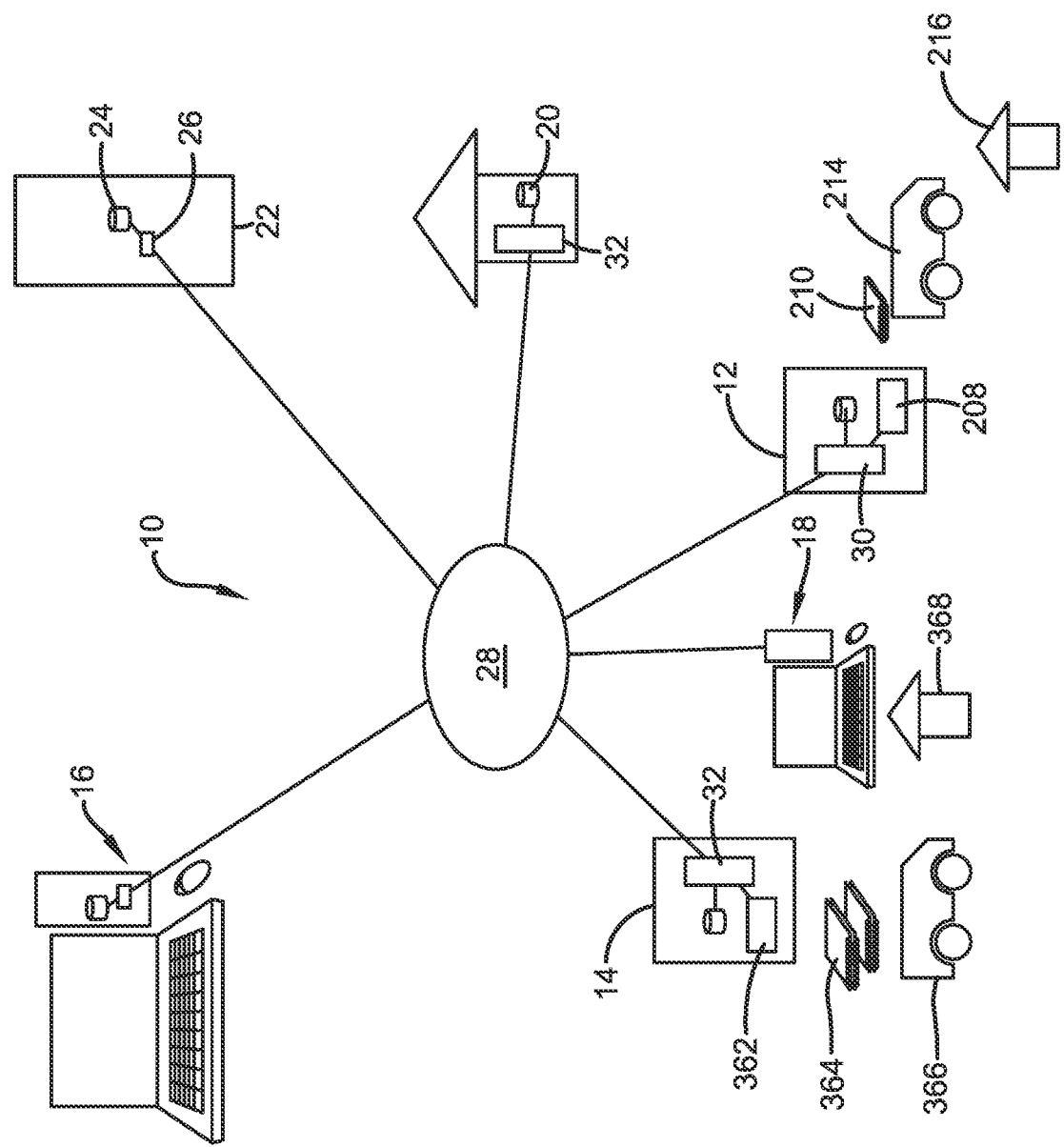
FIG. 1 is a schematic view of an exemplary printing system that operates responsive to data bearing records.

Referring now to the drawings and particularly to FIG. 1, there is shown therein an exemplary system generally indicated 10. The exemplary system operates in conjunction with plurality of printing operations two examples of which are schematically represented 12 and 14. In the exemplary arrangement the system operates in conjunction with a plurality of printing operations that are geographically dispersed. In exemplary arrangements the number and locations of the printing operations are such that recipients of printed copies of content records may have their printed copies produced at a printing operation that is in relatively close geographic proximity to the delivery address of the printed record recipients. This enables the printed copies of the content records to be produced locally and delivered to the record recipients with only a local delivery charge, or no delivery charge in situations where the record recipient may pick up the printed copy or copies at the printing operation.

The exemplary system further operates in conjunction with a plurality of printable content record providers. Each of the printable content record providers have at least one associated computer which is alternatively referred to herein as a remote record provider circuit, indicated 16. In exemplary arrangements content record providers provide one or more electronic printable content records that are to be printed and made available to record recipients. Content record providers may provide content records in PDF or other electronic formats from which printed documents may be produced. Content record providers may include individuals, institutions, businesses, government entities or other types of enterprises that wish to have printed versions of content records delivered to record recipients. As can be appreciated the remote record provider circuits may be located in widely dispersed geographical regions. This may include record providers located in different states, countries or on different continents from some or all of the record recipients.

The exemplary system further operates in conjunction with a plurality of record requesters. Record requesters include entities that request printed copies of hosted printable content records that are available through the system. Record requesters are associated with respective computers that are referred to herein as record requester circuits, indicated 18. As can be appreciated the remote record requester circuits may be associated with individuals, businesses, institutions, government entities or other entities that desire to receive printed copies of hosted printable content records.

The exemplary system 10 further operates in conjunction with at least one financial system schematically indicated 20. In exemplary arrangements the financial system may include a financial transaction processor such as a processor of credit card transactions, debit card transactions, check transactions, electronic wallet transactions or other financial transfers. It should be understood that although only one financial system is shown, in exemplary arrangements the exemplary system may be in operative connection with a plurality of different financial systems so that the system is enabled to process payments of numerous different types.

The exemplary system further includes central system circuitry schematically indicated 22. The exemplary central system circuitry may comprise one or more computer servers. Such servers may operate in some arrangements in virtual or distributed cloud type environments. The central system circuitry is in operative connection with at least one data store schematically indicated 24. The exemplary central system circuitry includes one or more circuits that are operative to communicate electrical signals and carry out the functions that are described herein. In the exemplary arrangement the central system circuitry includes at least one processor schematically indicated 26 which is in operative connection with the at least one data store 24. In exemplary arrangements the processor carries out circuit executable instructions that are stored in the at least one associated data store. The at least one processor may include or be in connection with one or more types of nonvolatile storage medium including instructions that include at least one basic input/output system. For example, processors may correspond to one or more of the combination of a CPU, FPGA, ASIC or any other integrated circuit or other type of circuit that is capable of processing data and circuit executable instructions. The one or more data stores may correspond to one or more of volatile or nonvolatile memories on media such as random access memory, flash memory, magnetic memory, optical memory, solid-state memory or other devices that are operative to store circuit executable instructions and data. Circuit executable instructions may include instructions in any of a plurality of programming languages and formats including, without limitation, routines, subroutines, programs, threads of execution, objects, methodologies, scripts and functions which may carry out the activities which are described herein. Structures for processors and circuitry may include, correspond to and utilize the principles described in the textbook entitled Microprocessor Architecture, Programming and Applications With The 8085 by Ramesh S. Gaonker, 6th Edition, (Penram International Publishing, 2013) which is incorporated herein by reference in its entirety. In exemplary arrangements the central system circuitry may include processors produced by Intel Corporation, Advanced Micro Devices and other processor manufacturers.

The exemplary one or more data stores used in connection with exemplary arrangements may include any one or more of several types of mediums suitable for holding non-transitory circuit executable instructions. These may include for example, magnetic media, optical media, solid-state media or other types of media such as RAM, ROM, PROMs, flash memory, computer hard drives, solid-state drives or other form of media suitable for holding data and circuit executable instructions. The exemplary central system circuitry may include other components such as hardware, software and wireless interfaces for communication with the numerous types of system circuitry in operative connection with the system.

In the exemplary arrangement the central system circuitry is in operative connection with one or more communication networks schematically indicated 28. In the exemplary arrangement the at least one networks 28 may include one or more wide area networks. Such networks may include public networks such as the Internet as well as other public networks. Exemplary networks in operative connection with the central system circuitry may also include local area networks and private networks that enable the carrying out of the functions and capabilities that are described herein.

In the exemplary arrangement the at least one data store 24 that is in operative connection with the central system circuitry 22 includes data corresponding to the plurality of printing operations. In the exemplary arrangement the at least one data store includes record data for each printing operation that includes data corresponding to a geographic location associated with the respective printing operation. The record data regarding a printing operation further includes a printing circuit system access address that is associated with at least one computer which is referred to herein as a printing circuit, that is associated with the respective printing operation. For example, printing operation 12 is associated with a printing circuit 30 and printing operation 14 is associated with a printing circuit 32. As can be appreciated, the printing circuits may include structures such as processors and data stores of the types previously described in connection with the central system circuitry.

The exemplary at least one data store associated with the central system circuitry further includes for each printing operation, data records corresponding to printing capabilities associated with each respective printing operation. In exemplary arrangements the records corresponding to the printing capabilities may include data corresponding to the types of binding capabilities that the respective printing operation is capable of carrying out. In some exemplary arrangements the data records corresponding to the printing capabilities of the printing operation may include print type capabilities, such as the nature of the printing that the printing operation is capable of printing. This may include data corresponding to the types of printing devices that each printing operation has available. The exemplary data records associated with printing operations may also include data corresponding to the capacity of the respective printing operation. This may include for example how many printed copies of a particular type that a printing operation can produce within a given time window. Exemplary data records associated with a printing operation may also include data corresponding to a financial account of an entity associated with the printing operation. The data corresponding to the financial account may enable the entity responsible for the printing operation to receive payments. Of course these types of data corresponding to printing operations are exemplary and other arrangements other types of data records may be included in the at least one data store.

In the exemplary arrangement the at least one data store also includes data records corresponding to at least one financial system and a financial circuit system access address corresponding to at least one computer associated with the respective financial system. In the schematic representation shown in FIG. 1 a computer which is referred to herein as a financial circuit 32 is associated with the respective financial system 20. Of course it should be understood that each financial system which is in operative connection with the central system circuitry 22 through the at least one network 28 includes at least one respective financial circuit. It should be understood that in some exemplary arrangements the one or more financial systems may include transaction processing systems that can carry out payment transactions. These may include payment transactions from users of the system who make payments which are received in an account of the entity responsible for operation of the central system circuitry. In other exemplary arrangements transaction processing systems may include transaction circuitry that can receive payments from customers and cause selected portions of the payments that are received to be credited to accounts associated with the entity associated with operation of the central system circuitry as well as respective accounts of respective entities associated with the plurality of printing operations. Of course it should be appreciated that the at least one data store of the central system circuitry also includes data records corresponding to other system circuitry with which the central system communicates in carrying out the functions that are described herein.

In an exemplary arrangement the central system circuitry 22 carries out a plurality of different functions and capabilities that enable the delivery of printed copies of content records to numerous geographically dispersed record recipients. An exemplary scenario that is enabled to be accomplished by the exemplary system circuitry is the delivery of a printed copy of a content record that is provided by a record provider, to numerous provider designated record recipients. An example in which such functional capabilities may be utilized may be a situation where a teacher is teaching a course online to a plurality of students that are located in numerous different cities throughout the country or in multiple countries. The teacher may wish to provide each of the students with a printed copy of course materials that the teacher has prepared. The exemplary central system circuitry may be utilized to deliver printed versions of the content records which comprise the course materials.

Another example of a situation in which a record provider may wish to have printed copies of content records produced, may include a business that wishes to have a designated set of customers who have acquired the products or services of the business, receive updated user manuals or other technical literature. The business may wish to have the customers receive printed copies of the content records so the customers have the latest operating information associated with using the products or services of the business.

Other examples may include the distribution by a content record provider of a periodical publication that is distributed to content recipients who are subscribers to the particular periodical. Exemplary approaches described herein may be utilized in connection with numerous different types of situations where a content provider wishes to deliver printed copies (which are alternatively referred to herein as printed versions) of content records to a provider designated group of content recipients.

Figure 2:
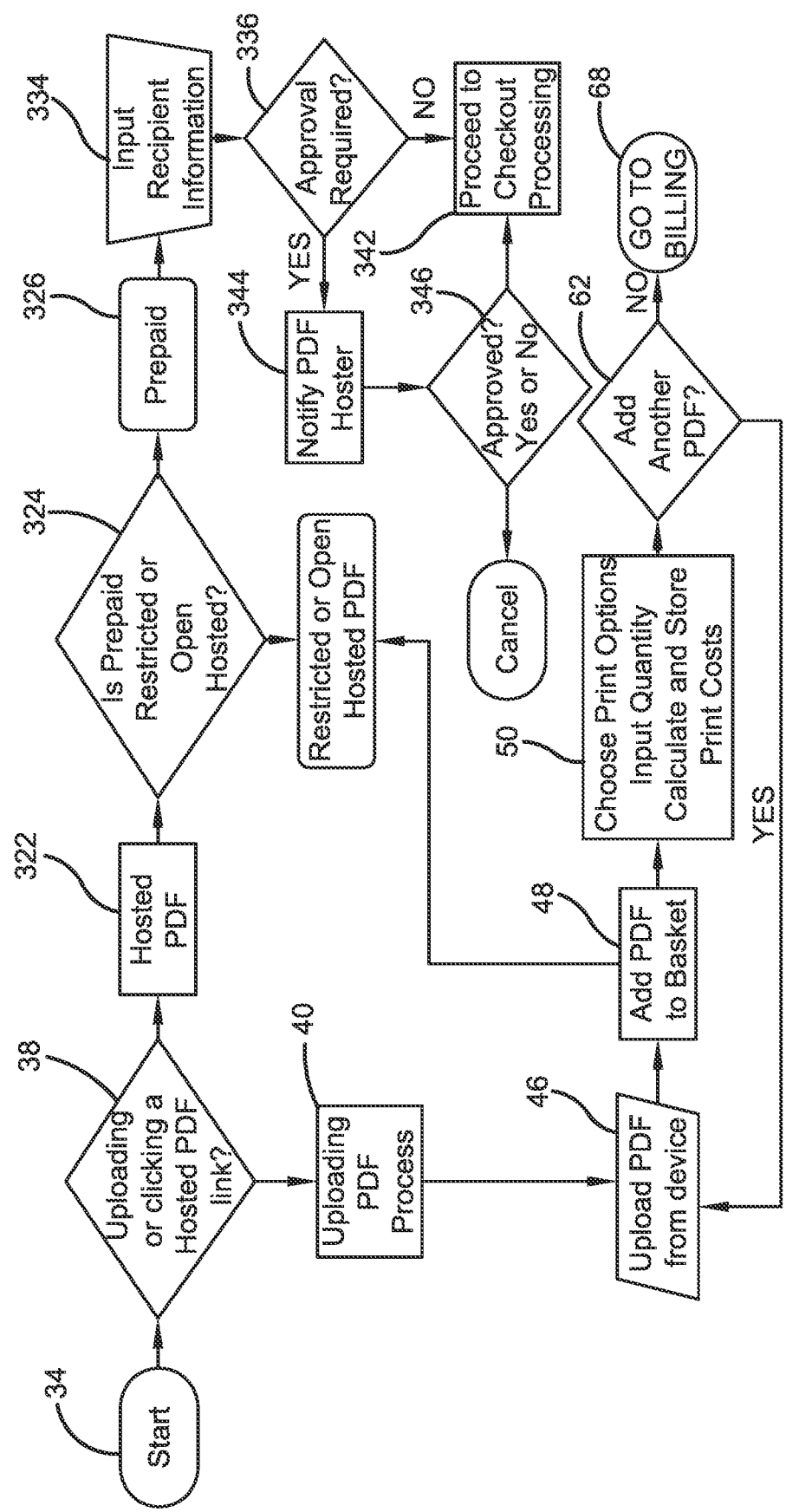
Figure 11:
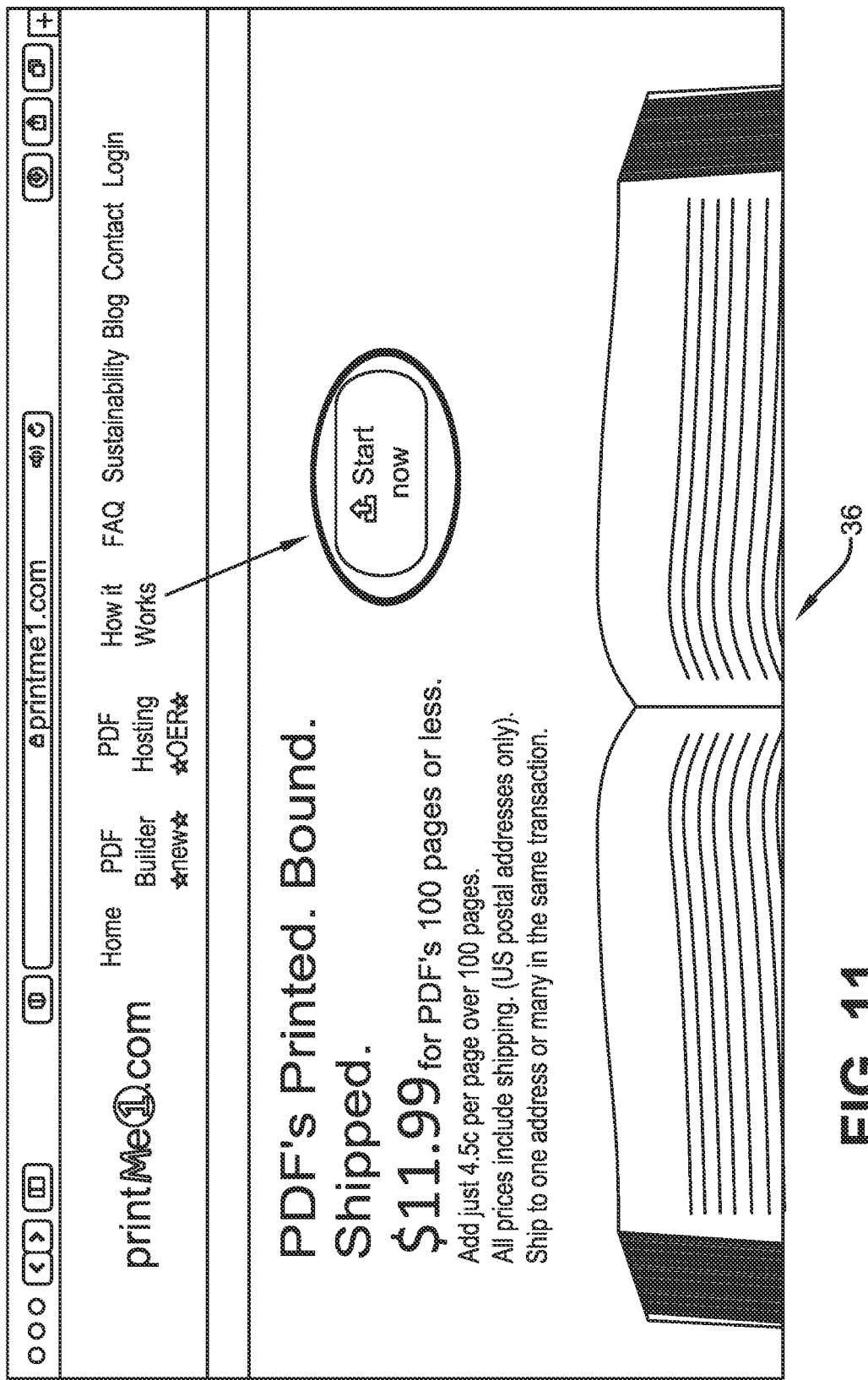

An example in which a provider of one or more printable content records utilizes the exemplary system to distribute printed copies of the content records to a plurality of designated record recipients, is described in connection with the schematic logic flow starting with a step 34 represented in FIG. 2. In the exemplary arrangement the content provider operates their remote record provider circuit 16 to access the central system circuitry 22 through the at least one network 28. The exemplary central system circuitry presents a website interface including an exemplary starting output screen 36 as shown in FIG. 11. In response to the starting output screen 36 which is presented to the record provider through a display in connection with the record provider circuit 16, the record provider is enabled to provide at least one input through at least one input device in connection with the record provider circuit to select an icon to indicate that the record provider wishes to upload at least one printable content record for distribution to a plurality of provider designated recipients. Input devices may include a keyboard, a mouse, a touch pad, a touch screen or a voice directed input device, for example. At least one message corresponding to the selection is received by the central system circuitry which operates responsive at least in part thereto to carry out the logic flow associated with the uploading of content records for distribution. This is represented in FIG. 2 by a step 38.

Figure 12:
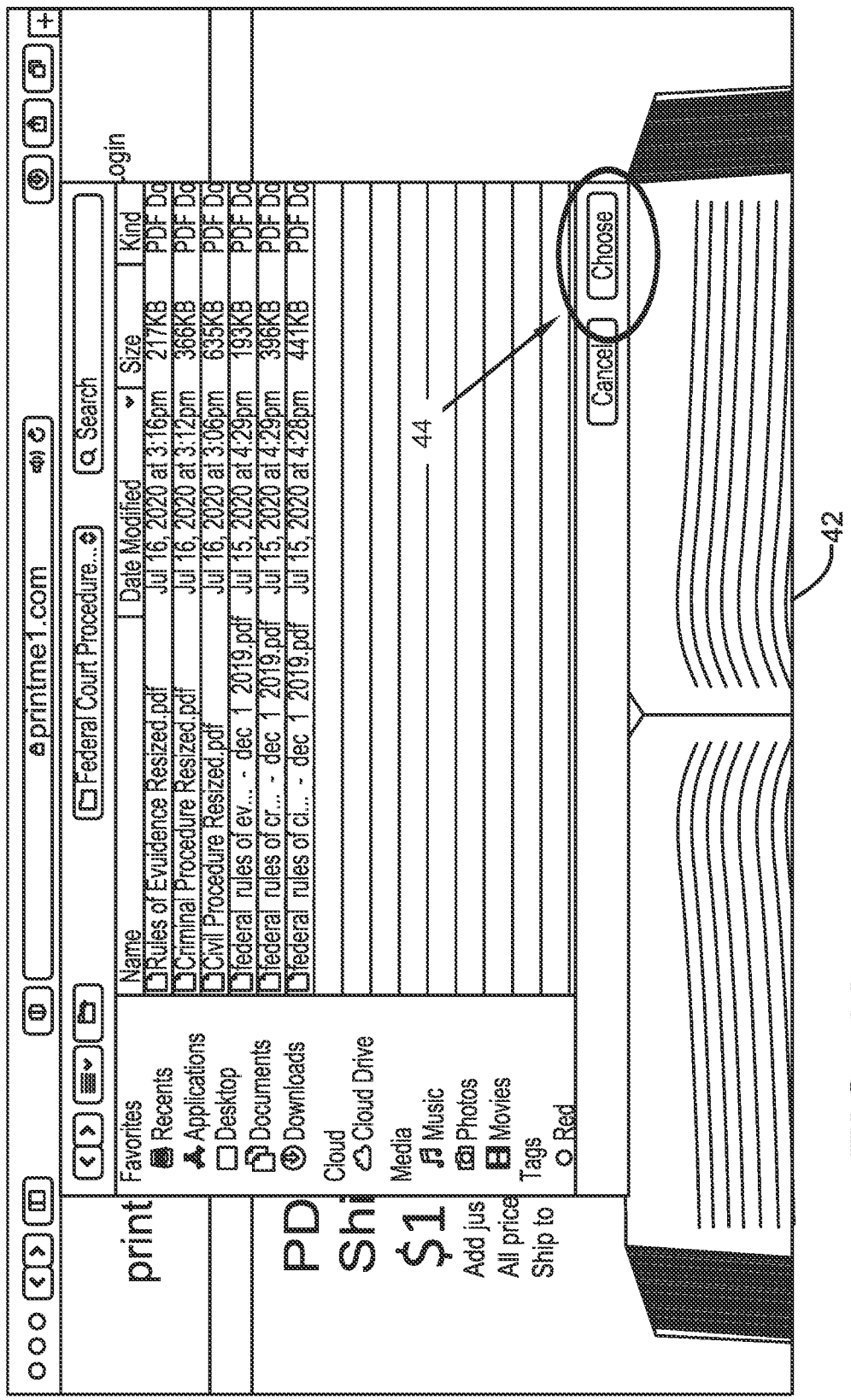

As represented by a step 40 the central system circuitry then operates to send one or more messages which cause outputs through the display or other output device of the record provider circuit 16 which guides the user in sending printable content records to the central system circuitry. An example of such a display screen 42 is represented in FIG. 12. As represented in FIG. 12 the content provider is enabled to select a printable content record through inputs to the remote record provider circuit 16, that the content provider wishes to upload to the central system circuitry. In the exemplary arrangement the record provider selects a content record that is to be transmitted to the central system circuitry by highlighting the respective content record and then providing an input through at least one input device of the record provider circuit selecting an icon 44. Responsive to selection of the icon 44 the selected printable content record is transmitted from the record provider circuit to the central system circuitry as represented by a step 46 in FIG. 2. The central system circuitry then operates as represented by a step 48 to store data corresponding to the content record that has been sent by the record provider in the at least one data store 24. In the exemplary arrangement the content record is sent through the network in a PDF file format which includes data corresponding to a title that has been associated with the file by the record provider circuit. Of course it should be understood that in other arrangements other types of file formats and record designating information may be used.

Figure 13:
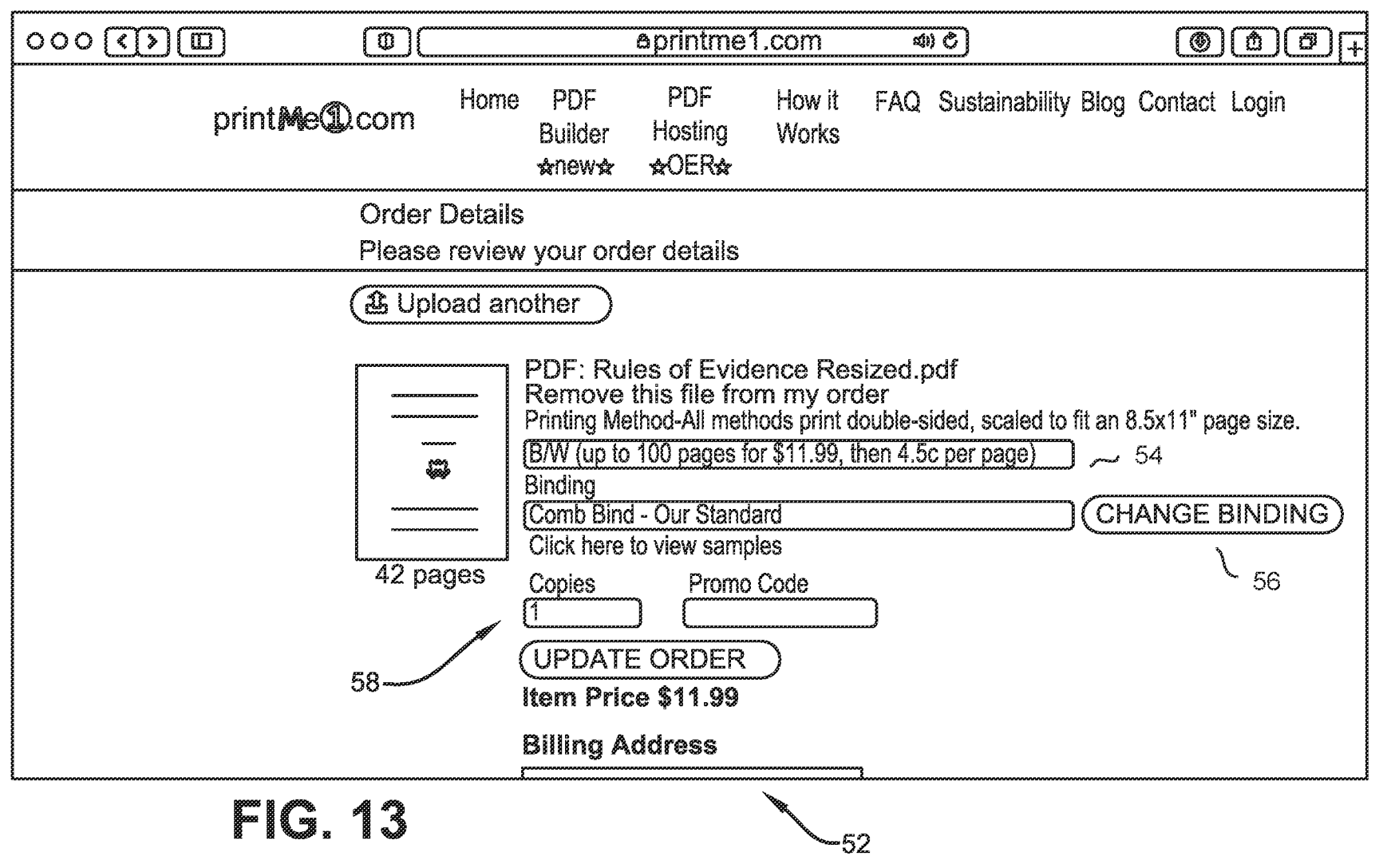

The central system circuitry 22 then operates in accordance with its circuit executable programming to receive from the remote record provider circuit 16, data that corresponds to at least one print details record as represented by a step 50. The at least one print details record includes data that is usable in the printing of the printed copy of the content record for the designated content recipients. In the exemplary arrangement the central system circuitry operates to communicate with the remote record provider circuit 16 to present through an output device, a display screen 52 that is shown in FIG. 13. In the exemplary arrangement the display screen 52 includes information that is used in producing the printed version of the content record for the record recipients. In the exemplary arrangement the at least one print details record includes data corresponding to the content record title and the paper size upon which the printed copy of the content record will be produced. In most situations the paper size is fixed through the data corresponding to the printable content record. However in some exemplary arrangements the content provider may be given the option to select the paper size by providing inputs responsive to the output display screen that are communicated to the central system circuitry. In the exemplary arrangement shown in FIG. 52 the content provider is enabled to provide inputs by selecting arrow icons 54 corresponding to a plurality drop-down menu options, and then selecting the desired option.

In the exemplary arrangement the record provider is enabled to select drop-down menu items related to certain available paper types, print types (such as black-and-white, 3 color, 4 color, full color) or other image features. The exemplary central system circuitry further provides the content provider with the capabilities to select the paper sides on which to print. This includes single-sided or double-sided printing. Of course these data items which are included in the at least one print details record and sent by the remote record provider circuit to the central system circuitry, are exemplary. In other arrangements different or other types of data may be included in the at least one print details record that is associated with the data corresponding to the printable content record in the at least one data store 24.

In the exemplary arrangement the record provider is also enabled to select a binding type to be used with the printed version of the content record. The central system circuitry operates responsive to its stored circuit executable instructions to output a default binding method to the record provider. The record provider is enabled to change the default binding type or method that is output by selecting an icon 56. The exemplary system circuitry enables the user to review a drop down menu and select the desired binding type option. Binding types may include for example, no binding, stapling, wire spiral binding, plastic tab binding, glued binding, multi-hole binding or other available binding types that are indicated as available in the stored data associated with the central system circuitry.

In the exemplary arrangement the record provider is also enabled to provide inputs through the remote record provider circuit that selects a quantity of printed copies of the particular content record that is to be provided to each record recipient. The quantity is selectable by the record provider providing inputs to the remote record provider circuit responsive to an icon 58. For example if the user wishes to have the particular record recipient receive ten (10) printed copies, the record provider is enabled to provide inputs that change the default single printed copy to the desired number of ten (10) copies. Of course it should be understood that these options which are presented to the record provider and which are included in the at least one print details record associated with the particular content record are exemplary, and in other arrangements other or additional print options may be provided.

In the exemplary arrangement the central system circuitry is then operative responsive to the data included in the at least one print details record associated with the content record, to calculate an item price for producing the requested printed copies. The central system circuitry then communicates with the record provider circuit 16 to cause the price for the printed copy to be displayed to the record provider as represented in screen 52.

Figure 14:
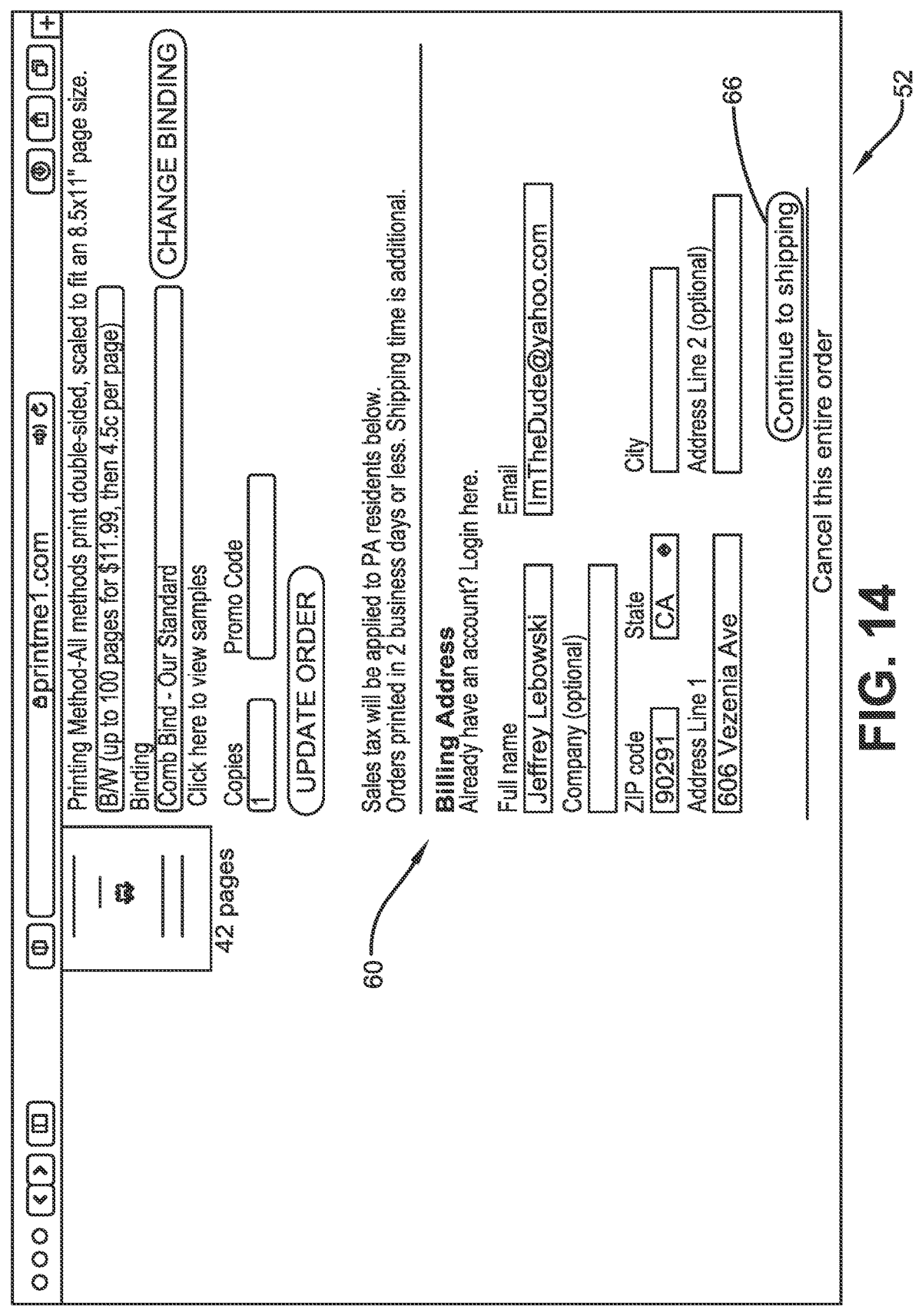

As represented in FIG. 14 the record provider is enabled to provide their billing name and address information to the central system circuitry. This is accomplished by inputting data in the billing address fields 60 as shown in FIG. 14. The remote record provider circuit 16 is then operative to cause the billing information to be transmitted to the central system circuitry 22 which operates to store the information in at least one data store. Of course it should be appreciated that the pricing and billing information as presented in the exemplary arrangement is merely an example of the type of data that may be utilized for purposes of identifying the content record provider and presenting the provider with the information regarding the cost of providing the printed copies of the content record.

As represented in FIG. 2 by a step 62, the central system circuitry is then operative in accordance with its stored circuit executable instructions to enable the record provider to send another content record to the central system circuitry. This is accomplished in the exemplary arrangement by the content record provider providing at least one input through an input device of the record provider circuit selecting icon 64 which is shown in FIG. 13. Responsive to the record provider selecting this icon, the steps related to communicating another selected content record, and providing print details record data associated with the additional content record are repeated. Thus the content provider is enabled to cause a plurality of printable content records and associated print details records to be stored in the at least one data store associated with the central system circuitry.

In other exemplary arrangements the central system circuitry may operate so that a content record provider may more quickly upload multiple printable content records. In such exemplary arrangements the central system circuitry may operate in accordance with its circuit executable instructions to provide prompts to the content provider through an output device of the content provider circuit, asking whether the content provider wishes to upload a plurality of content records. In exemplary arrangements the central system circuitry may enable a user to upload multiple PDF files to the central system circuitry at one time. In such arrangements the content provider may operate their computer to select via at least one input device, each of a plurality of printable content records that are to be communicated to the central system circuitry. The content provider is then provided with outputs corresponding to instructions to provide inputs and carry out steps that cause such selected records to be transmitted to the central system circuitry. The central system circuitry then operates to store in the associated at least one data store, the plurality of content records so that each of the content records can then be utilized and designated for printing and delivery in the same manner as content records that are uploaded one at a time. Further in other exemplary arrangements, the exemplary central system circuitry may enable the uploading of compressed files such as a ZIP file or other type format file, that includes large or multiple content records. In such arrangements the central system circuitry may operate in accordance with its circuit executable instructions to receive such records from the record provider circuit and to unpack and store each of such records in the at least one data store associated with the central system circuitry. Of course it should be understood that these approaches are exemplary and in other arrangements other approaches to facilitate the uploading of printable content records may be used.

Once the record provider has caused all of the electronic content records that will be printed for designated record recipients to be sent to the central system circuitry, the record provider is enabled to instruct the central system circuitry to proceed to the next step by providing at least one input to an input device of the remote record provider circuit. In the exemplary arrangement this is accomplished by the user providing an input by selecting and clicking on an icon 66 which is shown in FIG. 14. Responsive to the central system circuitry receiving at least one message from the remote record provider circuit corresponding to the selection, the logic flow proceeds to a step 68 as represented in FIG. 2. In the exemplary arrangement the logic flow proceeds to a step 70 represented in FIG. 3 that is associated with carrying out of a billing function. The logic flow then proceeds to a step 72 in which a determination is made as to whether the content records are associated with a hosted content record file. Because in the current example the content records are not going to be hosted, the logic flow proceeds to a step 74 which is associated with shipping of the printed versions of the content records to designated record recipients.

Figure 4:
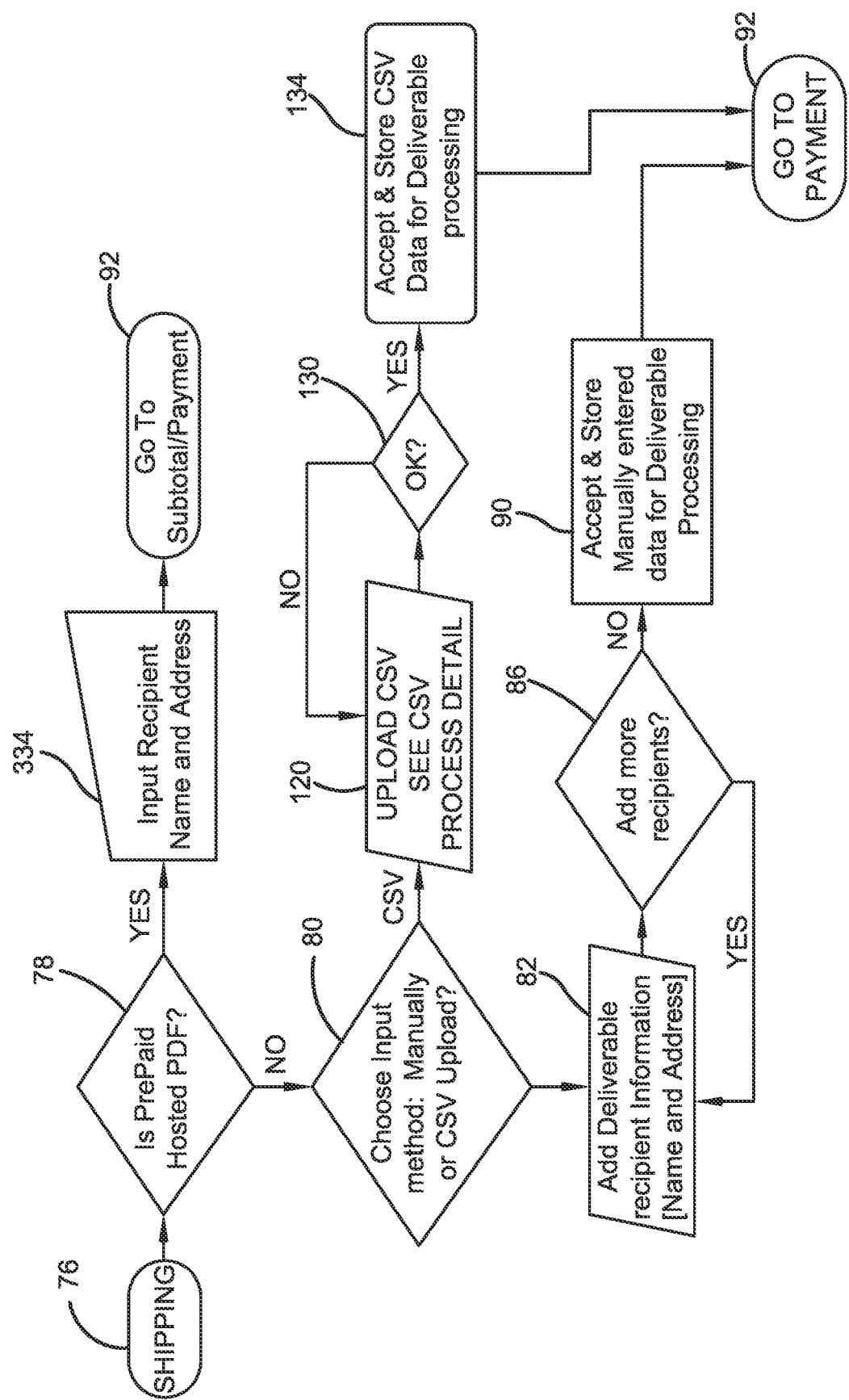
Figure 15:
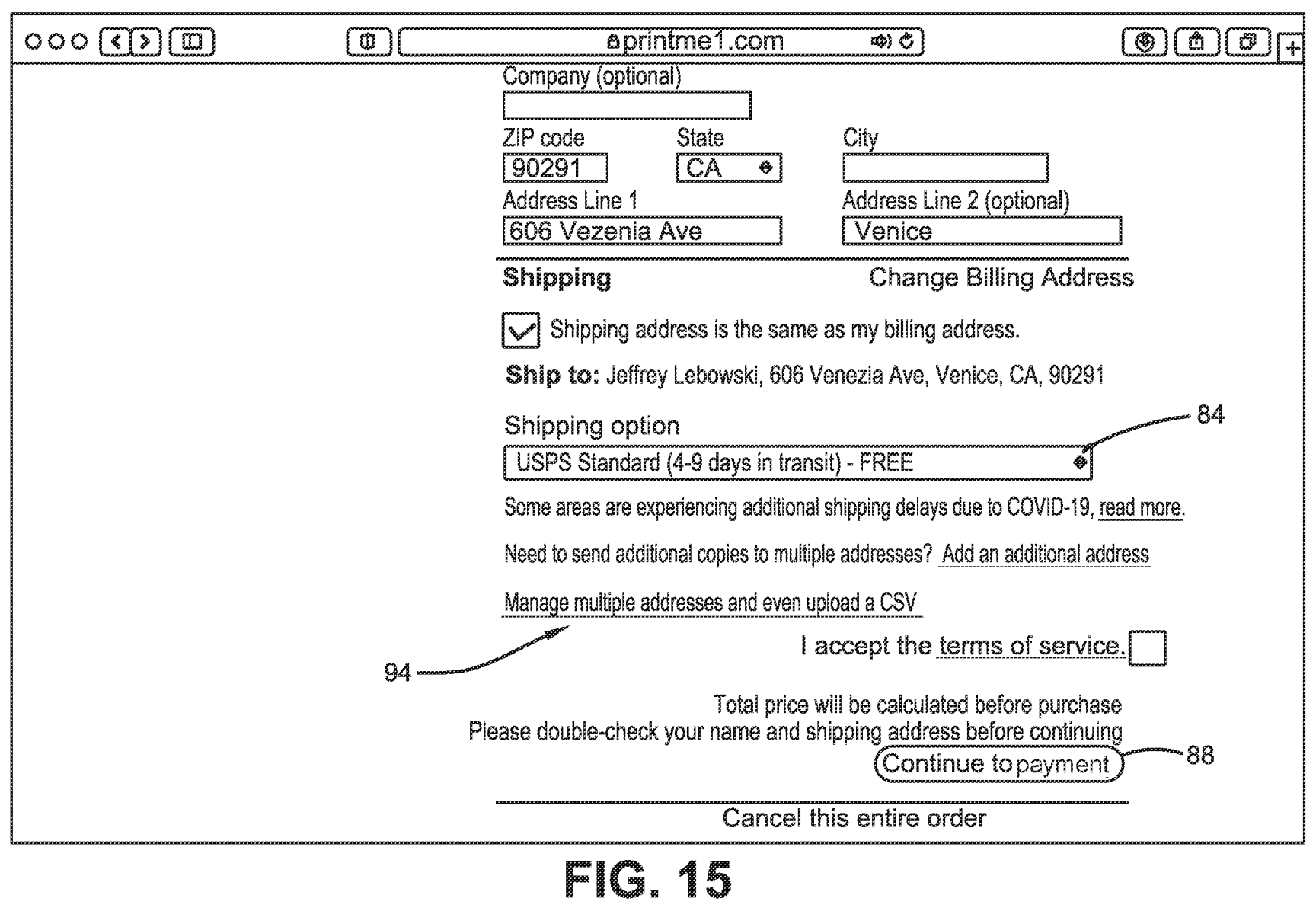

As represented by a step 76 in FIG. 4, the exemplary central system circuitry then operates as represented by a step 78 to make a determination as to whether the current printable content records are associated with a hosted transaction. As in this example the content records are going to be produced and delivered to record provider designated record recipients rather than hosted, the logic flow proceeds to a step 80. The exemplary central system circuitry is then operative in accordance with its programming to cause the remote record provider circuit to output the portion of screen 52 that is represented in FIG. 15. The central system circuitry provides the interface shown to enable the record provider to input the data regarding each of the designated record recipients through the presented interface. In the exemplary arrangement the content provider is enabled to provide through the interface, data which is included in the record recipient record associated with the respective content record(s) and the record recipient. As represented in FIG. 4 by a step 82 the record provider is enabled to provide a recipient name, a record recipient location such as a delivery address, and shipping method information for the delivery of the printed copy of the content records to the record recipient. In addition in exemplary arrangements the central system circuitry is operative to prompt the record provider to provide additional information regarding the record recipient such as contact information for the record recipient. This may include for example, an email address and/or phone number for the recipient of the printed record. In the exemplary arrangement after the record provider has provided the record recipient record data for one record recipient, the record provider is enabled to input record recipient record data for additional recipients by selecting icons 84. This is represented in FIG. 4 by a step 86.

In the exemplary arrangement the content provider is enabled to provide inputs corresponding to each of the record recipients that are included in a corresponding record recipient record until all of the record recipients and associated record data have been input. The record recipient record data is transmitted to the central system circuitry which operates in accordance with its circuit executable instructions to store the record recipient record data in the at least one data store. In the exemplary arrangement the record provider indicates that they have completed the input of all the record recipient data by providing an input selecting icon 88. This is also represented in the logic flow shown in FIG. 4 by a step 90. Selecting the icon 88 then causes the central system circuitry to proceed to the steps associated with the record provider making payment for the printed copies of the designated content records as represented by step 92.

In an exemplary arrangement rather than inputting the record recipient record data through a keyboard or other similar input device that is associated with the at least one record provider circuit 16, the record provider is enabled to provide the record recipient record data for all of the record recipients by uploading a file. This is done in an exemplary arrangement by the record provider selecting a text icon 94 shown in FIG. 15. Selecting icon 94 causes at least one message to be sent to the central system circuitry indicative that the record provider will provide the record recipient record data through submission of a file. This is also represented in the logic flow that branches from the step 80 as represented in FIG. 4.

In the exemplary arrangement the record provider is enabled to provide the record recipient record data for all of the record recipients in a comma separated value (CSV) file format. In the exemplary arrangement the record provider prepares the CSV file off-line either at the remote record provider circuit 16 or alternatively at a different computer workstation. In the exemplary arrangement the central system circuitry is operative to cause the remote record provider circuit to output instructions on the arrangement of the data elements in the record recipient record files. The instructions which are presented to the record provider in a display screen 95 are shown in FIG. 17.

An example of a CSV format file including record recipient data for plurality of record recipients is represented in FIG. 15. In the exemplary arrangement the record recipient record data that is provided for each record recipient includes 12 data fields which are arranged in columns as shown.

Figure 16:
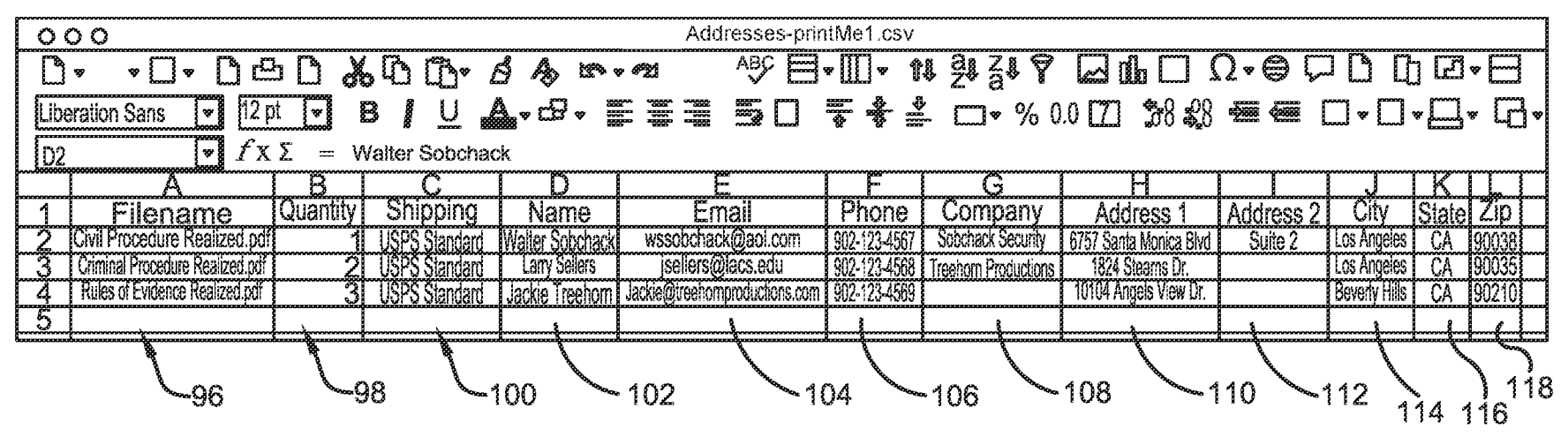

In the exemplary arrangement the exemplary record recipient record data for each record recipient includes data corresponding to the content record, which in the exemplary arrangement corresponds to the content record file. This is represented by the respective entries in Column A designated 96 in FIG. 16. The record recipient record further includes data corresponding to a quantity of the respective content record. This is represented by Column B which is designated 98. In the exemplary arrangement if no quantity data is included in connection with a content record, the central system circuitry operates to default the quantity data to a quantity of one. The exemplary record recipient record further includes data corresponding to a shipping method. This is represented by Column C which is designated 100.

Further in other exemplary arrangements the record recipient data for each respective record recipient may include additional types of data. This may include for example, data corresponding to the type of binding to be used for the printed copies of the content records that will be delivered to the respective record recipient. Other exemplary arrangements may include other types of data that correspond to the printed copies, such as the weight and type of paper to be used, the properties and types of covers to be applied to the printed records, or other features or properties of the printed content records. Alternatively or in addition other types of data may be included in the recipient record data. This may include for example, data which corresponds to a requirement that the printed copies be insured against loss or damage during delivery. Included data may also correspond to a requirement for sequential numbering of the printed content records, for example. Other types of data may correspond to the inclusion of security features, such as features that prevent copying or that provide embedded features that enable each copy to be identified. Other types of record included data may include data corresponding to a requirement that printed copies only be left with the recipient at the delivery address after receiving a signed acknowledgment of receipt by the recipient. Of course it should be understood that these types of record data are exemplary and in other arrangements other types of record data may be included which correspond to requirements in the production, printing, delivery or other aspects of the fulfillment of the requirements that have been set by the record provider or other entity associated with the printed copies of the content records.

The exemplary record recipient record data further includes data corresponding to the record recipient. In exemplary arrangements the data corresponding to the record recipient includes a record recipient name. This is indicated in Column D which is designated 102. Contact information is also provided in connection with each designated record recipient. In the exemplary arrangement the record recipient record includes contact information in the form of an email address for the record recipient. This is included in Column E which is designated 104. In the exemplary arrangement the record data further includes a telephone number associated with the respective record recipient. This data is indicated in Column F which is designated 106.

In the exemplary arrangement the record recipient record further includes data corresponding to a company with which the record recipient is associated. This information is included in situations where the record recipient is associated with a company or other organization. This data is included in Column G which is designated 108. The delivery address that is associated with the record recipient is included in the record recipient record. The street address data is represented in Column H which is designated 110 and in Column I which is designated 112. The city of the record recipient is set forth in Column J which is designated 114, and the state is set forth in Column K which is designated 116. The ZIP Code of the record recipient is set forth in Column L which is designated 118. Of course it should be understood that these data elements in each of the recipient records is exemplary and in other arrangements different or additional types of data may be included in each record recipient record.

Figure 18:
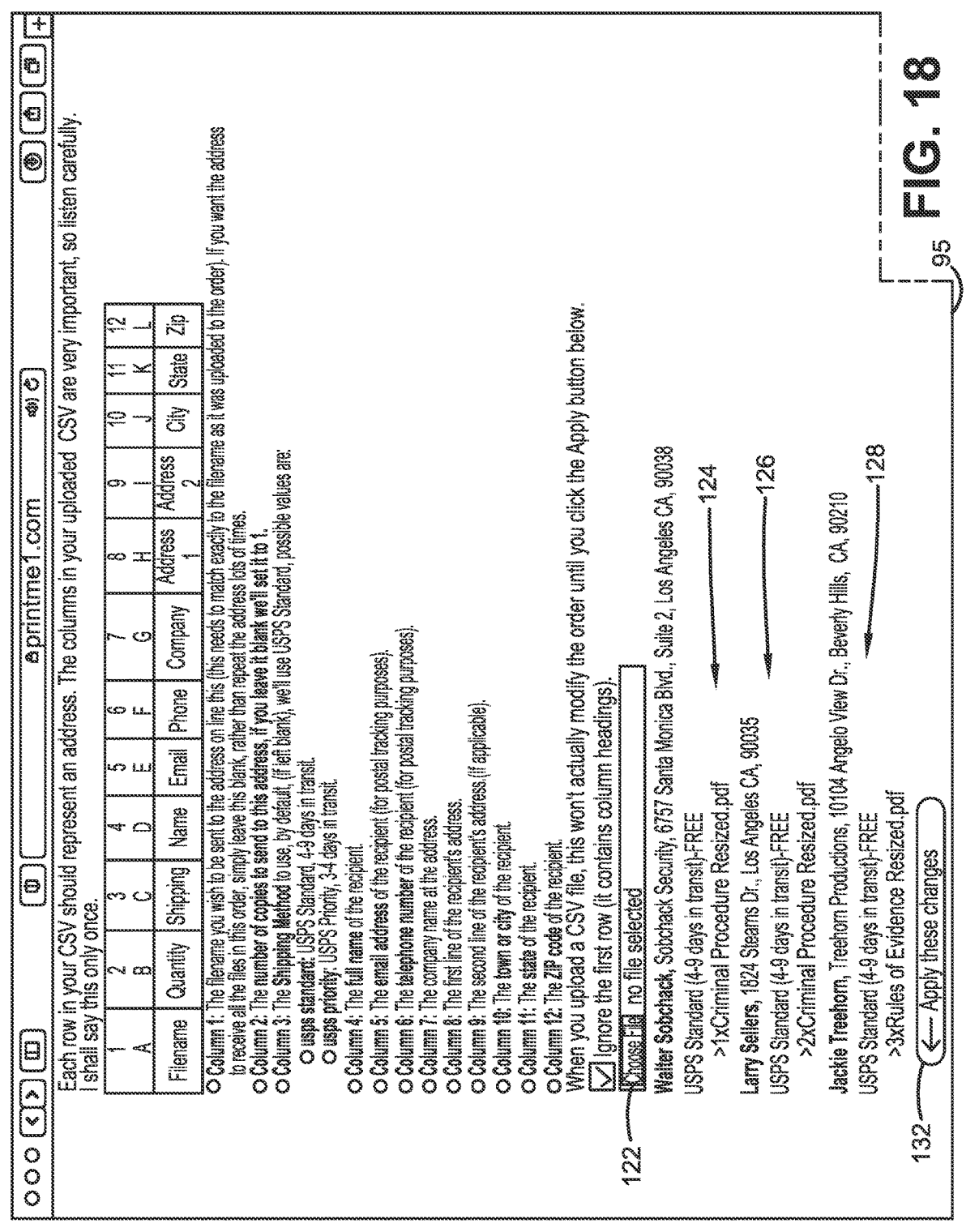

After the record provider has prepared the record recipient record data in the CSV file format, the record provider is enabled to send the record recipient record data to the central system circuitry. This is represented in the logic flow in FIG. 4 and in FIG. 5 by a step 120. The record provider is enabled to upload the CSV format file by selecting the icon 122 as represented in FIG. 18. In response to receiving the record recipient record data, the central system circuitry operates responsive to its stored circuit executable instructions to analyze the record recipient record data as represented in step 121 in FIG. 5. The central system circuitry is further operative to match the file names included in the record recipient record data to the content record files that have been previously uploaded by the record provider. This is represented by step 123 in FIG. 5.

Figure 5:
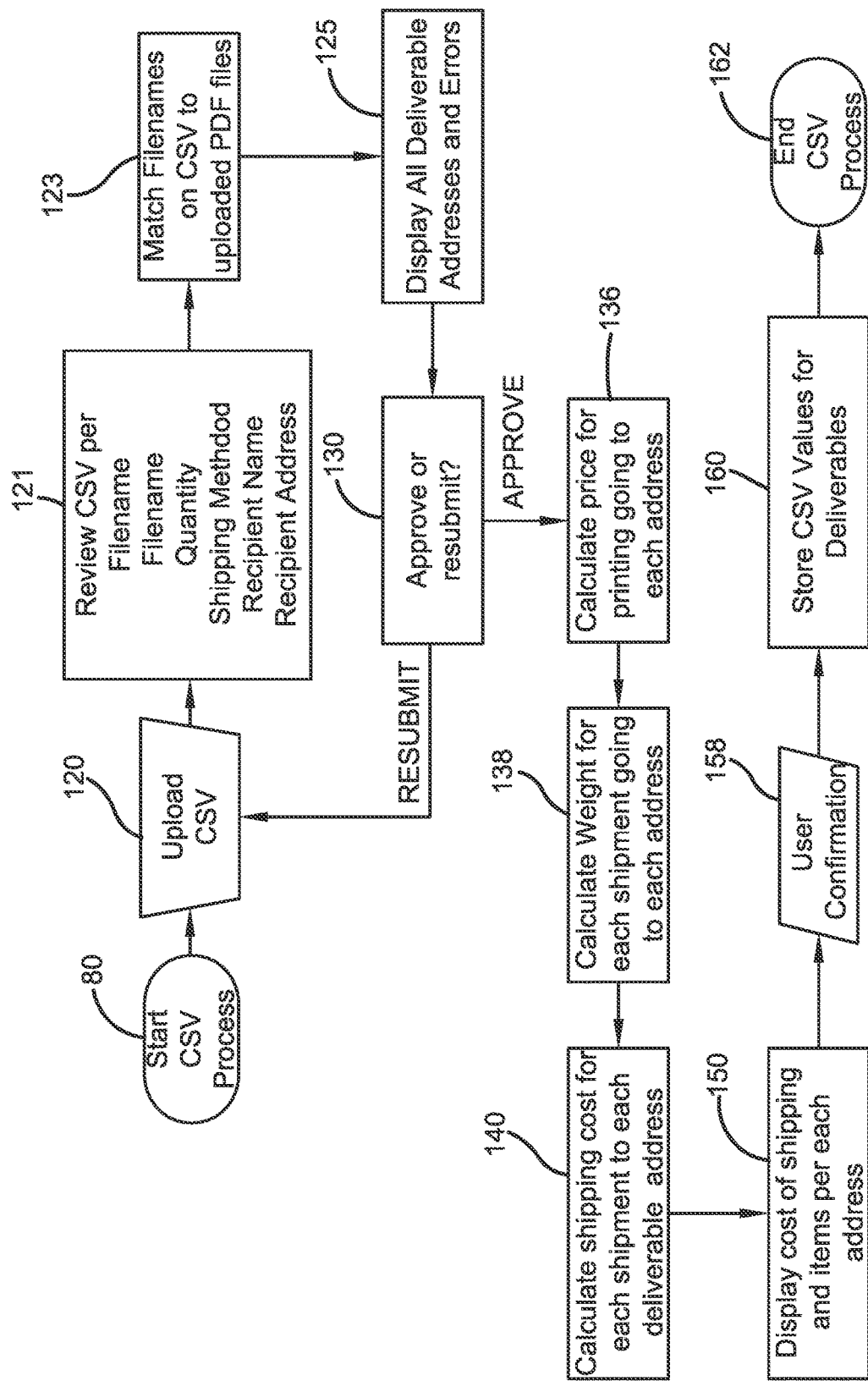

The central system circuitry is then operative to communicate with the remote record provider circuit 16 to cause the record recipient record data to be presented through the display or other output device in connection with the remote record provider circuit as represented in FIG. 5 by a step 125. As represented in FIG. 18 the record recipient record data is displayed for each record recipient. Data for three record recipients designated 124, 126 and 128 are shown. Of course as can be appreciated the record recipient record data for each record recipient will be displayed. The record provider is enabled to review the displayed record recipient record data and to make changes if necessary by correcting the record recipient record data by making changes to the CSV format record. This is represented in the logic flow shown in FIG. 4 and in FIG. 5 by a step 130. Once the record provider is satisfied with the record recipient record data for each recipient, the record provider so indicates by providing an input selecting icon 132 which is shown in FIG. 18. The selection by the record provider of icon 132 causes one or more messages to be sent to the central system circuitry which causes the record recipient record data to be stored in the at least one data store. This is represented in the logic flow in FIG. 4 by a step 134.

As represented in FIG. 5 the central system circuitry then operates in accordance with its stored circuit executable instructions to calculate the price of the printing of the printed content records to be provided to each record recipient. This is represented by a step 136. The weight of each shipment going to each record recipient is calculated based on data stored in the least one data store as represented by a step 138. The calculation is based on stored data on the weight of paper, binding materials and other components and the stored print details for each content record. The central system circuitry is then operative to calculate the associated shipping cost for each group of printed content record items that are being shipped to each record recipient. This is represented in FIG. 5 by a step 140.

In the exemplary arrangement the shipping cost is calculated based on transport rate charges which are determinable due to the expectation that the system will provide printing by a printing operation that is within a distance of the delivery address that results in the transport costs having a known price. It should be understood that in other exemplary arrangements the central system circuitry may be operable to determine the printing operation that will produce the printed copies of the content records and a distance to the respective record recipient delivery address from the printing operation, so as to determine the price for shipment prior to receiving the payment. Such alternative arrangements may operate in this manner in cases where the printing operation may not be within sufficient proximity to the delivery address so that the shipping cost can be determined without initially having resolved the designated printing operation for the particular print job. Of course these approaches are exemplary and in other arrangements other approaches may be used.

Figure 19:
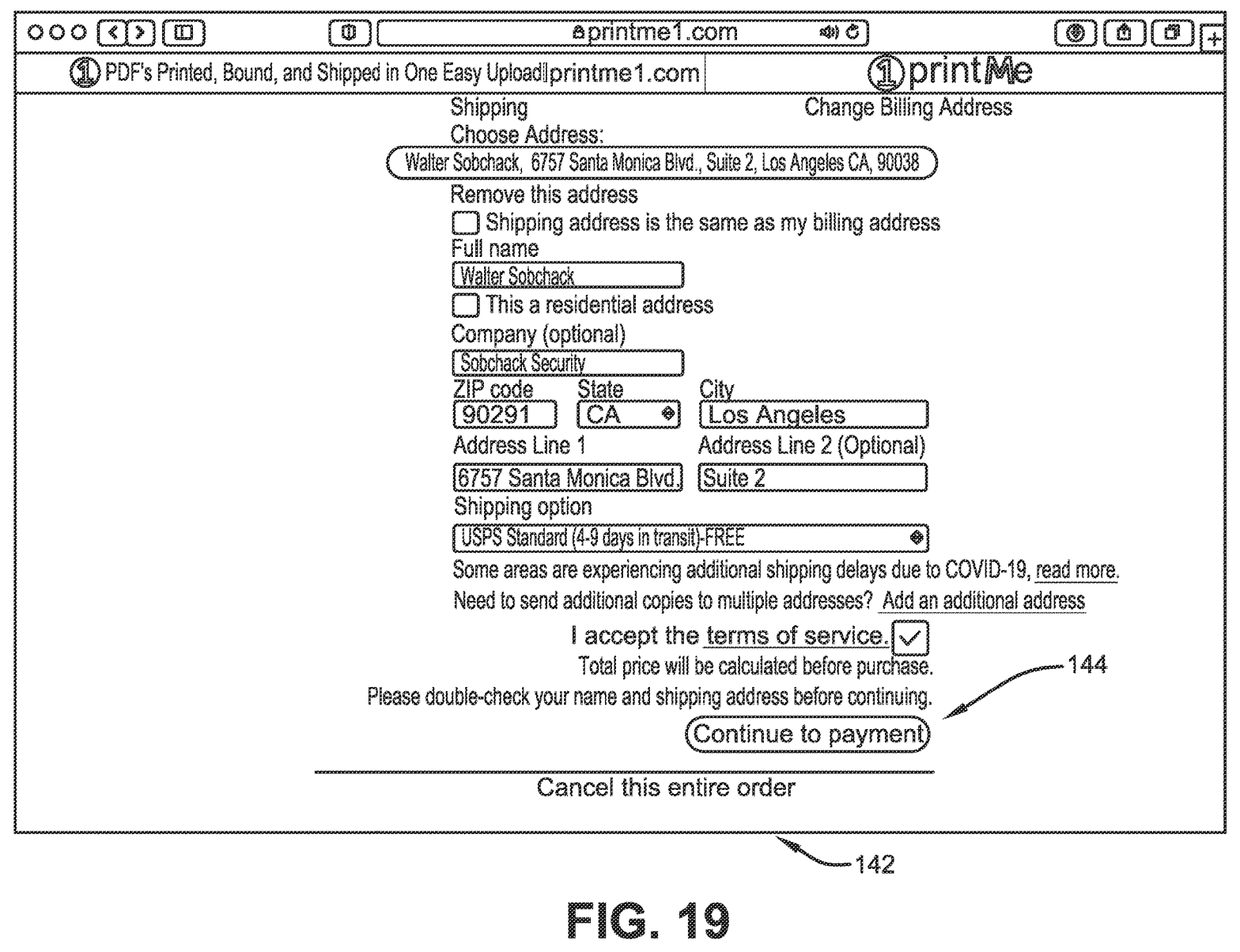
Figure 20:
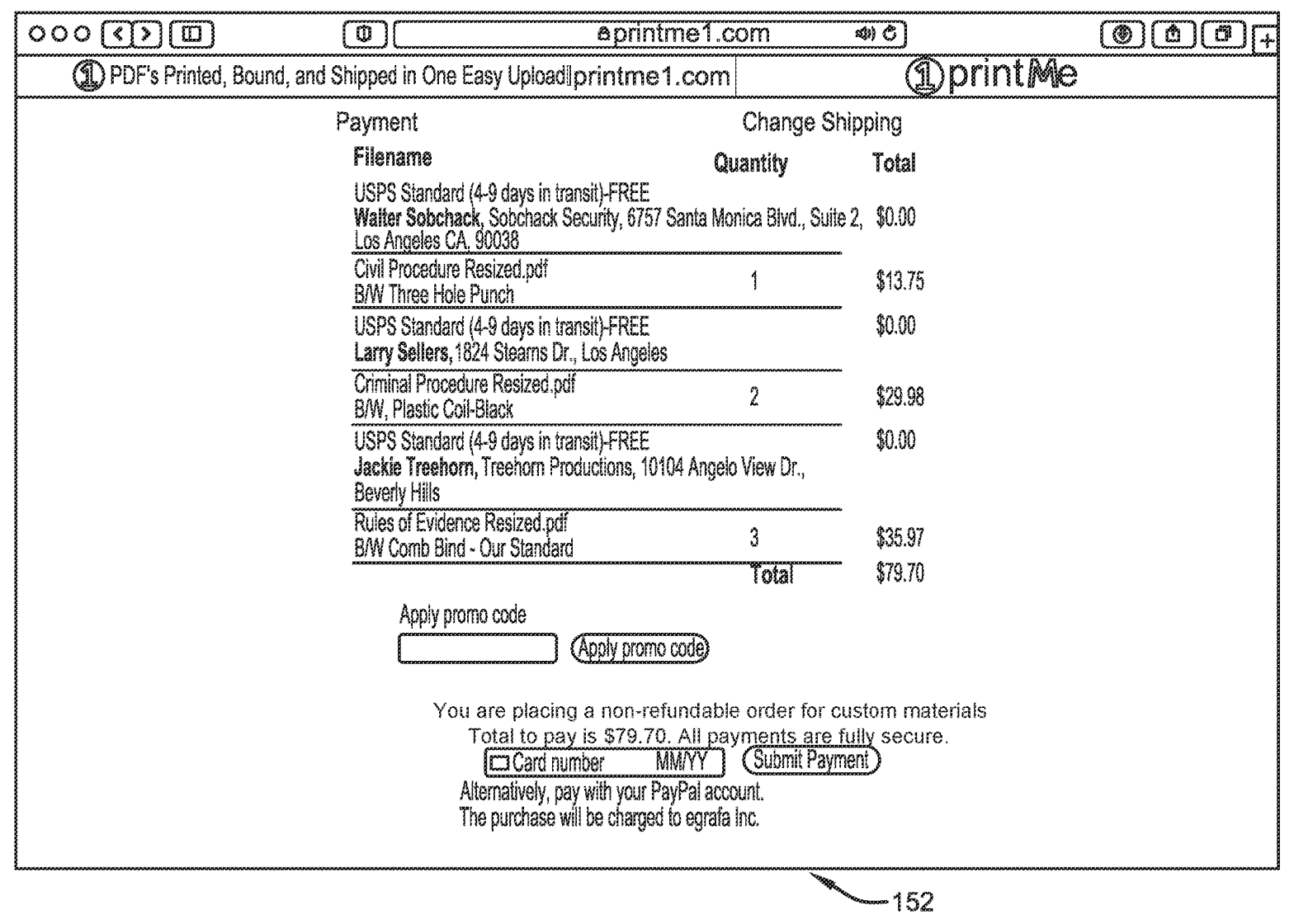

The exemplary central system circuitry is also operative to communicate with the remote record provider circuit 16 so as to cause the record provider to be presented with the final version of the record recipient data. This is represented by the display screen 142 shown in FIG. 19. The record provider confirms the information by providing an input selecting icon 144. Selection of icon 144 through an input device of the remote record provider circuit is operative to cause at least one message to be sent to the central system circuitry. As represented schematically in FIG. 6, the logic flow carried out by the central system circuitry is operative as represented by a step 146 to begin the payment logic. The circuitry then proceeds to a determination step 148 in which a determination is made that the situation does not correspond to distribution of a prepaid hosted content record. The circuitry then operates in accordance with its circuit executable instructions to send messages to the record provider circuit that causes the data related to the record recipients and the associated costs for printing and transport to be calculated in the manner previously discussed in step 140 and output through the display or other output device associated with the record provider circuit as represented by step 150. The display of the record recipient record data and the associated costs for printing and shipment that are output from a display of the remote record provider circuit 16 is represented by a display screen 152 shown in FIG. 20.

The exemplary system circuitry is also operative in accordance with its stored circuit executable instructions to determine the total amount due in connection with the distribution of the printed content records to all of the record recipients. In some exemplary arrangements the central system circuitry is operative to include in the amount due, any sales or value added taxes may be applicable to the particular transaction. Also as represented in screen 152 in FIG. 20, the record provider is enabled to provide an input to indicate promotional codes or other discounts which may be applied against the particular charges. Of course these options are exemplary and in other arrangements different or additional options may be provided.

Figure 6:
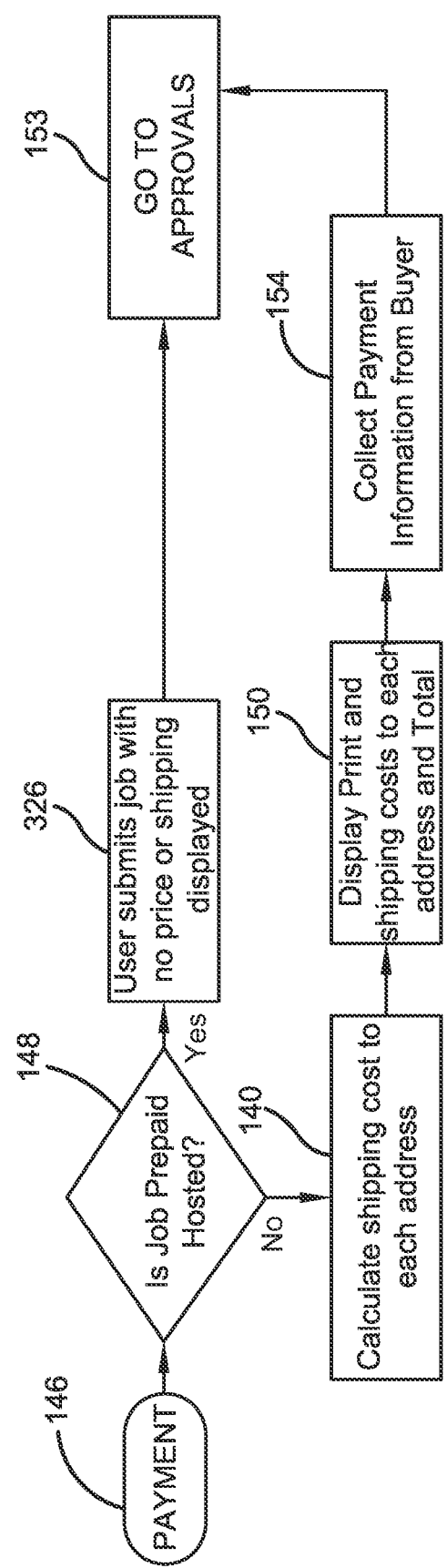
Figure 7:
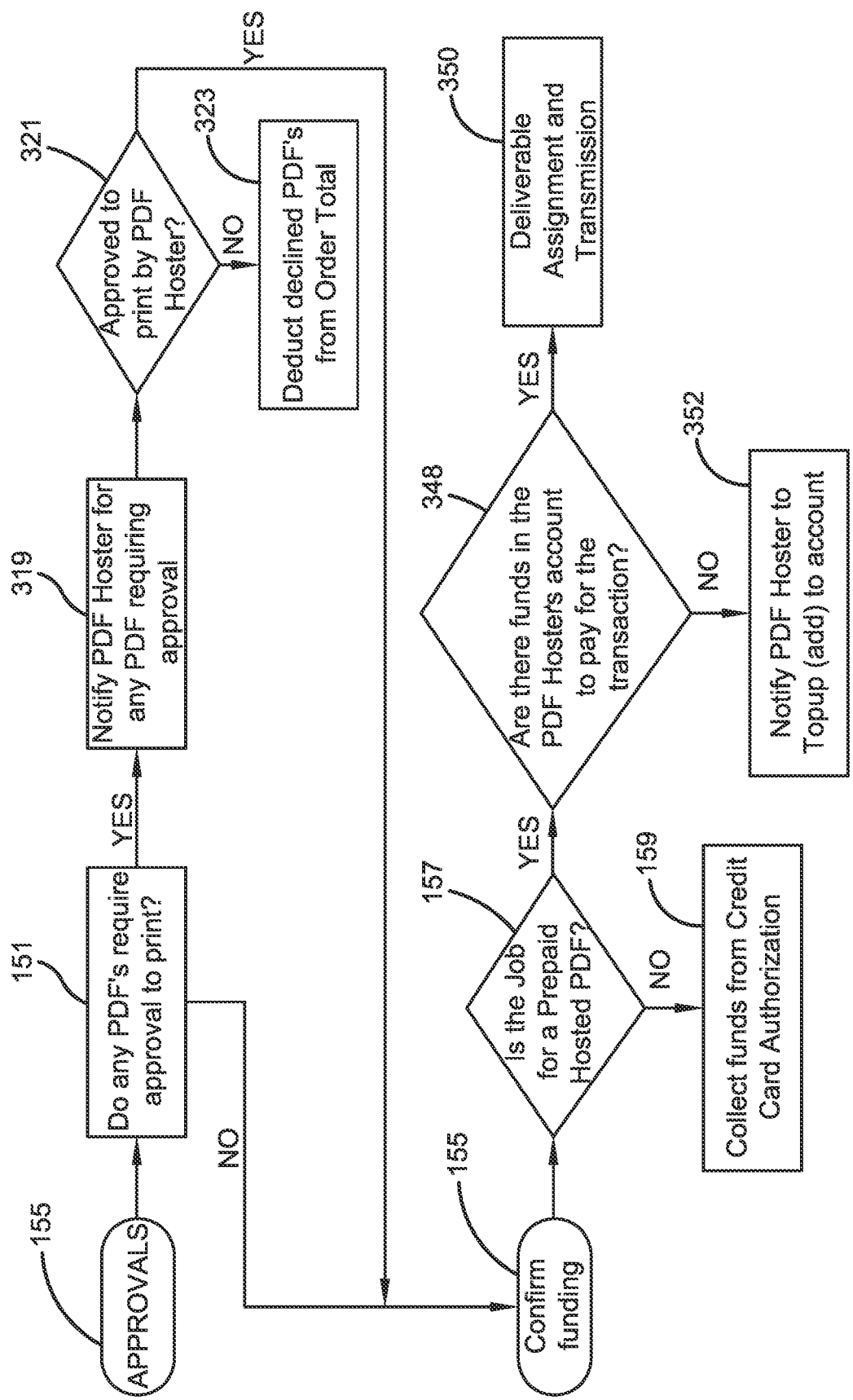
Figure 21:
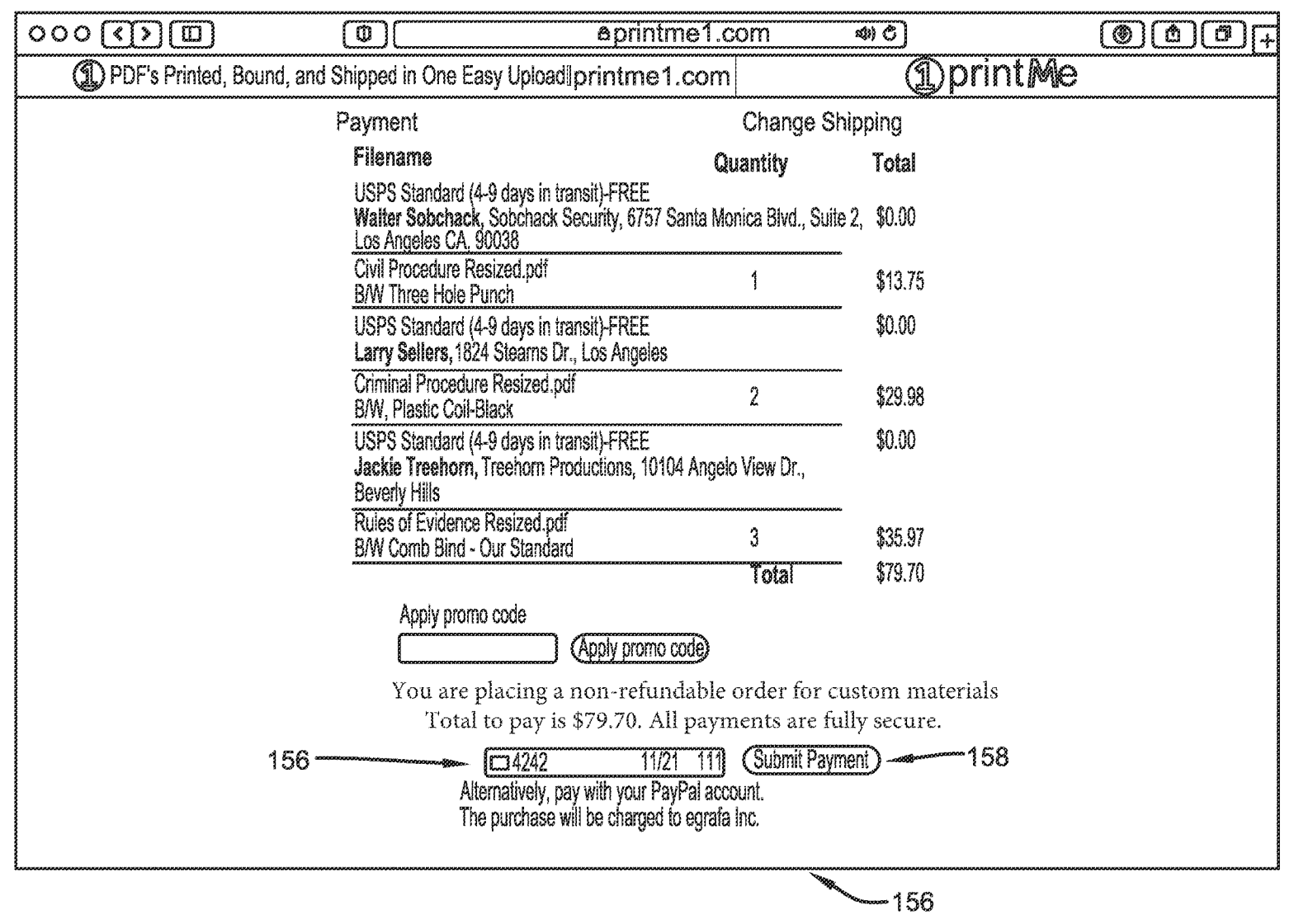

In the exemplary arrangement the central system circuitry communicates with the remote record provider circuit to receive from the record provider the payment information for purposes of paying for the printing and delivery of the printed versions of the content records. This is represented in FIG. 6 by a step 154. The logic flow as represented in FIG. 6 then proceeds as represented by step 153 to the approvals logic flow as shown in FIG. 7 and to a step 155. In a determination step 151 a determination is made that the current situation is not one in which a record provider approval is required to complete the printing process. As represented in FIG. 21 by a screen 156, the record provider is enabled to provide information regarding their associated financial account. In exemplary arrangements the user is enabled to enter financial account data in one or more fields 156, which data is usable to identify the financial account of the record provider. In exemplary arrangements the central system circuitry is operative to receive payments via a financial account associated with a credit card account, a debit card account, and an electronic wallet account such as a PayPal® or Venmo® account. Of course it should be understood that these financial account options are merely exemplary and in other arrangements other payment approaches may be used.

In response to the record provider inputting their financial account information, the record provider user is enabled to submit the payment by providing an input to the remote record provider circuit that corresponds to the selection of icon 158. In the exemplary arrangement the selection of icon 158 is operative to send at least one message to the central system circuitry 22. The central system circuitry then operates in accordance with its programming to cause one or more messages to be exchanged with the at least one financial circuit 32 at the financial system 20 which corresponds to the type of financial account to which the fees associated with the production and delivery of the content records will be charged. The financial circuit 32 operates in accordance with its programming to accept the transaction and cause the financial account of the record provider to be assessed the amount of the charges. The financial circuit is further operative to cause an account associated with the operator of the central system circuitry to be credited with the amount of the charges.

The financial circuitry is operative to indicate the acceptance of the charges to the central system circuitry. This is represented in the logic flow shown in FIG. 7 by a step 155. Of course it should be understood that in circumstances where the charges are refused by the financial circuit the transaction is denied. In such circumstances the central system circuitry 22 operates in accordance with its programming to stop the transaction and execute a recovery program so as to present the record provider with other options to make the payment or to cancel the transaction. The logic flow as represented in FIG. 7 then proceeds to a step 157 in which it is determined that the situation does not relate to a hosted content record. The transfer of funds carried out through the financial circuitry is then credited to the appropriate entity responsible for the operation of the central system circuitry as represented in FIG. 7 by a step 159. Of course these approaches are exemplary and in other arrangements other approaches may be used.

For example in some exemplary arrangements, the central system circuitry may operate to cause communications with financial circuitry associated with one or more payment processors to cause the funds corresponding to the charge made to the account of the record provider, to be dispersed as separate payments to an account of the entity associated with the central system circuitry and to the accounts of the one or more entities associated with the respective printing operations that print and ship the content records. For example in some exemplary transaction situations where the printing operations have been determined at the time that the charges are assessed to the account of the record provider, the central system circuitry may be operative to provide the stored record data regarding the account information for each of the printing operations and the respective amount corresponding to the portion of the charge to be received by each respective printing operation. In such exemplary situations the central system circuitry in conjunction with the financial circuit may be operative to cause payments corresponding to portions of the charge made to the record provider's account, to be received in the accounts of the entities associated with the printing operations as well as in an account of the entity associated with the operation of the central system circuitry. Of course this approach is exemplary and in other arrangements other approaches may be used for applying the funds received from the account of the record provider.

In an exemplary arrangement if the record provider financial account is successfully assessed the payment amount for the delivery of the printed copies of the content records, the central system circuitry then operates in accordance with its programming to treat the payment as user confirmation of the transaction as represented by a step 158 in FIG. 5. The central system circuitry is further operative responsive to the receipt of the payment to store the record recipient record data in associated relation with the content record in the content record data as represented by a step 160. The logic flow associated with the receipt and storage of the record recipient record data is then ended at a step 162.

In the operation of an exemplary arrangement, when it is not done prior to receipt of payment from the record provider, the central system circuitry is operative in accordance with its circuit executable instructions to make a determination of the respective printing operations that will be assigned the jobs of producing the content records for the respective record recipients. This is accomplished in exemplary arrangements through circuit executable instructions comparing the data corresponding to the location data such as the delivery address in each record recipient record, and the data corresponding to the stored record data which indicates the geographic location of each printing operation. In exemplary arrangements the central system circuitry uses the stored geographic data in the at least one data store to determine the proximity of each available printing operation and each respective recipient location to make a determination of the printing operation that is in the closest proximity to the recipient delivery location. The logic carried out by the central system circuitry in making this determination is represented in FIG. 8 by a step 162.

The central system circuitry is further operative to evaluate the record data in the at least one data store regarding the determined printing operation in closest proximity to the record recipient based on the location data in the record recipient record, to verify that the determined pending operation has the capabilities to produce the printed copies of the content records in accordance with the associated print details record data. The central system circuitry operates to assure that the initially selected printing operation has the capability to print items in accordance with the requirements in the associated print details records. In the event that the printing operation in closest proximity to the record recipient cannot carry out certain functions for producing the printed version of the content records as specified in the print details record, the central system circuitry operates in accordance with its circuit executable instructions to determine an alternative print operation in closest proximity to the record recipient location that has the necessary capabilities. In the exemplary logic flow this evaluation and revision of the designated printing operation is represented in FIG. 8 by a step 164. Of course in other exemplary arrangements other factors may be included in the analysis of determining which printing operation is assigned the print job. Such factors may include for example, avoiding taxes or tariffs based on the printing operation and record recipient being in different jurisdictions. The central system circuitry may also operate to distribute the print jobs to multiple printing operations to balance the work load and avoid giving one printing operation more jobs than can be done in a short time frame.

In the exemplary arrangement the central system circuitry then operates in accordance with its circuit executable instructions to arrange in electronic folders the print jobs to be provided to printing operations. The electronic folders include data corresponding to the content records for which printed versions are to be produced as well as other information which will enable the printing operation to produce the printed copies of the respective content record. In exemplary arrangements the central system circuitry is operative to generate in connection with each folder, a job ticket record. In exemplary arrangements the job ticket record includes at least some of the data from the associated record recipient record and associated print details record which are used by the printing operation to produce copies in accordance with the requirements of the content provider.

Figure 27:
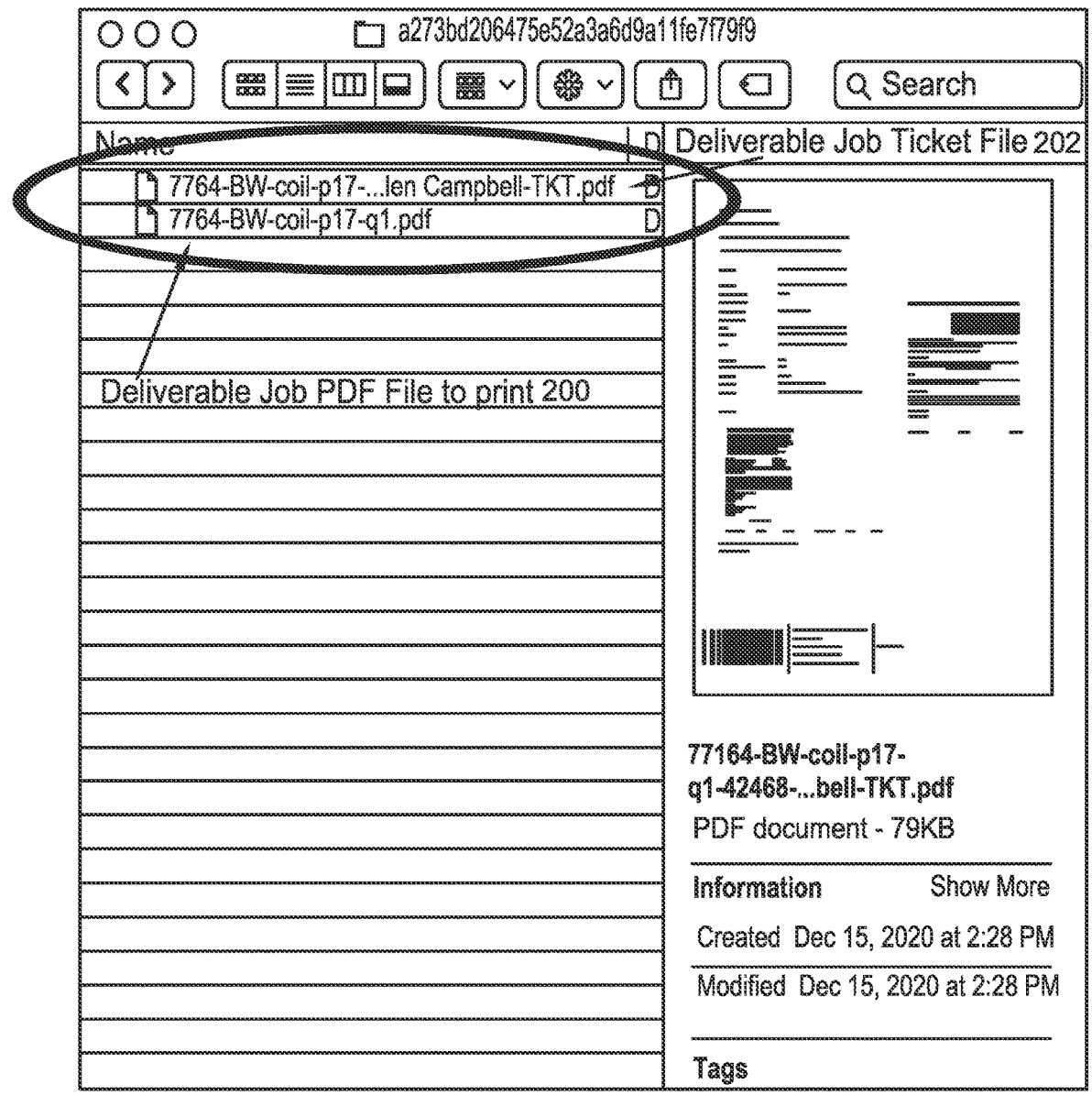
Figure 28:
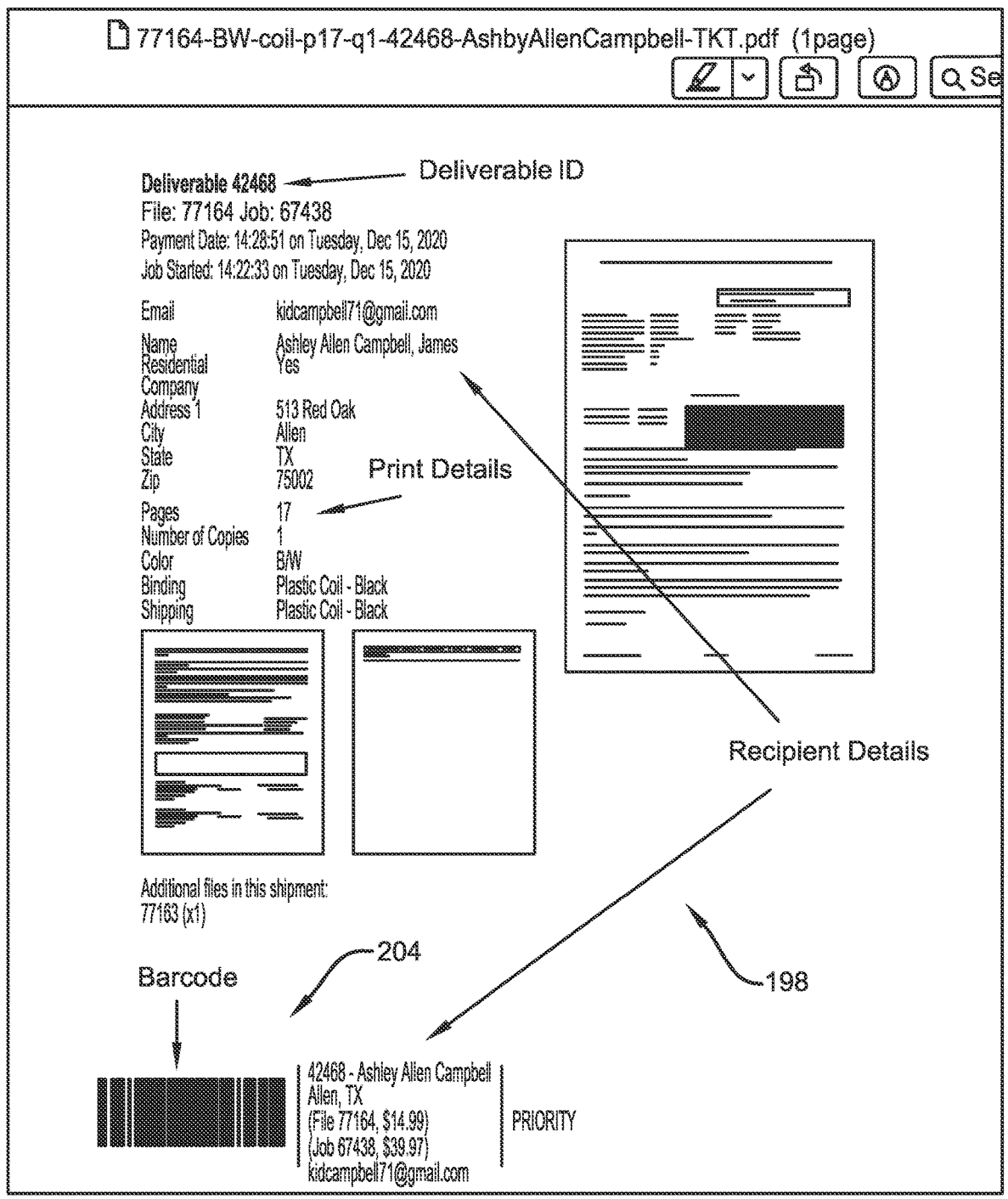

In exemplary arrangements the job ticket record includes data corresponding to the name of the record recipient and the record recipient address at which the printed version of the content records are to be delivered. Further in exemplary arrangements the exemplary job ticket records include data corresponding to machine-readable indicia such as a barcode. In exemplary arrangements the machine-readable indicia is usable to quickly recover and resolve certain selected information related to the printed copy and the delivery thereof. The generation of the job folders and the associated job ticket records are represented in FIG. 8 by a step 166. Further the data that is included in exemplary job ticket records that are produced through operation of the central system circuitry are shown in FIGS. 27 and 28.

In the exemplary arrangement the central system circuitry is then operative to cause the data corresponding to the content record that is usable to produce the printed version thereof, as well as the job ticket record, to be sent to a printing circuit system access address associated in the data store with the printing operation that is assigned the job of printing the respective content record. In the exemplary arrangement the central system circuitry is operative to determine the printing circuit system access address for the respective printing circuit associated with the printing operation based on the stored data associated with the printing operation that is determined to be in the closest proximity to the record recipient location and to have the capabilities to produce the required printed content documents. In exemplary arrangements the printing circuit system access address may be the address of at least one printing circuit that is located at the printing operation. However in other exemplary arrangements the printing circuit system access address may be a remote data storage container or system which houses the record data remotely from the printing operation and from which the printing circuit of the particular printing operation is enabled to access the data to carry out the printing activities. In the exemplary arrangement the central system circuitry is operative to transmit the record data to the printing circuit via an R-sync electronic transfer. This is represented in FIG. 8 by a step 168. Of course it should be understood that this approach is exemplary and in other arrangements other approaches may be used.

Figure 22:
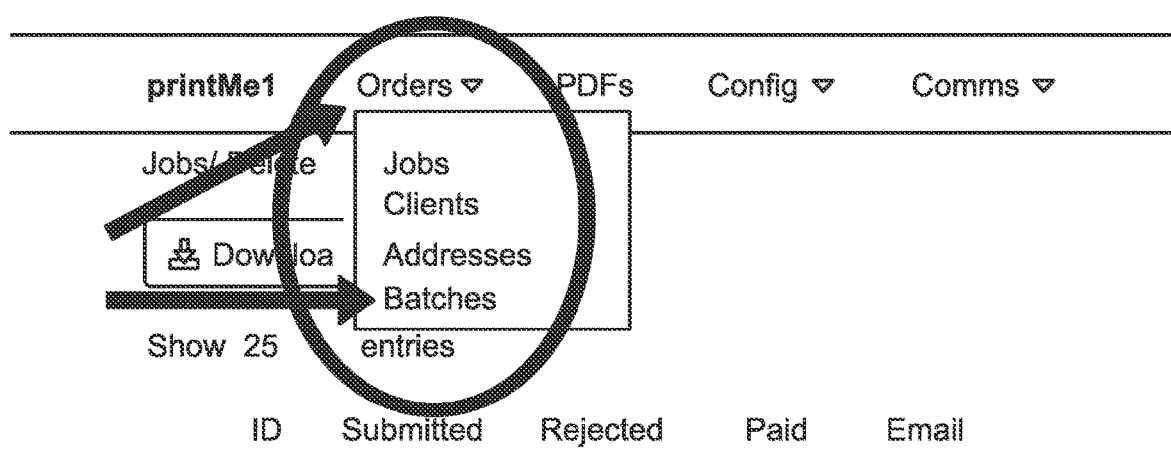

The exemplary central system circuitry is operative to enable printing operations to administrator print jobs through a batch process. This enables the printing operation to create a list of jobs that the operation needs to complete based on a time interval that the operator of the printing circuit at the operation may designate. As represented in FIG. 8 and in a step 170, the central system circuitry enables the printing operation to proceed with the batch process. This begins as represented in FIG. 9 with a step 172. In the exemplary arrangement the printing circuit communicates with the central system circuitry and is presented with an orders menu selection as represented in a screen 174 shown in FIG. 22 that is output through a display that is associated with the printing circuit. This is represented in FIG. 9 by a step 176.

Figure 23:
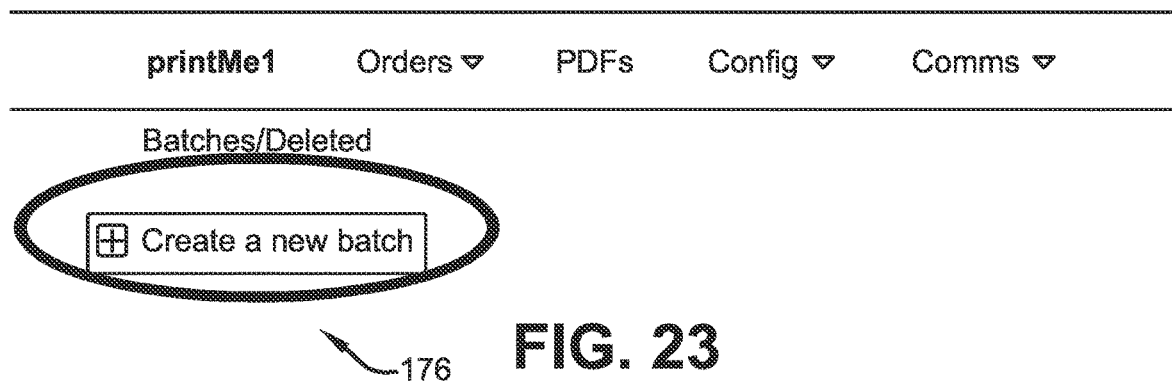
Figure 24:
Figure 25:
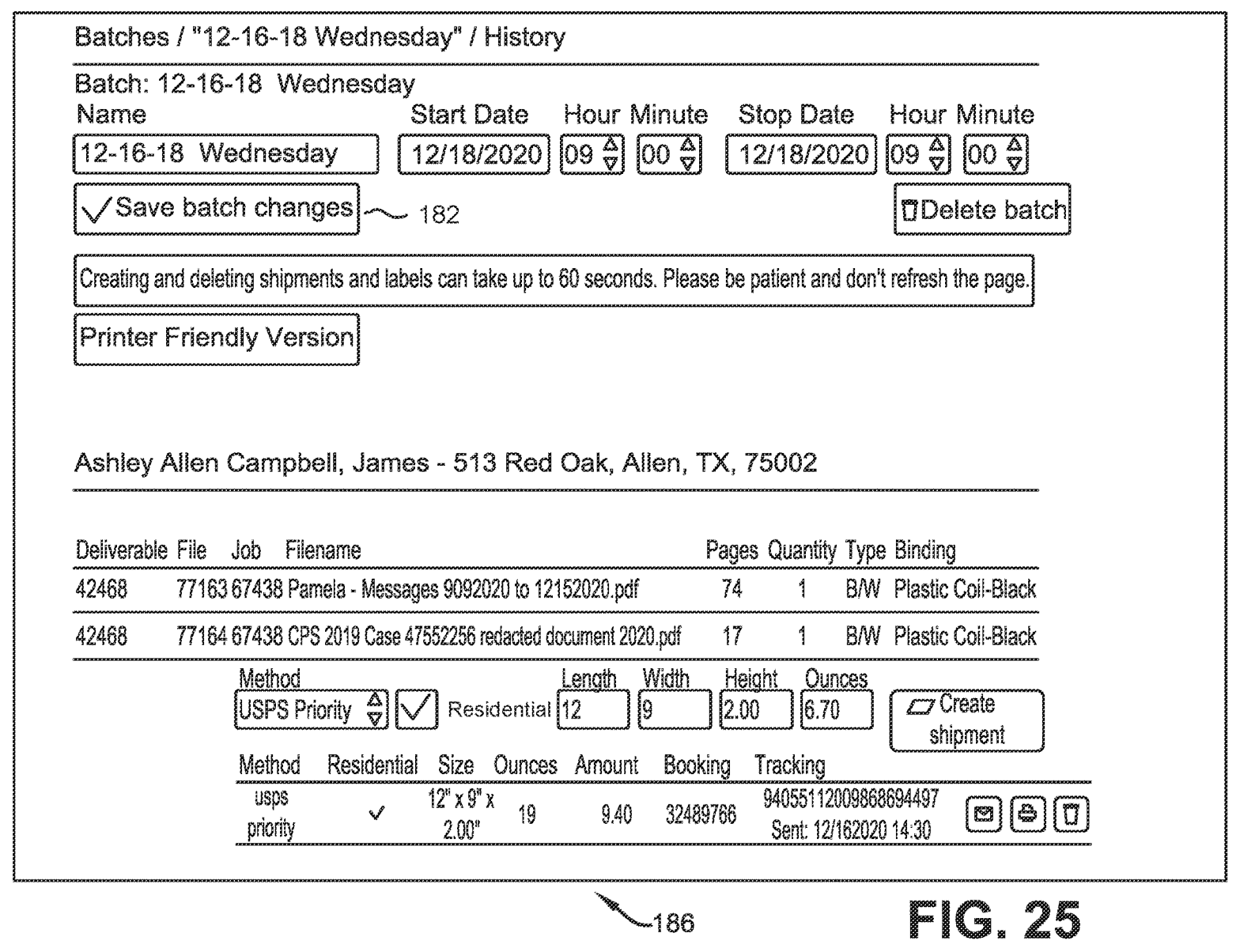

In the exemplary arrangement the operator of the printing circuit at the printing operation is enabled to start a new batch by providing at least one input to an input device associated with the printing circuit. This is carried out responsive at least in part to communication with the central system circuitry and an input that is provided responsive to an output screen 176 shown in FIG. 23 that is presented on a display associated with the printing circuit. The commencement of the new batch is also represented schematically in the logic flow in FIG. 9 by a step 178. The operator of the printing circuit then provides inputs through an input device corresponding to a date and time interval to work within. The operator also provides a batch name for the new batch. This is represented by a screen 180 shown in FIG. 24. As represented in FIG. 25 the operator then provides at least one input to an input device associated with the printing circuit corresponding to a save icon 182. In the exemplary arrangement the printing circuit is operative to communicate with the central system circuitry so as to produce a listing of jobs that have been assigned to the printing operation to perform. This is represented in the logic flow shown in FIG. 8 by a step 184.

The communication with the central system circuitry is operative to cause the display associated with the printing circuit to output the list of printing jobs that the printing operation has been assigned to perform. These are represented in the display screen 186 that is shown in FIG. 25. This is also represented in the logic flow by a step 188. The print jobs that are listed in the screen 186 correlate with the folder containing the content record which includes the data usable to produce the printed item. In the exemplary arrangement the output screen 186 includes information from the print details records and record recipient records that are usable by the printing operation to produce and ship the printed version of the content records. Of course it should be understood that this approach is exemplary and in other arrangements other approaches may be used.

Figure 26:

As represented in FIG. 9 by a step 190, the printing circuit is then operable to access the folder including the content record data usable to produce the printed copy of the content record. The printing circuit is operable to communication with the central system circuitry to present a screen 192 shown in FIG. 26, in response to which an operator of the printing circuit is enabled to provide an input through an input device in connection with the printing circuit to select the indicated folder. In the exemplary arrangement a hash folder associated with the job folders includes the data corresponding to the job ticket record as well as the content record data that is usable for printing. This is represented in the logic flow in FIG. 9 by a step 194. The exemplary format of the file including the job ticket record is shown in the display screens 196 and 198 that are shown in FIGS. 27 and 28. In the exemplary arrangement the data includes a PDF file indicated 200 which is the data corresponding to the content record that can be used by the printing operation to produce the printed copy of the content record. The job ticket record 202 includes data corresponding the content record title, the print details record data, the record recipient record data and other information for the particular print job as shown in the screen 198. Further as previously discussed, the job ticket record includes the data corresponding to the machine-readable indicia 204 that is usable to resolve information regarding the record recipient, the record recipient location, record recipient contact details and other information. Of course the information that is shown in the exemplary job ticket record may be different in other system arrangements. In the exemplary logic flow the printing circuitry is operable to print the job ticket record data. The printing circuitry is also operable to store and transmit the content record to a suitable printer and/or combined printer and binding machine in the printing operation to produce the printed version of the content record. This is represented in a schematic logic flow in FIG. 9 by a step 206.

In the exemplary arrangement the printing circuit such as printing circuit 30 shown in FIG. 1 for example, is operative to communicate the data corresponding to the content record to a printer 208. The printer 208 is operable to produce the printed version of the content record schematically represented 210 in accordance with the data included in the job ticket record. In some arrangements the printer may include a binding device which carries out the designated type of binding as well. This is represented schematically in the logic flow by a step 212. In the exemplary arrangement a reader such as a bar code reader in operative connection with the printing circuit, is operable to read the machine-readable indicia that is included on the printed job record ticket that is associated with the print job. In some exemplary arrangements the machine-readable indicia may alternatively or additionally be included in the printed version of the content record so that it can be read from the particular item. The exemplary printing circuit is operable to communicate the data corresponding to the machine-readable indicia to the designated shipper who will deliver the printed version of the content record. In the exemplary arrangement the communication with the shipper is also operable to cause the printing circuit to receive data corresponding to a shipping label. The shipping label is printable from the printing circuit on a suitable printer that is in operative connection therewith. The printed label is suitable for attachment to the package containing the printed copy of the content record once the printing has been completed through operation of the printer 208. This is represented in the logic flow by a step 214.

Once the shipping label has been applied and the designated shipper contacted to deliver the shipment, the printed content record 210 is picked up by the shipper schematically represented 214. The shipper is then enabled to make a local delivery of the printed content record or multiple records that are deliverable to the record recipient at the designated record recipient location 216. Further in exemplary arrangements the printing circuit is enabled to receive at least one input from an operator which is indicative that the printed version of the content record has been delivered to the shipper. This is represented in FIG. 9 by a step 218. Data corresponding to the shipment of the print job to the record recipient is communicated to the central system circuitry by the printing circuit. In some exemplary arrangements the printing circuit may be operable in accordance with its circuit executable instructions to provide the record provider with information concerning the shipment as well as tracking data or other information so that the record provider may verify that the printed versions of the content records have been delivered to all of the designated record recipients. Further in some exemplary arrangements the central system circuitry may operate responsive to communications with the printing circuit indicative of completion of the printing and/or shipping operations to cause the financial circuitry to cause a payment corresponding to a portion of the charge that was assessed to the account of the record provider, to be received in an account of the entity associated with the printing operation as payment for the services performed by the printing operation. Of course in other exemplary arrangements different approaches and steps may be carried out in connection with producing and delivering the printed versions of the content records.

Thus as can be appreciated, a record provider is enabled to produce and deliver printed copies of numerous different content records to a plurality of designated record recipients in numerous different dispersed geographic locations. Exemplary arrangements enable the production and delivery of the printed copies of the content in an efficient and cost-effective manner in accordance with the requirements of the content provider. As can be appreciated the system capabilities are suitable for delivering many different types of printed content to numerous recipients. Further it should be appreciated that while in the exemplary arrangements examples have been discussed which involve the printing of materials on paper, other exemplary arrangements may additionally or alternatively include other types of printing. This may include for example 3D printing of articles that can be produced locally by suitable printing operations and delivered to designated recipients. Numerous additional functions and capabilities may also be utilized in connection with the operations and systems that have been described.

The exemplary central system circuitry is also operative to enable remote record providers to host available content records which can then be accessed and printed on demand for record requesters who wish to receive a printed copy of the content record. In some situations this enables a record provider to provide a printed copy of the hosted content record to record requesters who may desire a copy, and for the provider to pay for the cost of printing and delivering the particular item. This may be done for example by a promotional firm or other entity that wishes to distribute information about a product or service to potential customers who may be interested in acquiring the product or service.

In alternative arrangements the central system circuitry may be operative to provide a printed copy of the content record that is being paid for by the record provider, to only those record requesters who have been specifically approved by the record provider to receive the printed copy of the content record. In other exemplary arrangements the central system circuitry may be operative to deliver a printed copy of the content record to a record requester only after the record requester has paid the associated charges to receive the printed copy. Examples of situations in which the central system circuitry may be operable to cause printed copies of content records to be provided to record requesters are described herein. However it should be understood that these are not the only situations or operations and functions that can be carried out in connection with the apparatus and systems that are described herein.

In the exemplary arrangement a user who accesses the system using an associated record provider circuit may provide inputs indicative that they wish to present a hosted content record. In response to the selection of a service associated with hosting a content record, the central system circuitry is operative to cause the display associated with at least one content record provider circuit associated with the content record provider, to output a screen 222 shown in FIG. 29. By providing inputs through at least one input device through the user interface presented by screen 222, the record provider is enabled to transfer a printable content record from the remote record provider circuit to the central system circuitry. This is accomplished in the exemplary arrangement by the record provider providing inputs corresponding to a text icon associated with hosting 224 and the selection box 226 associated with selecting the file for uploading. The central system circuitry then enables the upload of the printable content record to the central system circuitry as represented in the logic flow in FIG. 10 by a step 230.

Responsive to the inputs provided by the record provider through at least one input device of the at least one remote record provider circuit and the upload of the printable content record, the central system circuitry is operative to cause a display associated with the record provider circuit to output a screen 228 shown in FIG. 30. Responsive to inputs through at least one input device associated with the remote record provider circuit and communication with the central system circuitry, the record provider is enabled to provide description record data associated with the printable content record. In the exemplary arrangement the description record data includes a title which may be input in a box 232 included in the screen 228. Further the user may include description record data that includes the provider name of the particular content record. Such data may be input by the record provider through operation of the remote record provider circuit in a field 234 included in screen 228. Of course it should be understood that this description record data associated with the printable content record is exemplary and other arrangements different or alternative types of data may be included.

In the exemplary arrangement the central system circuitry then operates in accordance with its circuit executable instructions to cause the display associated with the remote record provider circuit to output a screen 236 which is shown in FIG. 31. The exemplary display screen 236 includes a plurality of populatable fields 238. The populatable fields correspond to data included in a provider order detail record that is provided by the at least one remote record provider circuit to the central system circuitry. The exemplary provider order detail record data includes data corresponding to a print type such as black-and-white or color printing, which can be selected by the content record provider as the print type in which the printed versions of the content record are produced and delivered to record requesters who request printed copies. The exemplary order details records also include data corresponding to a binding method which will be applied to the printed content records. As previously discussed, the binding method that is selectable by the content provider may include no binding or alternatively numerous other different types of bindings as may be available from the printing operations that operate in conjunction with the central system circuitry. The exemplary order details record data further includes a shipping method by which the printed content record will be provided to a record requester. Of course these data elements included in the order detail record data are exemplary and in other arrangements other or different types of data may be included. The exemplary central system circuitry may be operative to provide default values for each of the data elements included in the order details record, which if not changed by the record provider, will be applicable. The completed input of data for the order details record then causes the remote record provider circuit to send the data which comprises the order details record to the central system circuitry. The activities associated with the communications between the central system circuitry and the remote record provider circuit associated with the record provider in providing the description record data and the order details record is represented in the logic flow in FIG. 10 by a step 240.

Further as represented in FIG. 31, screen 236 includes selectable icons which enable the record provider to provide data to the central system circuitry that is included in at least one permissions record. In the exemplary arrangement the record provider is enabled to select a text icon 242. The selection of the text icon 242 by the record provider is operative to cause data to be included in the at least one permissions record that there is a record provider approval requirement of a request by a record requester before the central system circuitry will produce a printed copy of the content record for the requester. The data corresponding to the permissions record requiring record provider approval, is stored through operation of the central system circuitry in the at least one data store. Further in the exemplary arrangement the output screen 236 enables the record provider to provide an input by selecting through operation of an input device associated with the at least one remote record provider circuit, a text icon 244. An input corresponding to selection of text icon 244 is operative to include in at least one permission record, data corresponding to an authorization of the record provider to allow electronic downloads of at least a portion of the printable content record to a record requester circuit. As later explained, allowing such electronic downloads enables a record requester to receive an electronic copy through their record requester circuit in addition to a delivered printed copy of the desired content record. The central system circuitry is operative responsive to communications indicative that the record provider has selected to allow downloads to include data corresponding to the at least one permission record in the at least one data store.

Further in the exemplary arrangement the record provider is enabled to provide an input corresponding to selection of an icon 246. Selection of icon 246 corresponds to data to be included in an order charge detail record which is indicative that the charges associated with the printed copies of the content records that are delivered to record requesters, will be paid by the record provider. The selection of the icon 246 is operative to cause the remote record provider circuit to communicate with the central system circuitry, the order charge detail record which includes the data indicative of the authorization by the record provider to pay for the printed copies of the record requesters. The central system circuitry is operative to cause the data corresponding to the order charge detail record to be stored in the at least one data store. In the exemplary logic flow shown in FIG. 10, the inputs by the record provider corresponding to selection of one or more of the text icons presented, and the communication of the record data associated therewith to the central system circuitry, is represented by a step 248.

Figure 10:
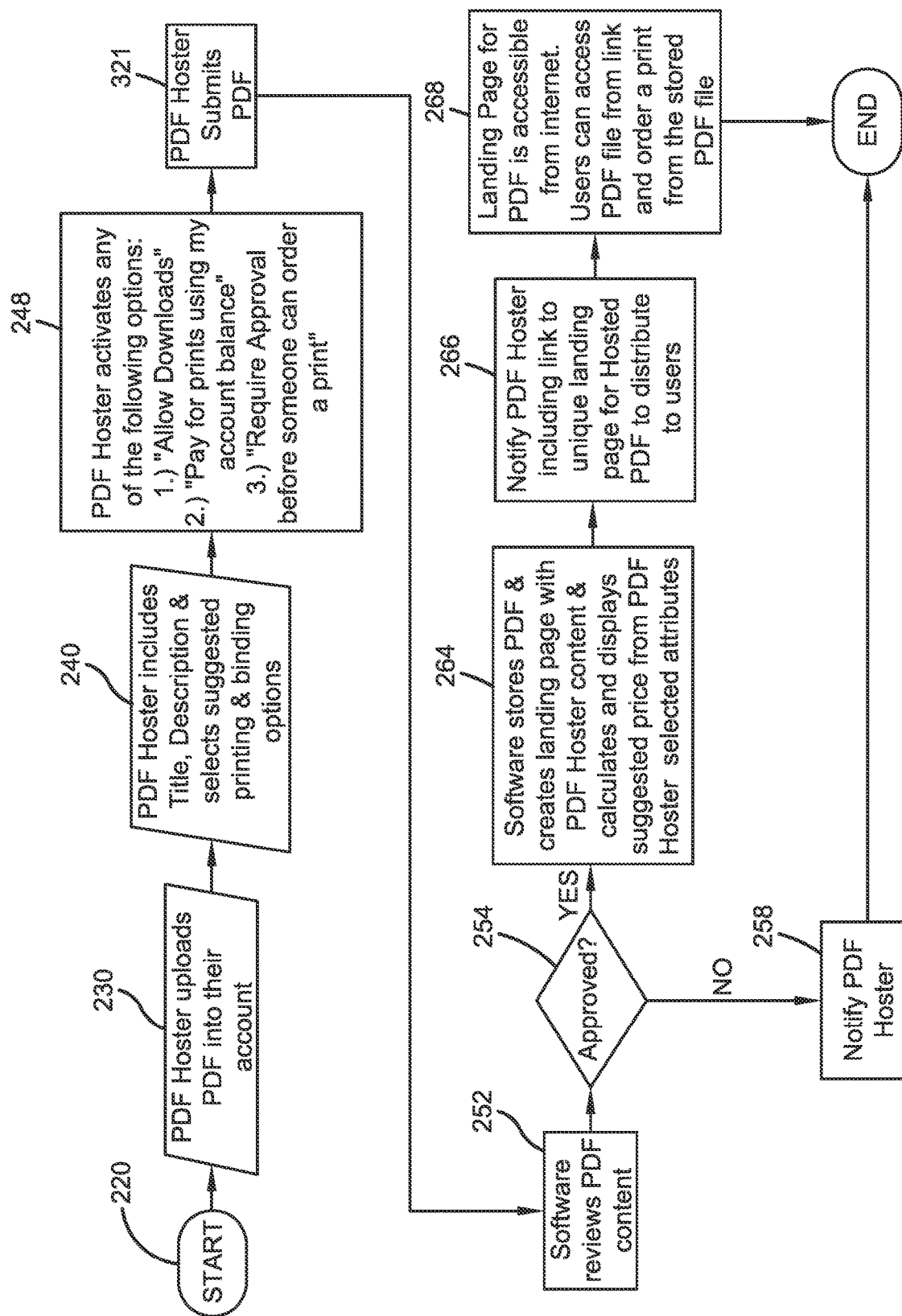

In the exemplary arrangement the printable content record that the provider requests to be hosted, as well as the record data input by the provider, is transmitted from the remote record provider circuit to the central system circuitry. This is represented in FIG. 10 by a step 250. In the exemplary arrangement the central system circuitry operates in accordance with its circuit executable instructions to evaluate the printable content record for unacceptable content. Such unacceptable content review may be carried out by the central system circuitry by searching in the uploaded file for certain words, phrases, images or other content which are considered unacceptable by the operator of the central system circuitry, or illegal to reproduce due to copyright infringement issues or other improprieties. This review that is carried out through operation of the central system circuitry is represented in FIG. 10 by a step 252. The central system circuitry then operates responsive to the review of the printable content record for unacceptable content, to make a determination as to whether the circuitry will allow the content record to be hosted. This is represented in FIG. 10 by a step 254. The central system circuitry then operates in accordance with its circuit executable instructions to communicate with the at least one remote record provider circuit to provide an output through a display associated therewith which is indicative of whether the content record has been approved for hosting. In the exemplary arrangement the central system circuitry is operative to cause the output of a screen 256 through the display associated with the record provider circuitry. The screen 256 provides a visual indication of whether the content record has been determined to be acceptable. In the event that the content record is determined to include unacceptable content, the hosting initiation process for the particular content record is closed as represented in FIG. 10 by a step 258.

Figure 33:

In response to the determination that the content record does not include unacceptable content, the central system circuitry 22 is operative to store the data corresponding to the content record and the description record data in associated relation in the at least one data store 24. The exemplary system circuitry is further operative to generate a unique network address that is accessible through the central system circuitry that corresponds to the particular content record. In the exemplary arrangement the central system circuitry is operative to generate a hyperlink that corresponds to the unique generated network address that is associated with the content record. The central system circuitry is operative to provide the generated hyperlink information to the provider through a display screen 260 which is shown in FIG. 33. The generated hyperlink 262 is enabled to be copied by the record provider through operation of the at least one content provider circuit 16 and included in communications, websites or other content in which the record provider wishes to include a way for record requesters to readily submit a request to receive a printed copy of the hosted content record. This is represented in FIG. 10 by steps 264 and 266.

In the exemplary arrangement the central system circuitry is further operative to generate a landing page that is presented to a record requester who submits a request for the record by selection of the hyperlink. In the exemplary arrangement the generated landing page associated with the content record that is rendered on a display associated with a record requester circuit such as 18, that accesses the generated network address, includes a thumbnail of at least a portion of the record as well as data corresponding to at least some of the description record data that is associated with the content record in the at least one data store. The central system circuitry is operative to store the data usable to generate the landing page in the at least one data store so the landing page can be generated responsive to receiving a request at the network address from a record requester. This is represented in FIG. 10 by a step 268. Of course this approach is exemplary and in other arrangements other approaches may be used.

Figure 3:
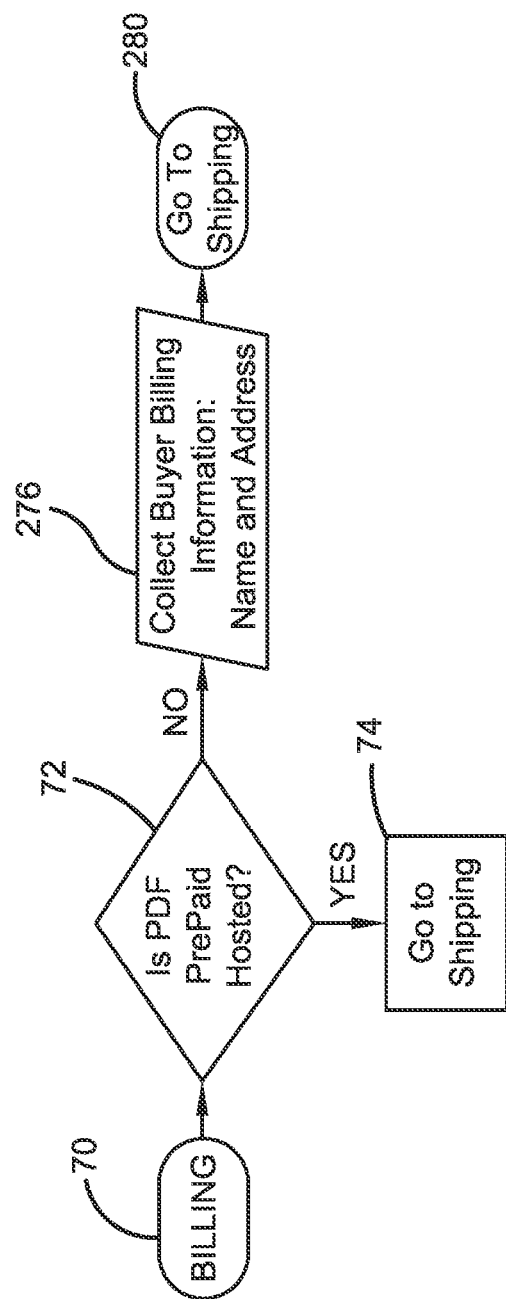
Figure 35:
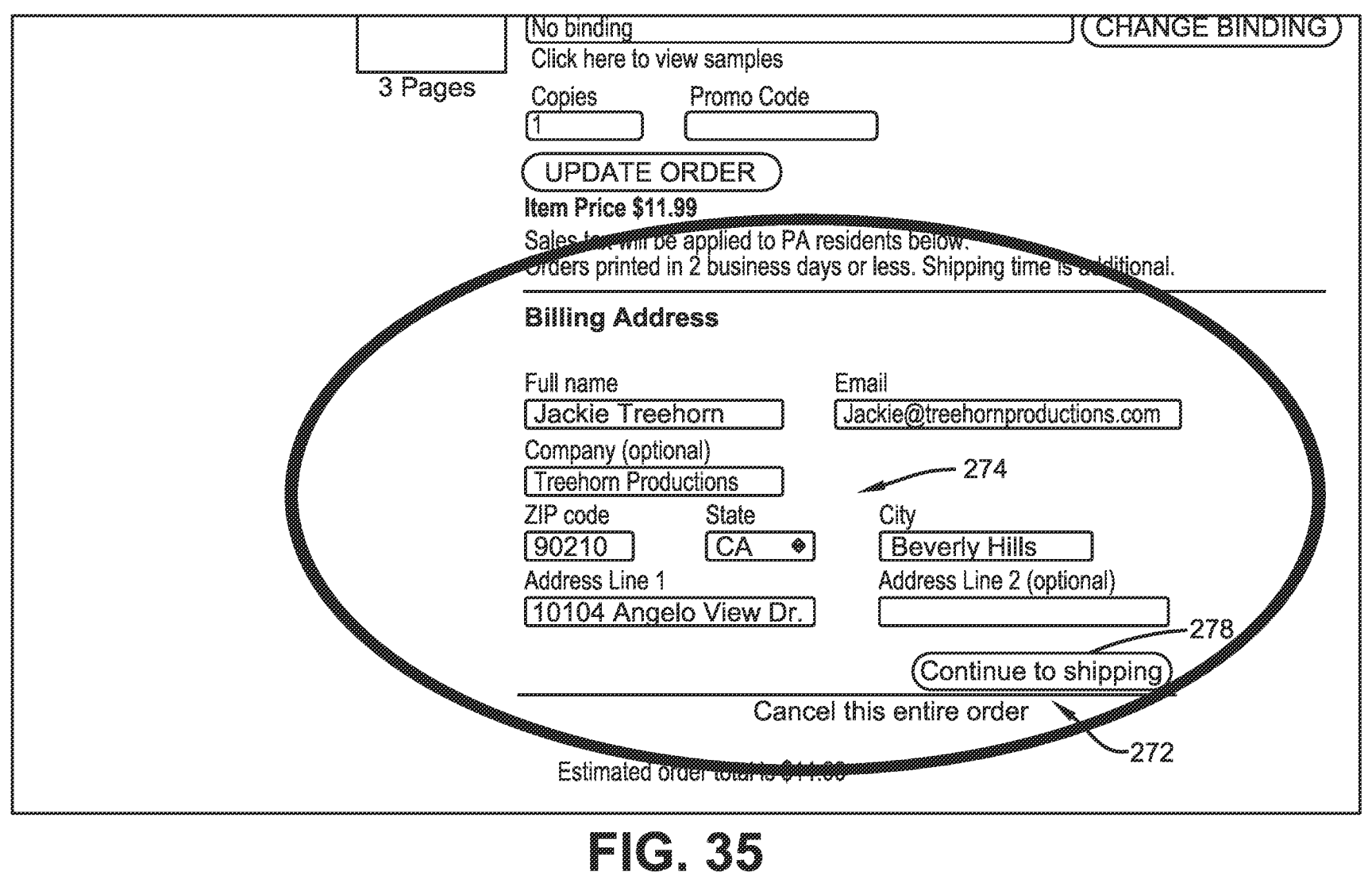

In the exemplary arrangement the central system circuitry is further operative to present to the record provider a screen 270 that includes default options associated with providing the printed copy of the content record to record requesters. The screen 270 further includes the price associated with providing the printed copy of the content record to a record requester. Further in the exemplary arrangement the central system circuitry is operative to receive from the record provider, the billing information associated with the record provider. This information is obtained because in numerous different situations the record provider will provide the payment for the printed copies that are produced for the record requesters. Further in connection with the hosting process the record provider is required to receive and pay for at least one printed copy of the hosted content record. This enables the record provider to assure that the printed version is satisfactory. A screen 272 shown in FIG. 35 is presented to the record provider through a display associated with the remote record provider circuit which enables the record provider to communicate their billing address information to the central system circuitry. The record provider is enabled to review and modify their billing address information that is included in the fields 274 that are presented in screen 272. Changes made by the record provider are communicated to the central system circuitry and stored in the at least one data store. This activity is also represented by a step 276 as represented in FIG. 3.

Figure 36:

After the record provider has verified the billing address information in connection with screen 272, the record provider may provide at least one input corresponding to selection of icon 278. Providing the input corresponding to selection of icon 278 causes the central system circuitry to operate to cause the entered shipping data information to be presented to the record provider. This is represented in FIG. 3 by a step 280. The central system circuitry then operates in accordance with its circuit executable instructions to present a display screen 282 shown in FIG. 36 to the record provider through a display of the at least one record provider circuit. The record provider is enabled to input their shipping address information in the fields 284 that are included in the screen 282. The data corresponding to the shipping information is communicated to the central system circuitry responsive at least in part to the record provider providing an input by selecting an icon 286. Selecting the icon 286 causes the central system circuitry to execute the circuit executable instructions associated with receiving a payment from the record provider.

Figure 37:
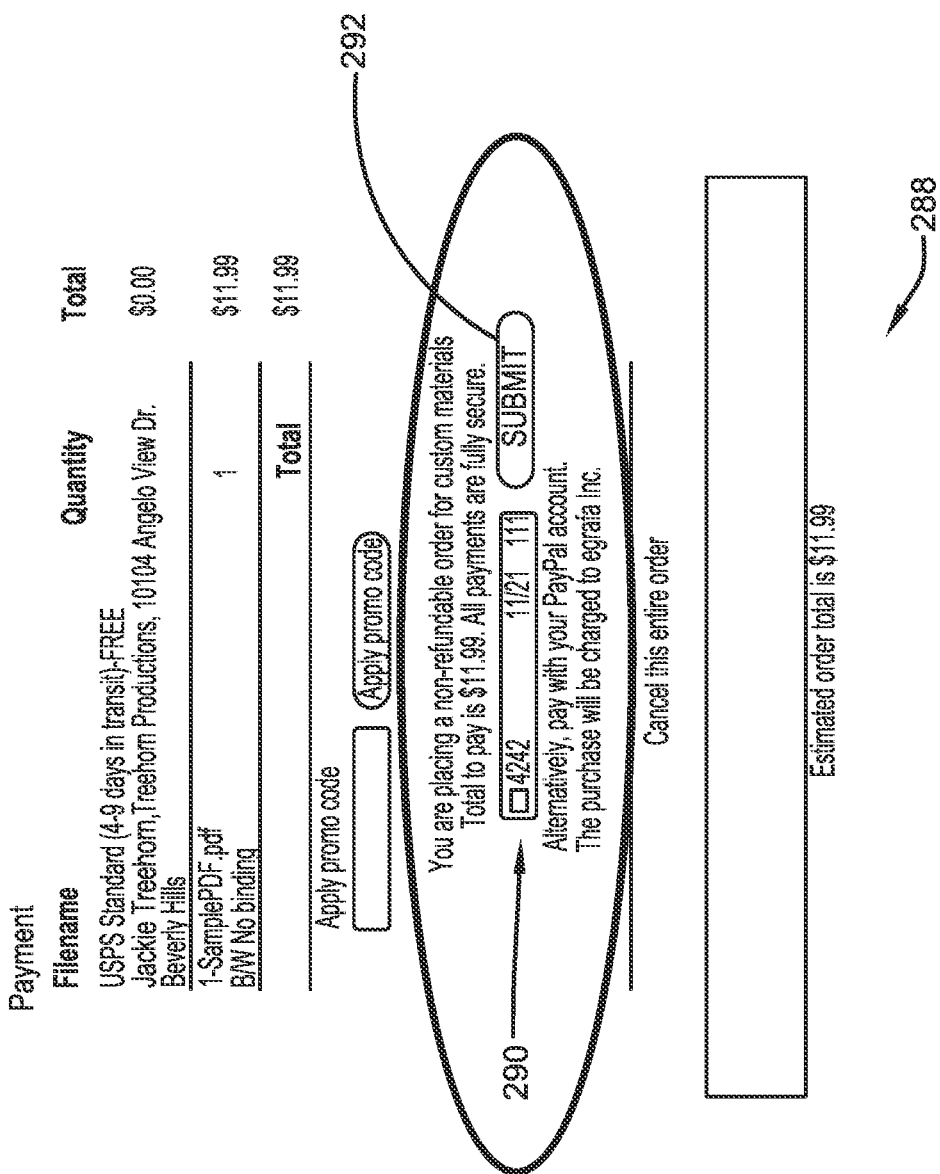

In this exemplary transaction in which the record provider is paying for their sample copy of the printed version of the content record that is being hosted, the central system circuitry is operative to cause the at least one record provider circuit 16 to present to the record provider the screen 288 that is shown in FIG. 37. In this exemplary arrangement the screen is similar to the payment screen previously discussed.

The user is enabled to review the charges associated with producing the default form of the hosted record content. The user is also enabled to provide inputs corresponding to the record provider's financial account in the fields 290. After including the account information in the fields 290, the record provider is enabled to provide an input corresponding to selection of an icon 292. Selection of the icon 292 is operative to communicate the account information to the central system circuitry. The central system circuitry is then operative in a manner like that previously discussed to communicate with the appropriate payment circuitry to cause the account of the payment provider to be assessed the amount due for the printed copy of the content record. The payment circuitry is further operative to cause an account associated with an operator of the central system circuitry to be credited with the amount of the record provider's payment. This is accomplished in the exemplary arrangement in a manner like that previously discussed. Of course it should be understood that this approach is exemplary and in other arrangements other approaches may be used.

In exemplary arrangements unless the record provider wishes to pay for the printed copies of the hosted content records that are requested by record requesters, the record requester is required by the central system circuitry to pay for the printed copies. In those situations where the record provider wishes to arrange for prepaid printed copies of the hosted content record to be delivered to record requesters, the content provider may arrange through communication with the central system circuitry to establish a stored value account in the at least one data store. The stored value account is usable to pay the amounts due for copies of the content records that are requested by record requesters.

In the exemplary arrangement a record provider is enabled to establish a new stored value account through communication between the at least one record provider circuit and the central system circuitry. This is accomplished in an exemplary arrangement by the user selecting an account selection from the menu items presented through outputs on the display of the record provider circuit. Further if the record provider already has an existing account, the user is enabled to access the existing account to review the amount of funds that are currently included in the existing stored value account.

Figure 42:
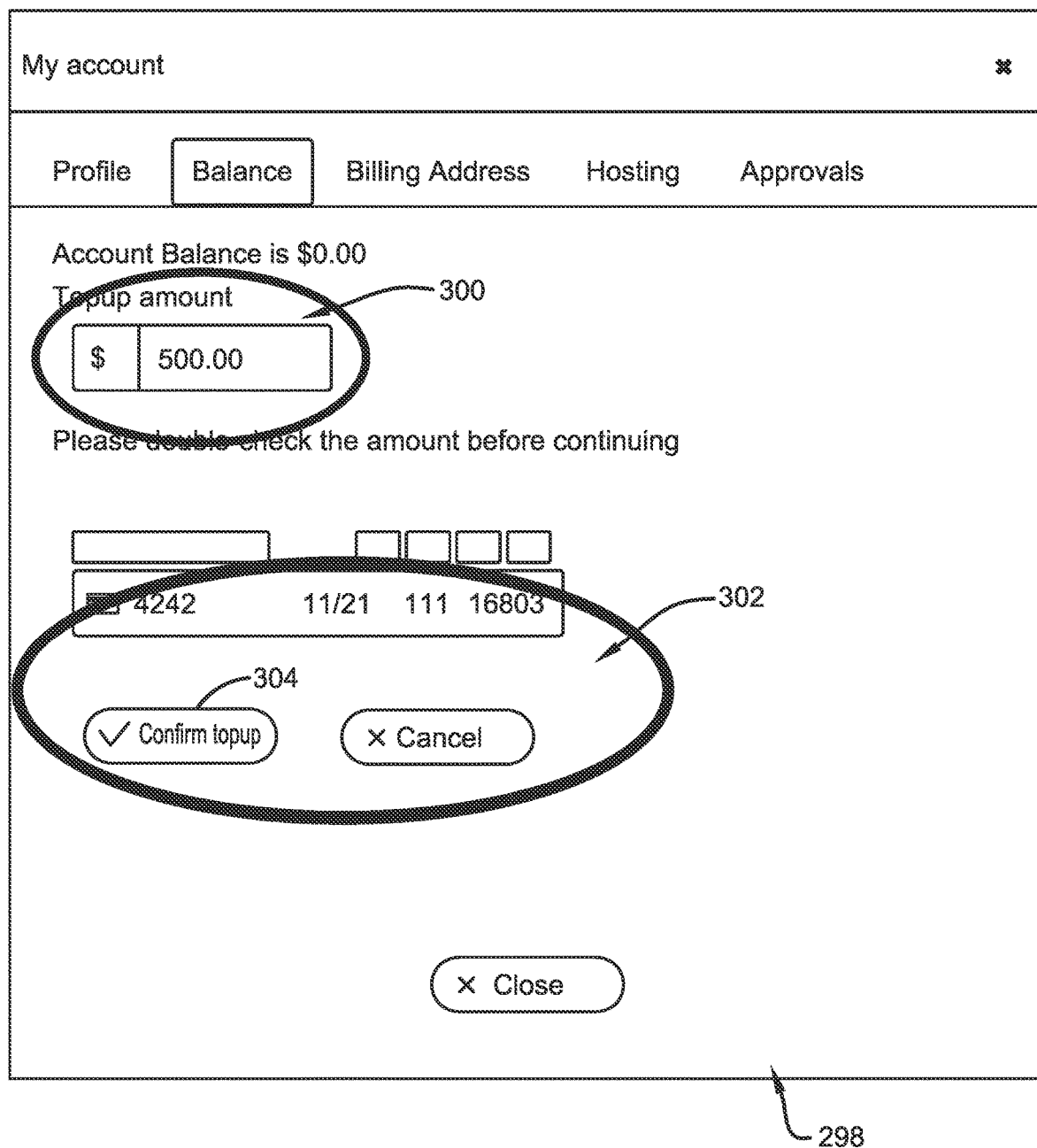

FIG. 41 includes an exemplary display screen 294 that is presented to a record provider that has an existing stored value account maintained in the at least one data store by the central system circuitry. In the exemplary display screen 294, the record provider is shown the transactions that have been conducted on their stored value account and the current account balance. In the exemplary screen 294 it is indicated that the current account balance is zero. As can be appreciated a similar screen would be provided to a user who is establishing a new account, except that there would be no prior transactions associated with the account. The exemplary screen 294 includes an icon 296. The icon 296 is selectable by the record provider to add funds ("top up") the amount of funds in their stored value account. In the exemplary arrangement providing at least one input through an input device of the record provider circuit which corresponds to selection of the icon 296 causes communication with the central system circuitry which causes a display screen 298 shown in FIG. 42 to be presented to the content provider. The interface presented by display screen 298 includes an amount field 300 in which the record provider may input an amount of funds that the record provider wishes to add to the stored value account. Screen 298 further includes an account field 300 in which the provider may include information regarding their financial account from which they wish to obtain the funds that are added to their stored value account.

Responsive to the user providing an input corresponding to selection of an icon 304 that is presented in screen 298, the record provider circuit is operative to communicate the information regarding the amount to be added to the stored value account and the record provider's financial account data for the account from which the funds are to be provided. Responsive to the selection of the icon 304 and the stored circuit executable instructions associated with the central system circuitry, the central system circuitry then operates in a manner like that previously discussed to cause the financial account of the record provider to be assessed the amount that is to be transferred into the record provider's stored value account. Further in a manner like that previously discussed, the financial circuitry associated with the record provider's financial account is operative to cause the amount assessed to the provider's financial account to be credited to an account associated with the operator of the central system circuitry. Responsive to the financial circuitry approving the transfer of the funds, the central system circuitry is operative to cause a credit in the amount of the funds to be made to the stored value account data associated with the record provider in the at least one data store 24. This enables the record provider to automatically make the payments for the printed copies of the content records that are provided to record requesters.

Figure 43:
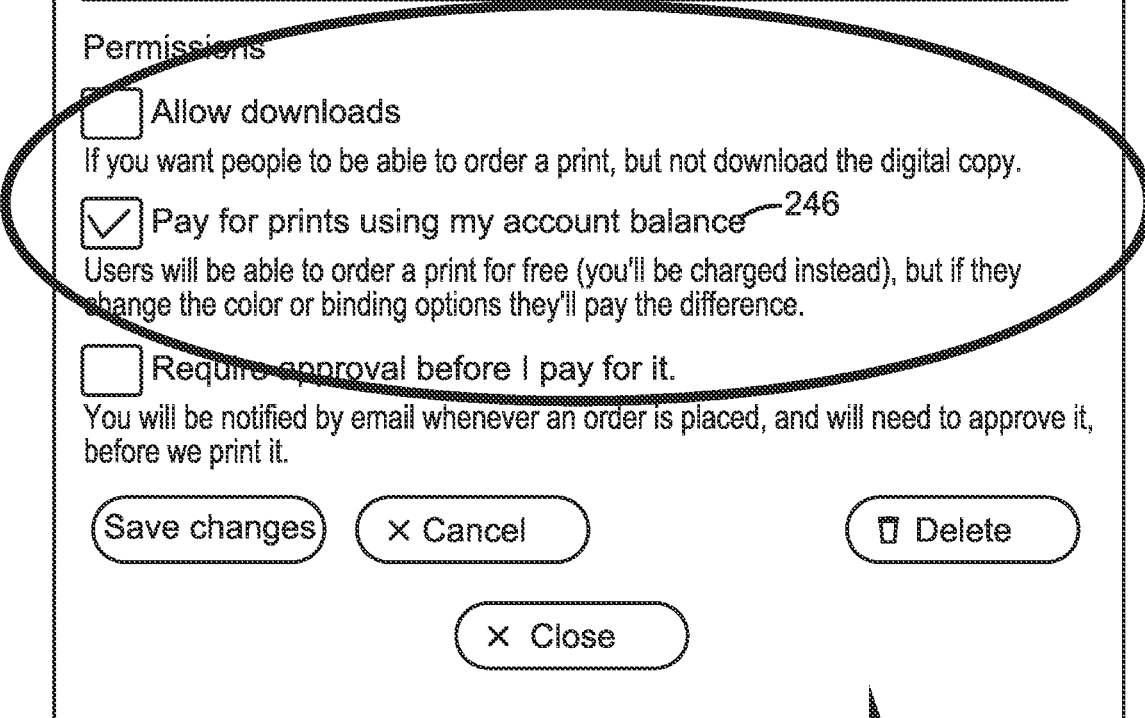

As can be appreciated, in situations where the record provider has established a stored value account in the central system circuitry, the stored order charge detail record data associated with the content record, which is stored in the central system circuitry, will indicate that the record provider will pay for the printed copies using their stored value account. The order charge detail record data which includes this information is stored responsive to the record provider selecting the text icon 246 in the display screen 236 as previously discussed. The selection by the record provider is highlighted in FIG. 43, which Figure is similar to FIG. 31 previously discussed. The record provider selection of the icon 246 is operative to cause the central system circuitry to store the order charge detail record data which causes the central system circuitry to operate to assess the charges for the printed copies requested by the record requesters to the stored value account of the record provider. Further in exemplary arrangements the central system circuitry may operate to cause a portion of the charge to the record provider's stored value account to be made as a payment to the account of the entity associated with the printing operation that performs the printing and shipping activities. Of course this approach is exemplary and other arrangements other approaches may be used.

Figure 44:
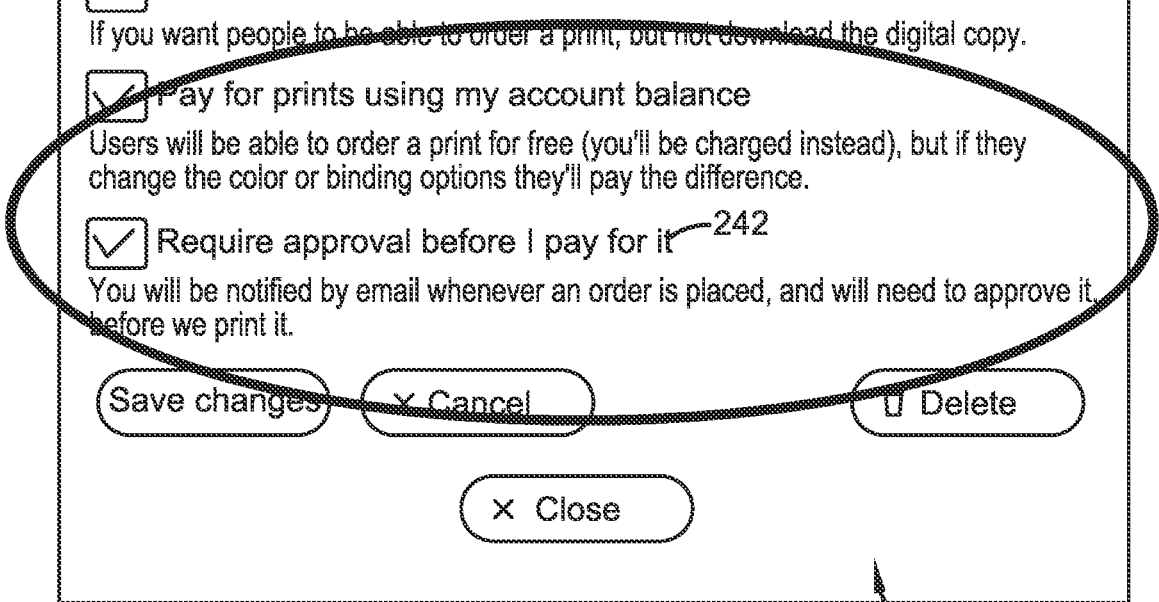

Further as can be appreciated if the record provider is going to use their stored value account to pay for the printed copies that are requested by record requesters, the record provider may wish to approve the printing of copies for each record requester. This is something that the content provider may reasonably wish to do to avoid having their stored value account depleted as a result of copies being produced for record requesters that the content provider would not wish to pay for. To assure that the copies that are printed are for record requesters that are acceptable to the content provider, the content provider may operate their at least one content provider circuit 16 to provide an input selecting the text icon 242 that is presented in screen 236 previously discussed in connection with FIG. 31. The record provider providing an input corresponding to the selection of the text icon 242 is highlighted in FIG. 44. Selection of the text icon 242 by the record provider is operative to cause permission record data to be stored by the central system circuitry in the at least one data store. The at least one permission record data includes data corresponding to a record provider approval requirement. This record provider approval requirement causes the central system circuitry to require approval before printing a copy of the content record for a record requester.

In the exemplary arrangement the central system circuitry is operative when a record requester requests a printed copy of the hosted content record for which record provider approval is required based on the data stored in the at least one permission record, to send at least one message that comprises a request approval inquiry, to the at least one remote record provider circuit. In exemplary arrangements this request approval inquiry may be via email, a text message or other message that includes data corresponding to the identity of the record requester or other data that may be useful to the record provider in evaluating the request. The record provider is enabled to review the information regarding the record requester, and if the record provider approves the request, to provide at least one input which is operative to cause the record provider circuit to send at least one message comprising a record approval response responsive to the request approval inquiry, to the central system circuitry. In an exemplary arrangement, unless a request approval response is received from the record provider circuitry, the central system circuitry does not cause the printed copy to be produced for the record requester. In the exemplary arrangement the central system circuitry does not send the content record data to the printing circuitry system access address associated with a printing operation so that no printed copy of the record is produced. Of course this approach is exemplary and in other arrangements other approaches may be used.

In the exemplary arrangement the feature of requiring the content provider to approve the printing of a printed copy for a record requester can also be implemented in situations where the record provider does not provide the payment for the printed copy. Provider approval can also be required in the circumstances where the record requester who has requested the printed copy is making the payment associated with receipt of the printed copy.

If the record provider in connection with causing the printable content record that is hosted, has selected the text icon 242 in screen 236, such as is shown in FIG. 38, the central system circuitry will be operable to include data corresponding to at least one permission record in the at least one data store 24. The at least one permission record data will include data corresponding to a record provider approval requirement from the content provider before the central system circuitry prints a printed copy of the content record for a record requester. Specifically in the exemplary arrangement the central system circuitry will not operate to send data corresponding to the content record to a printing operation for printing a copy for the record requester until the content record provider has approved the printing.

Figure 39:
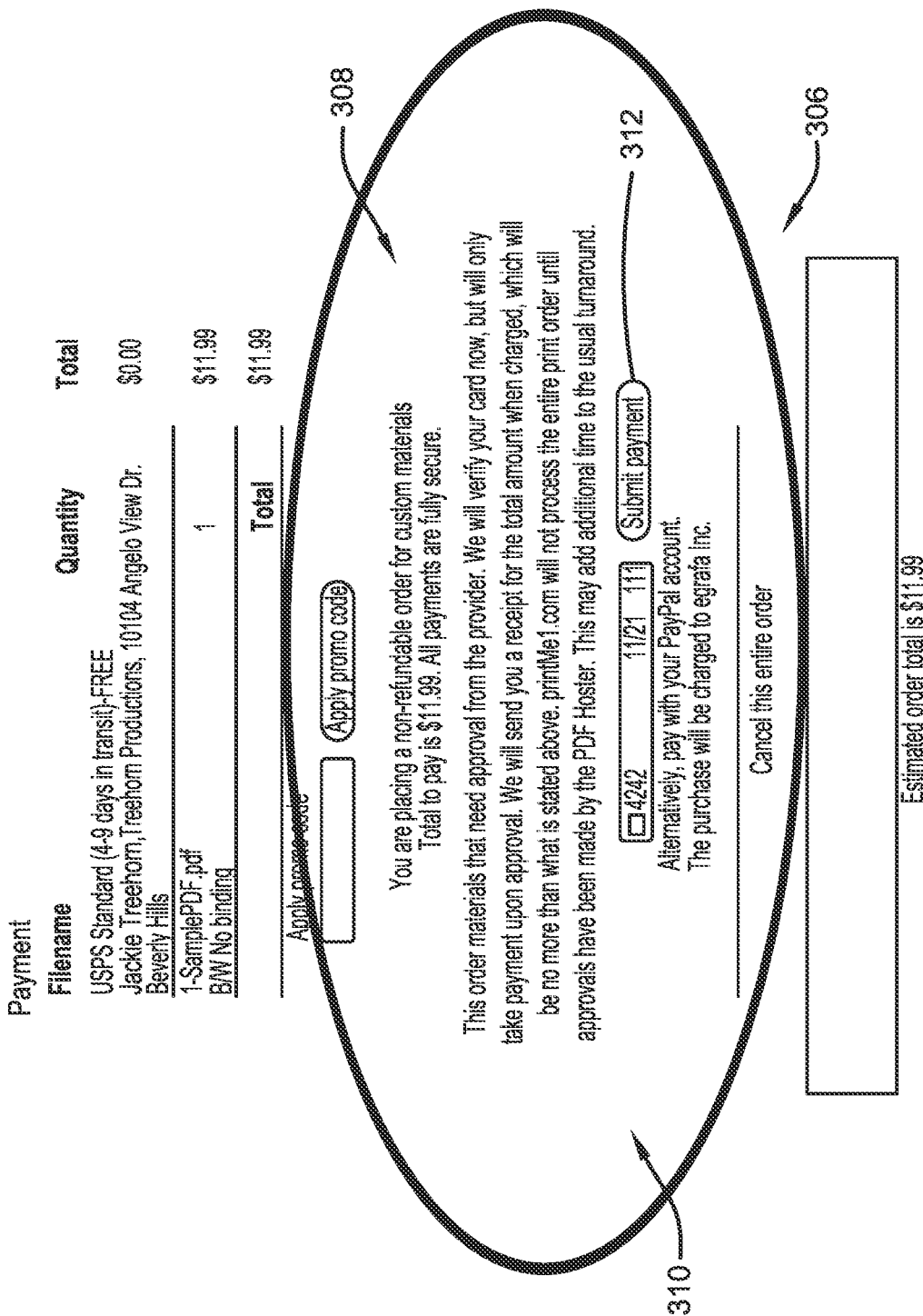

In this situation when the record requester submits a request to receive a printed copy of the content record to the central system circuitry, the record requester will receive an output from the display in connection with their record requester circuit 18 that includes a display screen 306 shown in FIG. 39. The display screen 306 includes a text notice 308 in connection with the fields 310 in which the record requester provides their financial account information. The text notice informs the record provider that he or she must approve the delivery of a printed copy of the content record to the record requester. The record requester is also informed that until the record provider responsible for hosting the record approves the request, the request will not be processed and the record requester's account will not be charged. As a result when the record requester provides an input corresponding to selection of the icon 312 to submit payment, the central system circuitry will hold the account information in the at least one data store until the record provider approves the printing of a copy for delivery to the record requester.

Figure 40:
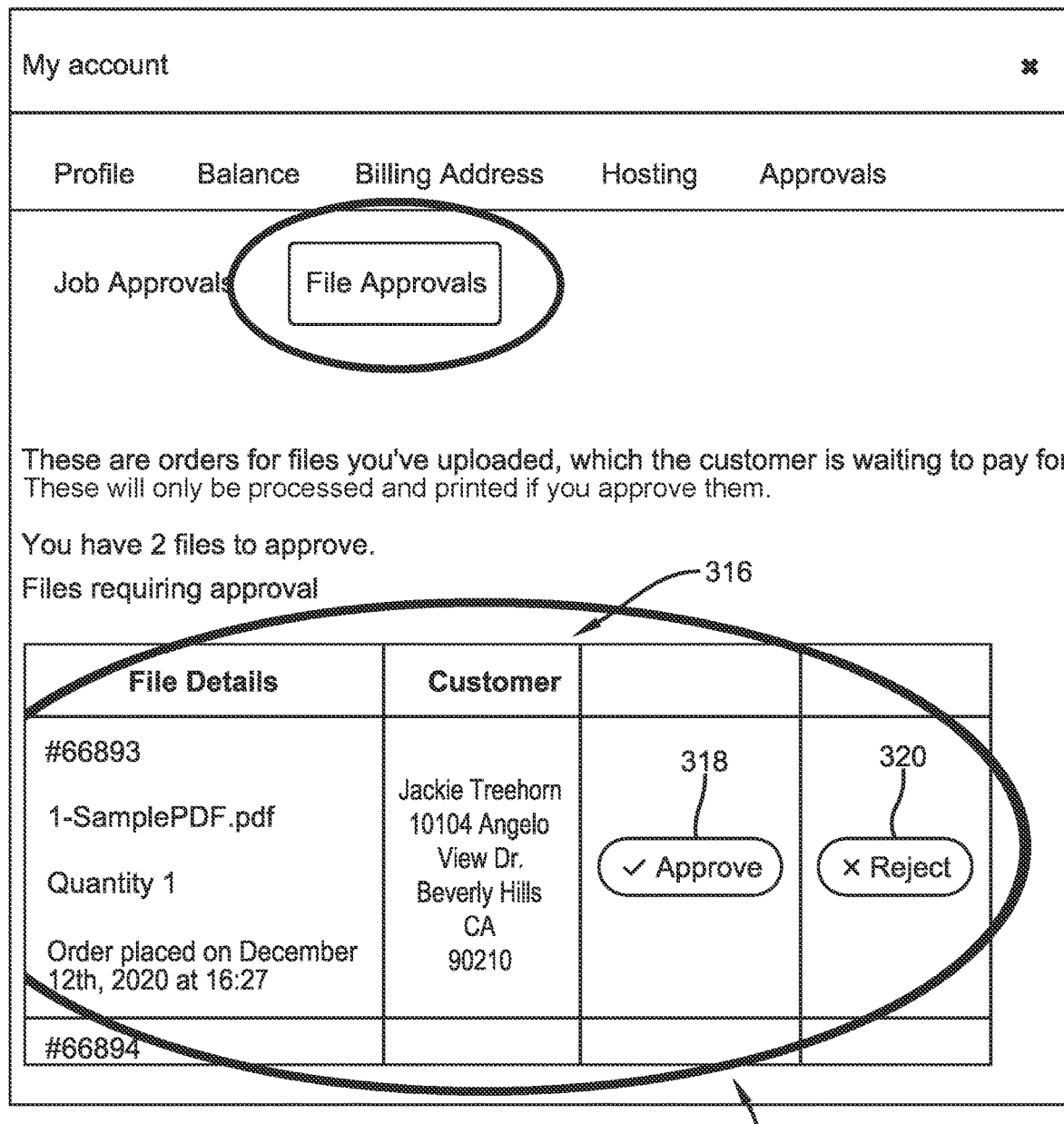

As previously discussed when the permissions record data includes data corresponding to a record provider approval requirement before printing a copy of the content record, the central system circuitry operates in response to receiving the request from the record requester to send a request approval inquiry message to the at least one remote record provider circuit 16. This is represented by the logic flow in FIG. 17 by a step 390. In the exemplary arrangement the request approval inquiry that is sent to the record provider circuit includes data corresponding to the record requester. In the exemplary arrangement the request approval inquiry when received by the record provider circuit is operative to cause a screen 314 shown in FIG. 40 to be output through a display in connection with the record provider circuit. The user interface presented by screen 314 includes record requester identifying data 316. The record requester identifying data 316 in the exemplary arrangement identifies the record requester, the content record being requested, and the quantity of printed copies. The exemplary record requester identifying data further includes the name and address of the record requester along with the date that the request for the printed copy was submitted. The exemplary record requester identifying data further includes information that enables the system to uniquely identify the particular request.

The exemplary display screen 314 includes an approval icon 318 and a rejection icon 320. If the record provider provides an input corresponding to selection of the approval icon 318, the at least one record provider circuit is operative to provide the request approval response to the central system circuitry. This is represented in FIG. 7 by a step 321. Responsive to receiving the request approval response, the central system circuitry is operative to cause the financial account of the record requester to be charged for the printed copies. If the financial account of the record requester is successfully charged for the printed copies, the central system circuitry operates in a manner like that previously discussed to cause a printed copy of the content record to be produced by sending data corresponding to the content record to the printing operation that is designated to print a copy for the record requester.

Alternatively if the record provider provides an input corresponding to the rejection icon 320, the record provider circuitry transmits at least one rejection message indicating to the central system circuitry that the printing of the content record for the record requester is not approved. The central system circuitry then operates responsive to receipt of the at least one rejection message to cancel the transaction or at least a portion of the transaction that relates to the cost of the printed record for which printing for the record requester has been declined. This is represented by a step 323. In the exemplary arrangement the central system circuitry is operative to send a message to the record requester circuit 18 which is operative to inform the record requester that the request has not been approved. Of course it should be understood that this approach is exemplary and in other arrangements other approaches may be used.

In other exemplary arrangements the central system circuitry may operate in accordance with its circuit executable instructions to provide alternative options for record provider approval of deliveries of record content to record requesters. For example in some arrangements the record provider may be presented with an option to decline the delivery of record content to a record requester only if the record provider presents a rejection message within a set time after the request approval inquiry message is sent to the record requester. For example, the central system circuitry may be programmed to give the record provider 24 hours after the request approval inquiry message is sent to the record provider, to submit a rejection message. If the record provider does not send a rejection message within such time, the circuitry automatically proceeds to operate to cause the record content to be produced and delivered to the record requester. Such an approach enables a record provider to carefully control and monitor the requests for record content delivery if they wish to do so, but will not inconvenience the record requesters by delaying production and delivery of the printed records due to delays in approval or in the event that the record provider does not care to carefully monitor record deliveries.

Further in some exemplary arrangements the central system circuitry may operate in accordance with its circuit executable instructions to provide other types of approval options to record providers. This may include for example allowing the record provider to withhold approval of the delivery of printed record content to record requesters based on certain aspects of the request by the record requester or the circumstances of the request. For example, approval by the record provider may be required based on the location of delivery associated with the record requester, such as in a particular country. Alternatively, the circuitry may operate to enable a record provider to withhold deliveries in situations where the record requester meets certain screening criteria, which is deemed to make the request suspect. Exemplary central system circuitry may provide numerous different options to record providers to selectively grant and/or withhold delivery of printed records to record requesters based on different criteria or circumstances that may be established by the record provider by input selections through the record provider circuit.

In the operation of the exemplary central system circuitry a record requester may access the web interface via the Internet to request to receive a printed copy of a hosted content accord. Generally this will occur by the record requester circuit 18 associated with the record requester, selecting the hyperlink that corresponds to the network address at which the landing page for the hosted content record is presented. The hyperlink which corresponds to the network address for the landing page will generally have been provided to the record requester by the content provider in communications or in promotional material. As represented in the logic flow schematically represented in FIG. 2, the logic branches at the decision step 38 when the central system circuitry receives a communication from a record requester circuit corresponding to a hosted content record. Responsive at least in part to receiving the message from the record requester circuit, the central system circuitry is operative to send at least one message corresponding to the landing page to the record requester circuit. This is represented in FIG. 2 by a step 322.

Figure 45:
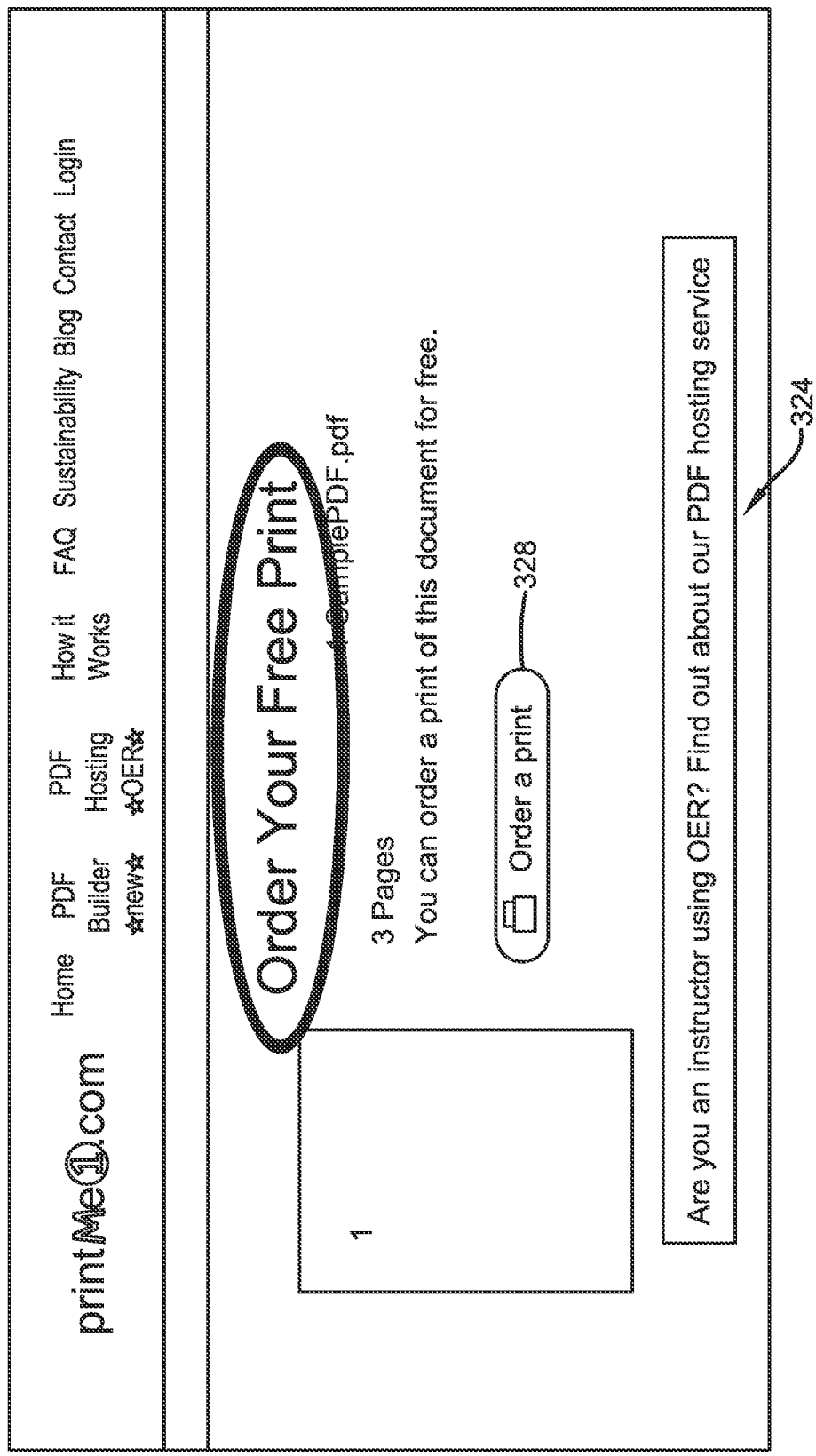

In addition to presenting the landing page to the record requester, the central system circuitry is operative to make a determination whether the content record is one for which the record provider's approval is required before a copy may be printed for the record requester. The central system circuitry is also operative to determine whether a printed copy that is requested by record requester is paid for by the content provider or must be paid for by the record requester. These determinations that are made by the central system circuitry are represented in FIG. 2 by a step 324. In the exemplary arrangement if the printed copy of the content record is paid for by the content record provider, the central system circuitry operates in accordance with the stored circuit executable instructions to present to the record requester through the display of the record requester circuit, a display screen 324 which is shown in FIG. 45. This is also represented in FIG. 2 by a step 326. The exemplary display screen 324 includes visible indicia which informs the record requester that the printed copy of the content record is free. The display screen further includes an icon 328. The record requester can provide an input corresponding to selection of the icon 328 to order their free printed copy of the content record.

Figure 46:
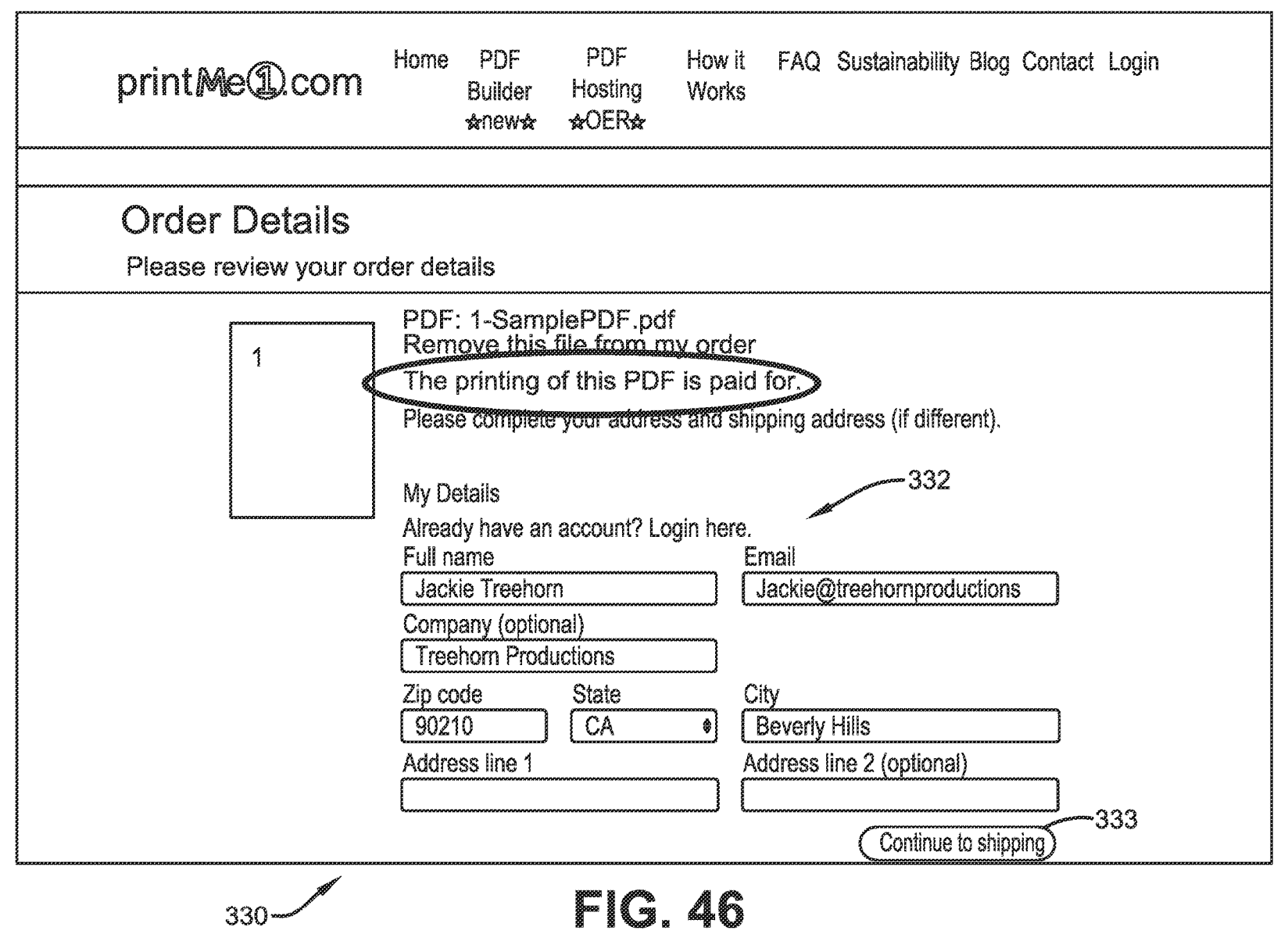

In the exemplary arrangement the central system circuitry is operative responsive to the request for the free printed copy to present to the record requester a screen 330 which is shown in FIG. 46. In the exemplary arrangement the screen 330 includes visible indicia which indicates to the record requester that the print will be provided for free. However the record requester is required to populate a plurality of fields 332. The exemplary fields include the name, address, company and contact information of the record requester. In the exemplary arrangement this record requester data is transmitted to the central system circuitry and is included in a record recipient record which may be similar to those records previously discussed. This is represented in FIG. 2 by a step 334. As can be appreciated, the record recipient record data enables determining the printing operation that will produce the printed copy and ship the printed copy to the record requester. The record requester data is also used in situations where the record provider is required to approve the printing of the printed copy for the record requester. The data included about the record requester may be sent to the at least one record provider circuit in conjunction with the request approval inquiry as previously discussed.

After receiving the record requester data the record requester is enabled to provide an input corresponding to selection of an icon 333 in FIG. 46. Selection of the icon causes the central system circuitry to proceed to the shipping functions portion of the logic flow carried out by the central system circuitry. The exemplary central system circuitry is then operative to make a determination whether the at least one data store 24 includes data corresponding to at least one permission record in association with the requested content record. The central system circuitry is operative to determine if the at least one permission record includes data corresponding to a record provider approval requirement for the record requester before the printed copy of the content record is produced. This is represented in FIG. 2 by a step 336.

Figure 47:
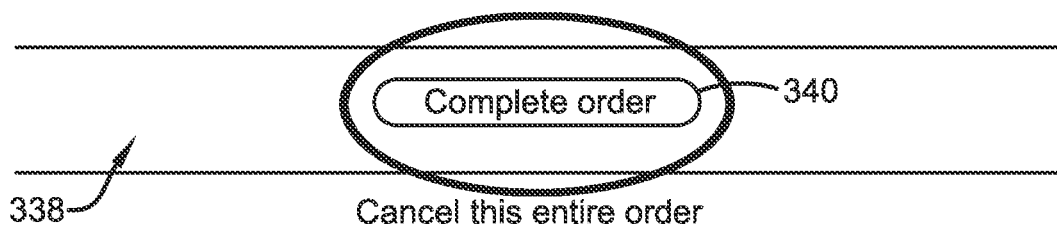

If the printing of the content record for a record requester does not require record provider approval, the central system circuitry is operative to cause the record requester circuit to present the screen 338 that is shown in FIG. 47. The screen 338 includes the recipient name data and recipient location data that will be used for purposes of delivering of the printed content record. The screen 338 also includes the shipping method that will be utilized for purposes of delivering the printed copy of the content record. The exemplary screen 338 includes an icon 340. The exemplary arrangement enables the record requester to provide at least one input corresponding to selection of the icon 340 to complete their order. Responsive to receiving data corresponding to the at least one input to the record requester circuit, the central system circuitry is operative to complete the order process. This is represented in FIG. 2 by a step 342. The central system circuitry is then operative in a manner like that discussed in connection with the prior example to determine the printing operation that will produce the printed copy of the content record and to complete the printing and shipment process.

However if in step 336 it is determined that the at least one permission record includes data corresponding to record provider approval being required before a copy of the content record will be printed, the central system circuitry operates to send at least one request approval inquiry message to the content record provider circuit in a manner like that previously discussed. This is represented by step 344. The request approval inquiry message includes the data corresponding to the record requester and is operative to cause the record provider circuit to output a screen similar to screen 314 previously discussed. The record provider is enabled to review the information regarding the record requester and determine if they wish to approve or reject the request by the record requester to obtain a printed copy of the content record. By providing an input corresponding to the icon approving the request, the record provider circuitry is operative to send at least one request approval response message to the central system circuitry. If the request is denied by the record provider providing an input corresponding to the reject icon, at least one message indicating the rejection of the request is sent to the central system circuitry. This is represented in FIG. 2 by step 346.

Of course as can be appreciated because in this example the content provider is paying the costs associated with printing and shipping the content record, the central system circuitry is operative to cause the costs to be assessed to the content provider's stored value account. As represented in FIG. 17 before the central system circuitry proceeds to have the printed content record transmitted to a printing operation for printing, a determination is made concerning whether the record provider's stored value account has sufficient funds to pay for the printed copy. This is represented by step 348 in FIG. 7. If the stored value account of the content provider has sufficient funds as represented by a step 350, the central system circuitry operates in a manner like that previously discussed to cause the printed copy of the content record to be produced and delivered to the record recipient. Alternatively if the stored value account does not have sufficient funds, the printing of the content record is deferred. The exemplary central system circuitry is operative to cause at least one message to be sent to the at least one content record provider circuit to request the content provider to add additional funds to the stored value account. This is represented by a step 352. Of course these approaches are exemplary and in other arrangements other approaches may be used.

In some exemplary arrangements the exemplary central system circuitry may operate to enable a record requester and record provider to split the costs associated with providing the printed copies of the hosted content records. This may occur for example, in situations in which the content provider has provided default printing options that corresponds to a printed copy that the provider will pay for when such a copy is requested by record requester. These default criteria for printed copies that the record provider will pay for are included in the at least one data store in data corresponding to a provider order charge details record. As previously discussed, the order details record data input by the record provider generally specifies that a single printed copy will be provided in accordance with the binding method selected by the content record provider. The content record provider also includes in the provider order charge details record, data corresponding to a shipping method that the content record provider is willing to pay for.

However in some exemplary arrangements in situations where the content record provider has agreed to pay for production and shipping of the content record in accordance with the data included in the provider order charge details record, a record requester may wish to pay for additional copies, a different type of shipping method, a different type of printing or other things or features for an additional charge to be paid by the record requester. For example as shown in screen 338 previously discussed, a standard shipping option is paid for by the content record provider. However if the record requester desires to have overnight shipping or another shipping option which will result in the record requester receiving their copy more quickly, the exemplary central system circuitry may be operative to arrange for the requested shipping type and cause the additional charge to be assessed to a financial account associated with the record requester. In exemplary arrangements where this capability is provided by the central system circuitry, the record provider is presented with a notice in a display screen similar to screen 354 shown in FIG. 48. In this exemplary arrangement the record provider is notified that in the event that a record requester wishes to request additional copies or other features which are more expensive than the default print criteria included in the order charge details record established by the content record provider, the record requester will be required to pay the additional charges.

In exemplary arrangements the user interface that is presented to the record requester through the display associated with the record requester circuit may provide outputs that enable the record requester to change the default criteria included in the provider order charge details record that specifies copy details the content provider will pay for. Inputs through the user interface that is presented to the record requester may enable the record requester to input data corresponding to a different quantity of printed copies, a different binding method and/or a different shipping method. Of course other features or options may also be offered depending on the type of content record involved. Responsive to the record requester inputting this different information, the central system circuitry is operative responsive to the messages received from the record requester circuit to store the data in at least one requester order charge details record that is stored in the at least one data store 24.

In the exemplary arrangement the central system circuitry 22 is then operative to present to the record requester a request to provide data corresponding to a financial account of the record requester, to which the additional charges associated with the additional features included in the requester order charge details record will be assessed. The central system circuitry is operative to receive from the record requester circuit, credit card data or other data corresponding to a financial account of the record requester, along with data corresponding to an authorization to assess the record requester's financial account for the charges. Responsive at least in part to receiving the authorization from the record requester, the central system circuitry communicates with a corresponding financial circuit for the record requester's account. The exemplary central system circuitry is operative to cause a requester charge associated with the charge for the additional amount for printing based on the requester order charge details record, to be assessed to the record requester's financial account. The requester charge is credited to an account associated with the operator of the central system circuitry. Further the central system circuitry is operative to assess the provider a charge that is associated with printing and delivering the content record in accordance with the default criteria based on the provider order charge details record, to the stored value account of the record provider.

In this manner the exemplary central system circuitry is operative to enable the charges associated with delivery of the printed copy and any additional copies or other printing or shipping features requested by the record requester, to be split between the content provider and the record requester. Of course it should be understood that the approach that is described is exemplary and other arrangements other approaches may be used.

As previously mentioned, in the exemplary arrangement the central system circuitry is also operative to enable a record provider to allow downloads of electronic copies of a content record for which the content provider has agreed to pay for printed copies. As previously discussed in connection with screen 236, in establishing the permission record data stored in the at least one data store 24, a content record provider is enabled to select a text icon 244. Selection of the text icon 244 causes the central system circuitry to operate to receive and store data corresponding to at least one permission record from the at least one record provider circuit. The at least one permission record includes data corresponding to an authorization of the record provider to allow electronic downloads of at least a portion of the printable content record to a record requester circuit. The electronic download of the content record is in addition to allowing the user to receive a printed copy of the content record at no charge, in the exemplary arrangement.

In situations where the record provider has provided the inputs to cause at least one permission record authorizing electronic downloads of the content record, a record requester who requests a printed copy of the content record also has the option to receive a download of at least a portion of the content record. FIG. 50 shows an exemplary display screen 356 that is associated with ordering by a record requester of a free copy of the content record. Display screen 356 includes an icon 358. The record requester may operate the record requester circuit to provide an input corresponding to selection of icon 358. This causes at least one message to be sent to the central system circuitry. The central system circuitry then operates to send at least a portion of the electronic content record to the record requester circuit. Of course in the exemplary arrangement the record requester is also enabled to provide an input corresponding to selection of an icon 360 in display screen 356. This input is operative to cause the central system circuitry to proceed to have a printed copy produced for the record requester by a printing operation in geographic proximity to the record requester circuit in a manner like that previously discussed.

As can be appreciated in printing a copy of a hosted content record for a record requester, the central system circuitry operates in a manner like that already discussed to determine the printing operation that is in geographic proximity to the location of the record requester, and that has the qualifications and capabilities to produce the printed copy. This is represented in FIG. 1 by the print operation 14. The printing circuit 32 associated with the printing operation 14 receives the job folder including the content record and the job ticket for the printed copy to be produced, at the printing circuit system access address in a manner like that previously discussed.

The printing operation then uses the content record and job ticket data to produce the one or more printed copies of the content record using one or more printers 362. The printed copies of the content records 364 are packaged and labeled in a manner like that previously discussed. The printed copies of the content records are then transported by the designated shipper schematically indicated 366, and delivered to the delivery address associated with the record requester 368. The central system circuitry is further operative to cause the account associated with the printing operation to receive a payment for the printing and shipping services performed. Of course these approaches are exemplary and in other arrangements other approaches to be used.

Further in some exemplary arrangements in which the record requester is paying for the printed copy of the content record, the central system circuitry is operative to cause a charge associated with the printed copy to be assessed to an account of the record requester. This may be done in a manner like that previously discussed through communication with financial circuitry associated with a transaction processor that can transfer funds from the credit card, debit card, stored value or other account of the record requester. The central system circuitry may further operate to cause a payment corresponding to a portion of the charge to the record requester, to be received in an account associated with the entity associated with operation of the central system circuitry and a further payment corresponding to a further portion of the charge to the record requester to be received in a further account associated with the entity associated with the printing operation. In some exemplary arrangements where the printing operation that will perform the printing and shipping activities is identified at the time that the payment is received from the record requester, the central system circuitry may operate in conjunction with the financial circuitry to cause the payment from the record requester to be divided into the respective payment portions at the time that the charge is assessed to the record requester. Such an approach may be particularly helpful in situations where the entity operating the central system circuitry and the printing operation are located in different taxing jurisdictions. Such division of the received payments immediately upon receipt, may avoid more complex accounting and tax issues that would otherwise arise when the entire payment from the record requester was deemed to have been paid to the operator of the central system circuitry. In alternative arrangements the central system circuitry may operate to cause the portion of the payment to the account of the entity associated with printing operation to be deferred until a time at which the activity of the printing operation has been commenced or performed. Of course these approaches are exemplary and in other arrangements other approaches used.

In some exemplary arrangements the central system circuitry may operate to cause revenue that is derived from record requesters who pay for delivery of printed record content, to be shared with entities that refer record requesters to the posted print record offerings that are available through operation of the central system circuitry. For example, in some arrangements the central system circuitry may make available hosted record content data that record requesters may pay to have printed and delivered. Such record content may be available from a plurality of different record providers, and such record content may fall into numerous different types of record content categories. Operators of Internet sites that attract visitors with certain areas of interest may wish to enable visitors to their site to be referred via a link to the central system circuitry to review the record content that is available to be printed and delivered through the operation of the central system circuitry. In exchange for the operator of the referring Internet site providing the capability for visitors to their site to be directed to the offerings available from central system circuitry, the operator of the central system circuitry and/or the record providers, may pay the operator of the referring Internet site a share of the revenue that is derived from producing and delivering printed records to purchasers who are directed to the central system circuitry through the referring Internet site.

This may be accomplished in exemplary arrangements by the operator of the central system circuitry providing data corresponding to a link to the operator of the referring Internet site. The link data enables presenting a link (e.g., hyperlink) that when selected will automatically direct the browser of a visitor computer currently in communication with the referring site, to a landing page provided by the central system circuitry. In addition the link data may include an identifying data portion which is indicative of the referring Internet site or the operator entity that is associated in the at least one data store therewith. In some exemplary arrangements the identifying data portion of the link may be encrypted or may be token data that can only be correlated with the referring site and/or the entity associated with the site through operation of the central system circuitry. Such steps may be taken so it is not apparent to users that the link data is identifiable and associated with the referring Internet site or the operator thereof.

In such arrangements the entity that is associated with the referring Internet site may include the code corresponding to the link in their site so that it may be selected through operation of the browsers on the computers operated by visitors to the site. Visitors selecting the link have their browser software automatically directed to a designated landing page corresponding to the link that is provided through operation of the central system circuitry. In such arrangements the central system circuitry operates to use the identifying data that is received by the central system circuitry as a result the user selecting the link, to identify the referring site from which the visitor's inquiry originated. The central system circuitry further operates to determine the entity associated with the referring site. The exemplary central system circuitry may further operate to collect customer identifying data such as the visitor's IP address, browser identify data or system details, and store such data in the at least one data store in association with the stored entity data so as to identify the user as one that was directed to the site from the referring Internet site. Further in some arrangements the central system circuitry may operate to store data on the computer of the referred visitor that is recoverable by the central system circuitry and which is usable to identify the visitor's computer as one that is associated with the entity that operates the referring site. This may be done by placing a cookie or other identifying code and/or data on the browser of the visiting user to identify the user as one that came to the central system circuitry from the referring Internet site. Such data is stored in the at least one data store so that the visitor can be identified. as one that was referred from the referring site. These approaches enable the central system circuitry to identify the visitor as one associated with the referring Internet site both during the initial session and during subsequent sessions in which the user may visit the landing page and purchase printed content.

In exemplary arrangements when the visitor to the landing page of the central system circuitry chooses to purchase printed record content, an agreed portion of the charge that is assessed to the purchaser by the central system circuitry is credited to an account associated with the entity that operates the referring website. In some arrangements, the operator of the central system circuitry may further cause the circuitry to provide to the account associated with the entity that is the operator of referring website, credits corresponding to a portion of the purchases by the visitor that are made in subsequent visits to the landing page of the central system circuitry. Thus in such arrangements the operator of the referring website is enabled to obtain revenue as a result of directing visitors to the central system circuitry to acquire printed record content.

Further in other exemplary arrangements the operator of a referring website may refer visitors to the central system circuitry to obtain other services. For example an entity that operates a referring website that provides advice to aspiring authors, may include a referring link that directs authors to the interface provided by the central system circuitry for purposes of self-publishing their works and distribution of the works to purchasers. In such circumstances the central system circuitry may operate to credit an account associated with the operator of the referring website, an agreed portion of the revenue that the operator of the central system circuitry obtains from the referred customers who distribute their record content, or make sales of their record content, to customers through operation of the central system circuitry. Numerous different approaches may be provided for achieving revenue sharing arrangements between entities that refer customers to the offerings available through the central system circuitry, content providers and operators of the printing operations. Further in exemplary arrangements the central system circuitry may operate in a manner like that discussed to enable the distribution of the derived revenue to each of the participants in the particular arrangement.

Thus the exemplary arrangements achieve improved operation, eliminate difficulties encountered in the use of prior systems and methods, and attain the useful results that are described herein.

In the foregoing description certain terms have been used for brevity, clarity and understanding. However, no unnecessary limitations are to be implied therefrom because such terms are used for descriptive purposes and are intended to be broadly construed. Moreover the descriptions and illustrations herein are by way of examples and the new and useful features and relationships are not limited to the exact features shown and described.

Further it should be understood that the features and/or relationships associated with one arrangement can be combined with features and/or relationships from another arrangement. That is, various features and/or relationships from various arrangements can be combined in multiple different ways to produce further arrangements. The scope of the inventive features described herein is not limited solely to the particular arrangements that have been shown or described.

Having described features, discoveries and principles of the exemplary arrangements, the manner in which they are constructed and operated, and the advantages and useful results attained; the new and useful features, devices, elements, arrangements, parts, combinations, systems, equipment, operations, methods, processes and relationships are set forth in the appended claims.

We claim:

1. A system comprising:

central system circuitry, wherein the central system circuitry is in operative connection with at least one data store and at least one network, wherein the at least one data store includes a plurality of data records, including data corresponding to geographic location data, a plurality of printing operations, wherein the data corresponding to each printing operation has associated data corresponding to a printing operation geographic location, and at least one printing operation circuit system access address, wherein the central system circuitry is operable to a) receive through the at least one network, a printable content record from at least one remote record provider circuit associated with a record provider, wherein the printable content record is usable to produce a printed item, b) cause the printable content record to be stored in the at least one data store, c) receive from the at least one remote record provider circuit, at least one record recipient record, wherein each record recipient record includes data corresponding to the content record, a record recipient to receive a printed copy of the content record, and a record recipient location corresponding to the record recipient, d) responsive at least in part to data stored in the at least one data store, and the record recipient location data in a record recipient record for a record recipient, determine a printing operation in geographic proximity to the record recipient location, e) determine a printing circuit system access address associated with the printing operation determined in (d), f) responsive at least in part to the determined printing circuit system access address, communicate data corresponding to at least a portion of the content record to the printing circuit system access address, wherein the data corresponding to the content record communicated in (f) is usable by the printing operation to produce a printed copy of the content record that is deliverable to the record recipient.

2. The apparatus according to claim 1 wherein the central system circuitry is further operative to receive from the at least one remote record provider circuit at least one print details record, wherein the at least one print details record includes data corresponding to at least one of a paper type, a paper size, a print type, paper sides to print, and a binding type, wherein the central system circuitry is operative to communicate data corresponding to at least a portion of the at least one print details record to the printing circuit system access address, wherein the data corresponding to the at least one print details record is usable by the printing operation to produce the printed copy.

3. The apparatus according to claim 1
wherein in (a) the received printable content record includes an associated content record title,
wherein in (c) the at least one record recipient record includes data corresponding to the content record title associated with the content record to be printed for the record recipient.

4. The apparatus according to claim 1
wherein in (c) the at least one record recipient record includes data corresponding to a number of printed copies of the content record to be provided to the record recipient.

5. The apparatus according to claim 1
wherein in (c) the record recipient record includes data corresponding to a shipping method to be used for shipment of the printed copy of the content record to the record recipient.

6. The apparatus according to claim 1
wherein in (c) the location data included in the record recipient record includes data corresponding to a delivery address at which the printed copy of the content record is to be delivered.

7. The apparatus according to claim 1
wherein in (c) the record recipient record further includes data corresponding to contact information corresponding to the record recipient,
wherein the contact information includes at least one of a phone number and an email address associated with the record recipient.

8. The apparatus according to claim 1
wherein in (a) the received printable content record includes an associated content record title,
wherein in (c) the record recipient record includes the data corresponding to each of the content record title, the record recipient and the record recipient location in a comma separated value (CSV) format.

9. The apparatus according to claim 1
wherein the data corresponding to at least some of the printing operations includes data corresponding to printing capabilities associated with the respective printing operation,
wherein the central system circuitry is further operative to receive from the at least one remote record provider circuit at least one print details record,
wherein the at least one print details record includes data corresponding to at least one of
a paper type,
a paper size,
a print type,
paper sides to print, and
a binding type,
wherein the central system circuitry is operative to make the determination of the printing operation in (d) responsive at least in part to data included in the at least one print details record and the stored printing capabilities data,
wherein the data corresponding to the at least one print details record is usable by the printing operation to produce the printed copy.

10. The apparatus according to claim 1
wherein the central system circuitry is further operable to cause a charge associated with the printed copy to be assessed to an account of the record provider.

11. The apparatus according to claim 1
wherein the central system circuitry is further operable to cause a charge associated with the printed copy to be assessed to an account of the record provider,
wherein the charge is assessed to one of a credit card account, a debit card account or an electronic wallet account of the record provider.

12. The apparatus according to claim 1
wherein in (c) the central system circuitry is operative to receive a plurality of record recipient records,
wherein each record recipient record includes data corresponding to a record recipient that is different from the data corresponding to record recipients in the other record recipient records, and wherein each record recipient record has a respective record recipient location for the respective record recipient that is different from the data corresponding to record recipient locations in the other record recipient records,
wherein in (d) the central system circuitry is operative to determine a respective printing operation for each respective record recipient record responsive at least in part to the record recipient location data included in the respective record recipient record, whereby a respective printing operation is selected to produce the respective printed content record for each respective record recipient responsive at least in part to the respective record recipient location.

13. The apparatus according to claim 1
wherein in (a) the central system circuitry is operative to receive a plurality of printable content records, wherein each printable content record is usable to produce a printed item that differs in content from the printed items producible using the other printable content records,
wherein in (c) each record recipient record includes data corresponding to each of the printable content records for which the corresponding printed copy is to be received by the respective record recipient.

14. The apparatus according to claim 1
wherein in (a) the central system circuitry is operative to receive a plurality of printable content records, wherein each printable content record is usable to produce a printed item that differs in content from the printed items producible using the other printable content records,
wherein in (c) each record recipient record includes data corresponding to each of the printable content records for which a respective corresponding printed copy is to be received by the respective record recipient,
wherein the central system circuitry is further operative to receive from the at least one remote record provider circuit at least one print details record associated with each printable content record,
wherein the at least one print details record includes data corresponding to at least one of
a paper type,
a paper size,
a print type,
paper sides to print, and
a binding type,
applicable to the respective printed copy of the respective printable content record,
wherein the central system circuitry is operative to communicate data corresponding to at least a portion of the at least one print details record to the printing circuit system access address,
wherein the data corresponding to the at least a portion of at least one print details record is usable by the printing operation to produce the respective printed copy of the respective printable content record.

15. The apparatus according to claim 1
wherein the central system circuitry is further operative to communicate to the printing circuit system access address, a deliverable job ticket record associated with the data corresponding to the content record,
wherein the deliverable job ticket record includes at least some data corresponding to data included in the record recipient record.

16. The apparatus according to claim 1
wherein in (c) the at least one record recipient record includes data corresponding to a record recipient name and a record recipient delivery address,
wherein the central system circuitry is further operative to communicate to the printing circuit system access address, a deliverable job ticket record associated with the data corresponding to the content record,
wherein the deliverable job ticket record includes data corresponding to the record recipient name and the record recipient delivery address.

17. The apparatus according to claim 1
wherein the central system circuitry is further operative to communicate to the printing circuit system access address, a deliverable job ticket record associated with the content record,
wherein the deliverable job ticket record includes data corresponding to machine-readable indicia, wherein the machine-readable indicia corresponds to at least some data included in the record recipient record.

18. The apparatus according to claim 1
wherein the central system circuitry is operative to provide at least one user interface output to the remote record provider circuit,
wherein at least one record recipient record is received by the central system circuitry responsive to the at least one user interface output.

19. The apparatus according to claim 1
wherein the central system circuitry is operative to receive from the at least one remote record provider circuit, the at least one record recipient record with data in a comma separated value (CSV) format.

20. The apparatus according to claim 1
wherein the central system circuitry is operative to receive from the at least one remote record provider circuit, the at least one record recipient record with data in a comma separated value (CSV) format,
wherein the at least one record recipient record in the CSV format includes data corresponding to
the content record,
a quantity of printed copies,
a recipient name of the record recipient, and
a recipient address of the record recipient.

21. The apparatus according to claim 1
and further comprising:
a printing operation printer,
wherein the printer is operative responsive at least in part to the data corresponding to the content record to produce the printed copy.

22. Apparatus comprising:
central system circuitry, wherein the central system circuitry is in operative connection with at least one data store,
wherein the at least one data store includes a plurality of data records including data corresponding to
a plurality of geographically disposed printing operations,
wherein the data records corresponding to each printing operation include data corresponding to
a printing operation geographic location,
a printing operation circuit system access address, wherein the printing operation is capable of producing printed versions of electronic printable content records received through the printing operation circuit system access address,
wherein the central system circuitry is operable to
a) receive electronically at least one electronic printable content record from at least one remote record provider circuit, wherein the at least one remote record provider circuit is associated with a record provider,
wherein each printable content record has an associated printable content record title and is usable to produce a printed version of at least a portion of the printable content record,
b) cause data corresponding to the printable content record and the associated printable content record title to be stored in associated relation in the at least one data store,
c) receive from the at least one remote record provider circuit, at least one record recipient record,
wherein each record recipient record includes data corresponding to
the respective content record title of a respective content record,
a record recipient to receive a printed version of the respective content record, and
a record recipient location corresponding to the respective record recipient,
d) responsive at least in part to the record recipient location data included in the respective record recipient record for a respective record recipient, cause a determination of a printing operation in geographic proximity to the respective record recipient location,
e) responsive at least in part to the data stored in the at least one data store, cause a determination of the printing circuit system access address associated with the printing operation determined in (d),
f) cause communication to the printing circuit system access address determined in (e), of
data corresponding to at least a portion of the content record associated with the content record title in the respective record recipient record, wherein the at least a portion of the content record is usable to produce a printed version of the content record, and
data corresponding to the record recipient in the respective record recipient record,
whereby the printing operation is enabled to produce a printed version of the content record that is deliverable to the record recipient.

23. The apparatus according to claim 22
wherein the central system circuitry is further operative to receive from the at least one remote record provider circuit, at least one print details record,
wherein the at least one print details record is associated with a respective printable content record,
wherein the at least one print details record includes data corresponding to at least one of
a paper type,
a paper size,
a print type,
paper sides to print, and
a binding type,
for the printed version of the associated content record,
wherein the central system circuitry is operative to communicate to the printing circuit system access address, at least some of the data in the respective at least one print details record associated with the content record communicated in (f), whereby the printing operation is enabled to use the data from the at least one print details record to produce the printed version.

24. The apparatus according to claim 22 wherein in (c) the central system circuitry is operative to receive the at least one record recipient record with the data therein in a comma separated value (CSV) format.

\* \* \* \* \*